(12) United States Patent
Merkle et al.

(10) Patent No.: US 9,749,651 B2
(45) Date of Patent: Aug. 29, 2017

(54) EFFECTIVE WEDGELET PARTITION CODING USING SPATIAL PREDICTION

(71) Applicant: GE Video Compression, LLC, Albany, NY (US)

(72) Inventors: Philipp Merkle, Berlin (DE); Christian Bartnik, Berlin (DE); Haricharan Lakshman, Berlin (DE); Detlev Marpe, Berlin (DE); Karsten Mueller, Berlin (DE); Thomas Wiegand, Berlin (DE); Gerhard Tech, Berlin (DE)

(73) Assignee: GE VIDEO COMPRESSION, LLC, Albany, NY (US)

( * ) Notice: Subject to any disclaimer, the term of this patent is extended or adjusted under 35 U.S.C. 154(b) by 309 days.

(21) Appl. No.: 14/273,600

(22) Filed: May 9, 2014

(65) Prior Publication Data

US 2014/0341290 A1   Nov. 20, 2014

Related U.S. Application Data

(63) Continuation of application No. PCT/EP2012/072326, filed on Nov. 9, 2012.
(Continued)

(51) Int. Cl.
*H04N 7/12* (2006.01)
*H04N 19/51* (2014.01)
(Continued)

(52) U.S. Cl.
CPC ......... *H04N 19/51* (2014.11); *H04N 19/105* (2014.11); *H04N 19/119* (2014.11);
(Continued)

(58) Field of Classification Search
None
See application file for complete search history.

(56) References Cited

U.S. PATENT DOCUMENTS 8,249,273 B2   8/2012   Inoda et al.
2002/0094125 A1   7/2002   Guo
(Continued)

FOREIGN PATENT DOCUMENTS

CN   101453684 B   5/2014
EP   2 521 357 A1   11/2012
(Continued)

OTHER PUBLICATIONS

Office Action issued on Sep. 22, 2016 in U.S. Appl. No. 14/273,601.
(Continued)

*Primary Examiner* — Dakshesh Parikh
(74) *Attorney, Agent, or Firm* — Pillsbury Winthrop Shaw Pittman LLP

(57) ABSTRACT

In accordance with a first aspect, the intra prediction direction of a neighboring, intra-predicted block is used in order to predict the extension direction of the wedgelet separation line of a current block, thereby reducing the side information rate necessitated in order to convey the partitioning information. In accordance with a second aspect, the idea is that previously reconstructed samples, i.e. reconstructed values of blocks preceding the current block in accordance with the coding/decoding order allow for at least a prediction of a correct placement of a starting point of the wedgelet separation line, namely by placing the starting point of the wedgelet separation line at a position of a maximum change between consecutive ones of a sequence of reconstructed values of samples of a line of samples extending adjacent to the current block along a circumference thereof. Both aspects may be used individually or in combination.

14 Claims, 18 Drawing Sheets

Related U.S. Application Data

(60) Provisional application No. 61/558,630, filed on Nov. 11, 2011.

(51) Int. Cl.

| | | |
|---|---|---|
| *H04N 19/597* | (2014.01) | |
| *H04N 19/105* | (2014.01) | |
| *H04N 19/176* | (2014.01) | |
| *H04N 19/70* | (2014.01) | |
| *H04N 19/119* | (2014.01) | |
| *H04N 19/46* | (2014.01) | |
| *H04N 19/196* | (2014.01) | |
| *H04N 19/96* | (2014.01) | |
| *H04N 19/593* | (2014.01) | |
| *H04N 19/157* | (2014.01) | |
| *H04N 19/82* | (2014.01) | |
| *H04N 19/52* | (2014.01) | |
| *H04N 19/14* | (2014.01) | |

(52) U.S. Cl.
CPC ......... *H04N 19/157* (2014.11); *H04N 19/176* (2014.11); *H04N 19/196* (2014.11); *H04N 19/46* (2014.11); *H04N 19/52* (2014.11); *H04N 19/593* (2014.11); *H04N 19/597* (2014.11); *H04N 19/70* (2014.11); *H04N 19/82* (2014.11); *H04N 19/96* (2014.11); *H04N 19/14* (2014.11)

(56) References Cited

U.S. PATENT DOCUMENTS

| | | |
|---|---|---|
| 2008/0101707 A1 | 5/2008 | Mukherjee et al. |
| 2009/0225834 A1 | 9/2009 | Song et al. |
| 2012/0200669 A1 | 8/2012 | Lai |
| 2013/0034171 A1 | 2/2013 | Winken |
| 2014/0079132 A1 | 3/2014 | Amon |

FOREIGN PATENT DOCUMENTS

| | | | |
|---|---|---|---|
| EP | 2 860 977 A1 | 4/2015 | |
| JP | 2009-147968 A | 7/2009 | |
| WO | 2011/046607 A2 | 4/2011 | |
| WO | WO2011/046607 A2 * | 4/2011 | ............ G06T 5/002 |
| WO | 2011/127966 A1 | 10/2011 | |
| WO | 2012/020092 A1 | 2/2012 | |

OTHER PUBLICATIONS

Office Action issued on Sep. 21, 2016 in U.S. Appl. No. 14/273,603.
Office Action issued on Dec. 15, 2016 in Chinese Application 201280066926.X.
Official Communication issued in corresponding Korean Patent Application No. 10-2014-7015914, mailed on Jul. 29, 2015.
Official Communication issued in corresponding Korean Patent Application No. 10-2014-7015913, mailed on Jul. 29, 2015.
Official Communication issued in corresponding European Patent Application No. 12 783 613.8, mailed on Sep. 11, 2015.
Liu, S. et al., "New Depth Coding Techniques with Utilization of Corresponding Video", IEEE Transactions on Broadcasting, vol. 57, No. 2, Jun. 2011, pp. 551-561.
Kang, M. et al., "Adaptive Geometry-based Intra Prediction for Depth Video Coding", IEEE International Conference on Multimedia and Expo, Jul. 19, 2010, pp. 1230-1235.
Zhang, Y. et al., "Motion Compensation Using Polyline Based Block Partition", 2nd International Congress on Image and Signal Processing, Oct. 17-19, 2009, 5 pages.
Escada, O. et al., "Geometry-Adaptive Block Partitioning for Video Coding", Proc. IEEE ICASSP, 2007, pp. I-657-I-660.
Liu, S. et al., "Sparse Dyadic Mode for Depth Map Compression", Proc. IEEE ICIP, Sep. 26-29, 2010, pp. 3421-3424.
Merkle, P. et al., "The Effects of Multiview Depth Video Compression on Multiview Rendering", Signal Processing: Image Communication, 24, 2009, pp. 73-88.
Morvan, Y. et al., "Novel Coding Technique for Depth Images using Quadtree Decomposition and Plane Approximation", Proc. SPIE, vol. 5960, 2005, pp. 1187-1194.
Gao, J. et al., "Application of Wedgelet Transform for Image Process", Proc. IEEE ICACIA, pp. 220-222, 2008.
Wakin, M. et al., "Rate-Distortion Optimized Image Compression Using Wedgelets", Proc. IEEE ICIP, pp. III-237-III-240, 2002.
Loke, K., "Wedgelets-Based Automatic Object Contour Detection", Proc. IEEE ICNC, pp. 3664-3668, 2010.
Merkle, P. et al., "3D-CE6.H Related: Fast Wedgelet Search", ITU-T SG16 WP 3 and ISO/IEC JTC 1/SC 29/WG 11, 1st Meeting, Document JCT2-A0105, 4 pages, Jul. 16-20, 2012.
Davies, T. et al., "Suggestion for a Test Model", ITU-T SG16 WP 3 and ISO/IEC JTC 1/SC 29/WG 11, 1st Meeting, Document JCTVC-A033, 30 pages, Apr. 15-23, 2010.
Smolic, A. et al., "Development of a New MPEG Standard for Advanced 3D Video Applications", Proc. IEEE ISPA, pp. 400-407, 2009.
Merkle, P., "CE6.H Results on Simplified Wedgelet Search for DMM Modes 1 and 3", ITU-T SG16 WP 3 and ISO/IEC JTC 1/SC 29/WG 11, 2nd Meeting, Document JCT3V-B0039, 7 pages, 2012.
Ostermann, J., "Coding of Binary Shape in MPEG-4", ITG Fachberichte, pp. 659-662, 1997.
Yang W. et al., "An MPEG-4-Compatible Stereoscopic/Multiview Video Coding Scheme", IEEE Transactions on Circuits and Systems for Video Technology, vol. 16, No. 2, pp. 286-290, 2006.
ITU-T Recommendation H.264, Series H: Audiovisual and Multimedia Systems, Infrastructure of Audiovisual Services-Coding of Moving Video, ISO/IEC JTC 1, 14496-10, 732 pages, Apr. 2013.
Official Communication issued in corresponding International Application PCT/EP2012/072326, mailed on Feb. 13, 2013.

\* cited by examiner

EFFECTIVE WEDGELET PARTITION CODING USING SPATIAL PREDICTION

CROSS-REFERENCE TO RELATED APPLICATIONS

This application is a continuation of copending International Application No. PCT/EP2012/072326, filed Nov. 9, 2012, which is incorporated herein by reference in its entirety, and additionally claims priority from U.S. Provisional Application No. 61/558,630, filed Nov. 11, 2011, which is also incorporated herein by reference in its entirety.

BACKGROUND OF THE INVENTION

The present invention is concerned with sample array coding using wedgelet separation.

Many coding schemes compress sample array data using a subdivision of the sample array into blocks. The sample array may define a spatial sampling of texture, i.e. pictures, but of course other sample arrays may be compressed using similar coding techniques, such as depth maps and the like. Owing to the different nature of the information spatially sampled by the respective sample array, different coding concepts are best suited for the different kinds of sample arrays. Irrespective of the kind of sample array, however, many of these coding concepts use block-subdivisioning in order to assign individual coding options to the blocks of the sample array, thereby finding a good tradeoff between side information rate for coding the coding parameters assigned to the individual blocks on the one hand and the residual coding rate for coding the prediction residual due to misprediction of the respective block, or finding a good comprise in rate/distortion sense, with or without residual coding.

Mostly, blocks are of rectangular or quadratic shape. Obviously, it would be favorable to be able to adapt the shape of the coding units (blocks) to the content of the sample array to be coded. Unfortunately, however, adapting the shape of the blocks or coding units to the sample array content involves spending additional side information for signaling the block partitioning. Wedgelet-type partitioning of blocks has been found to be an appropriate compromise between the possible block partitioning shapes, and the involved side information overhead. Wedgelet-type partitioning leads to a partitioning of the blocks into wedgelet partitions for which, for example, specific coding parameters may be used.

However, even the restriction to wedgelet partitioning leads to a significant amount of additional overhead for signaling the partitioning of blocks, and accordingly it would be favorable to have a more effective coding concept at hand which enables a higher degree of freedom in partitioning blocks in sample array coding in a more efficient way.

SUMMARY

According to an embodiment, a decoder for reconstructing a sample array from a data stream may be configured to: predict a first block of the sample array using intra-prediction by filling the first block by copying reconstructed values of samples of the sample array, neighboring the first block, along an intra-prediction direction into the first block, derive a position of a wedgelet separation line within a second block neighboring the first block by setting an extension direction of the wedgelet separation line within the second block depending on the intra-prediction direction, the wedgelet separation line dividing the second block into first and second wedgelet partitions, and decode the second block in units of the first and second wedgelet partitions.

According to another embodiment, an encoder for encoding a sample array into a data stream may be configured to: predict a first block of the sample array using intra-prediction by filling the first block by copying values of already encoded samples of the sample array, neighboring the first block, along an intra-prediction direction into the first block, derive a position of a wedgelet separation line within a second block neighboring the first block by setting an extension direction of the wedgelet separation line within the second block depending on the intra-prediction direction, the wedgelet separation line dividing the second block into first and second wedgelet partitions, and encode the second block in units of the first and second wedgelet partitions.

According to another embodiment, an encoder for encoding a sample array into a data stream may be configured to: derive a position of a wedgelet separation line within a predetermined block of the sample array by placing a starting point of the wedgelet separation line at a position of a maximum change between consecutive ones of a sequence of values of already encoded samples of a line of samples extending adjacent to the predetermined block along a portion of a circumference of the predetermined block, the wedgelet separation line dividing the predetermined block into first and second wedgelet partitions, and encode the predetermined block in units of the first and second wedgelet partitions.

According to another embodiment, a method for reconstructing a sample array from a data stream may have the steps of: predicting a first block of the sample array using intra-prediction by filling the first block by copying reconstructed values of samples of the sample array, neighboring the first block, along an intra-prediction direction into the first block, deriving a position of a wedgelet separation line within a second block neighboring the first block by setting an extension direction of the wedgelet separation line within the second block depending on the intra-prediction direction, the wedgelet separation line dividing the second block into first and second wedgelet partitions, and decoding the second block in units of the first and second wedgelet partitions.

According to still another embodiment, a method for reconstructing a sample array from a data stream may have the steps of: deriving a position of a wedgelet separation line within a predetermined block of the sample array by placing a starting point of the wedgelet separation line at a position of a maximum change between consecutive ones of a sequence of reconstructed values of samples of a line of samples extending adjacent to the predetermined block along a portion of a circumference of the predetermined block, the wedgelet separation line dividing the predetermined block into first and second wedgelet partitions, and decoding the predetermined block in units of the first and second wedgelet partitions.

According to another embodiment, a method for encoding a sample array into a data stream may have the steps of: predicting a first block of the sample array using intra-prediction by filling the first block by copying values of already encoded samples of the sample array, neighboring the first block, along an intra-prediction direction into the first block, deriving a position of a wedgelet separation line within a second block neighboring the first block by setting an extension direction of the wedgelet separation line within the second block depending on the intra-prediction direction, the wedgelet separation line dividing the second block into first and second wedgelet partitions, and encoding the second block in units of the first and second wedgelet partitions.

According to another embodiment, a method for encoding a sample array into a data stream may have the steps of: deriving a position of a wedgelet separation line within a predetermined block of the sample array by placing a starting point of the wedgelet separation line at a position of a maximum change between consecutive ones of a sequence of values of already encoded samples of a line of samples extending adjacent to the predetermined block along a portion of a circumference of the predetermined block, the wedgelet separation line dividing the predetermined block into first and second wedgelet partitions, and encoding the predetermined block in units of the first and second wedgelet partitions.

Another embodiment may have a computer program having a program code for performing, when running on a computer, the above methods for encoding a sample array.

The main idea underlying the present invention is that the position of wedgelet separation lines may be predicted from the block's neighborhood, thereby reducing side information rate. In accordance with a first aspect for example, the intra prediction direction of a neighboring, intra-predicted block is used in order to predict the extension direction of the wedgelet separation line of a current block, thereby reducing the side information rate necessitated in order to convey the partitioning information. In accordance with a second aspect, the idea is that previously reconstructed samples, i.e. reconstructed values of blocks preceding the current block in accordance with the coding/decoding order allow for at least a prediction of a correct placement of a starting point of the wedgelet separation line, namely by placing the starting point of the wedgelet separation line at a position of a maximum change between consecutive ones of a sequence of reconstructed values of samples of a line of samples extending adjacent to the current block along a circumference thereof. Both aspects may be used individually or in combination.

BRIEF DESCRIPTION OF THE DRAWINGS

Embodiments of the present invention are described in more detail below with respect to the figures, among which

DETAILED DESCRIPTION OF THE INVENTION

Figure 1:
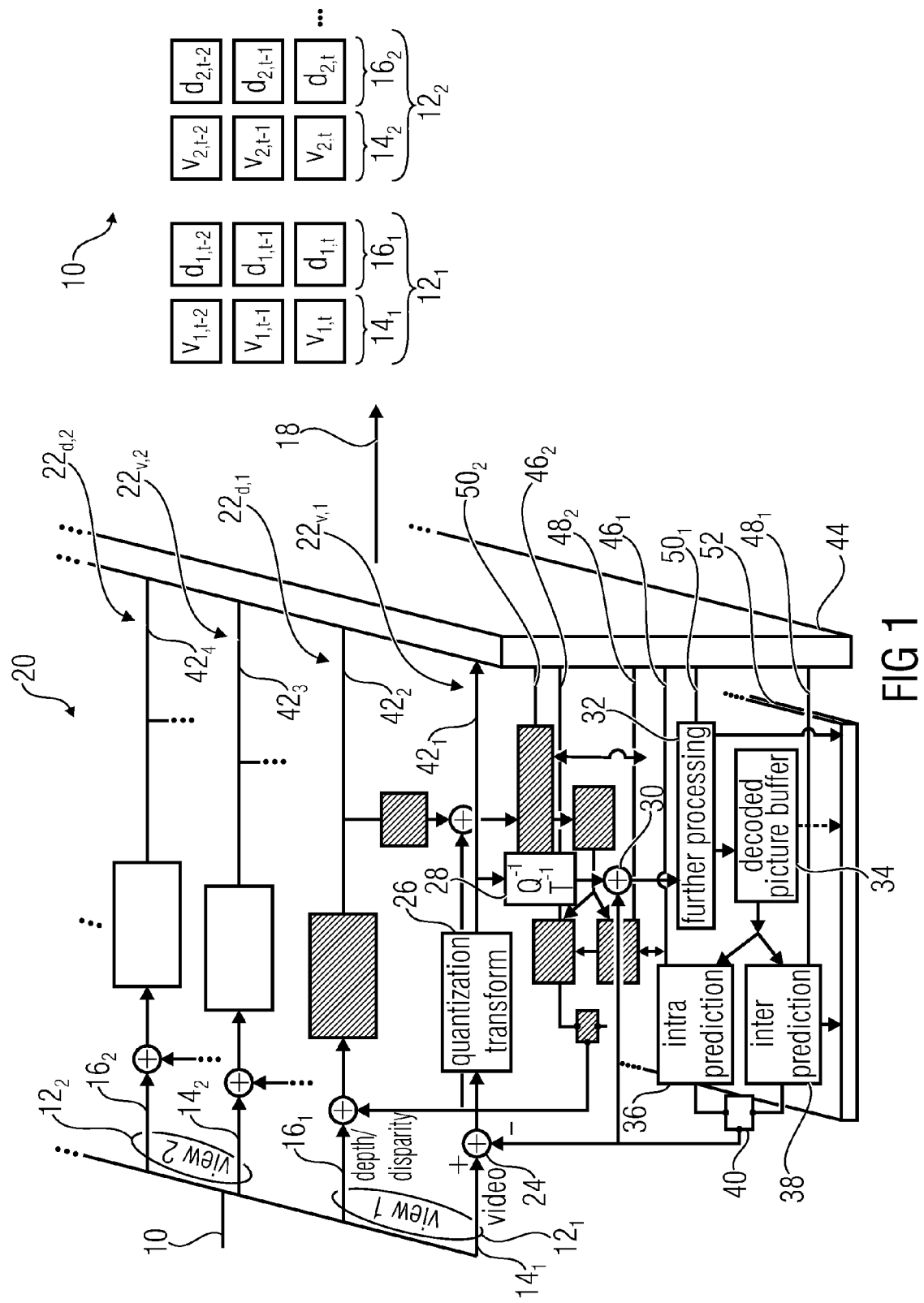
FIG. 1 shows a block diagram of an multi-view encoder into which embodiments of the present invention could be built in accordance with an example.

The following description of embodiments of the present invention starts with a possible environment into which embodiments of the present invention may be advantageously employed. In particular, a multi-view codec according to an embodiment is described with respect to FIGS. 1 to 3. However, it should be emphasized that the embodiments described thereinafter are not restricted to multi-view coding. Nevertheless, some aspects described further below may be better understood, and have special synergies, when used with multi-view coding, or, to be more precise, especially with the coding of depth maps. Accordingly, after FIGS. 1 to 3, the description proceeds with an introduction into irregular block partitioning and the problems involved therewith. This description refers to FIGS. 4 to 11 and forms a basis for the description of the embodiments of the present invention described after that.

As just said, the embodiments further outlined below use non-rectangular or irregular block partitioning and modeling functions in image and video coding applications and are particularly applicable to the coding of depth maps, such as for representing the geometry of a scene, although these embodiments would also be applicable to conventional image and video coding. The embodiments further outlined below further provide a concept for using non-rectangular block partitioning and modeling function in image and video coding applications. The embodiments are particularly applicable to the coding of depth maps (for representing the geometry of a scene), but are is also applicable to conventional image and video coding.

In multi-view video coding, two or more views of a video scene (which are simultaneously captured by multiple cameras) are coded in a single bitstream. The primary goal of multi-view video coding is to provide the end user with an advanced multimedia experience by offering a 3-d viewing impression. If two views are coded, the two reconstructed video sequences can be displayed on a conventional stereo display (with glasses). However, the necessitated usage of glasses for conventional stereo displays is often annoying for the user. Enabling a high-quality stereo viewing impression without glasses is currently an important topic in research and development. A promising technique for such autostereoscopic displays is based on lenticular lens systems. In principle, an array of cylindrical lenses is mounted on a conventional display in a way that multiple views of a video scene are displayed at the same time. Each view is displayed in a small cone, so that each eye of the user sees a different image; this effect creates the stereo impression without special glasses. However, such autosteroscopic displays necessitate typically 10-30 views of the same video scene (even more views may be necessitated if the technology is improved further). More than 2 views can also be used for providing the user with the possibility to interactively select the viewpoint for a video scene. But the coding of multiple views of a video scene drastically increases the necessitated bit rate in comparison to conventional single-view (2-d) video. Typically, the necessitated bit rate increases approximately linearly way with the number of coded views. A concept for reducing the amount of transmitted data for autostereoscopic displays consists of transmitting only a small number of views (perhaps 2-5 views), but additionally transmitting so-called depth maps, which represent the depth (distance of the real world object to the camera) of the image samples for one or more views. Given a small number of coded views with corresponding depth maps, high-quality intermediate views (virtual views that lie between the coded views)—and to some extend also additional views to one or both ends of the camera array—can be created at the receiver side by a suitable rendering techniques.

In state-of-the-art image and video coding, the pictures or particular sets of sample arrays for the pictures are usually decomposed into blocks, which are associated with particular coding parameters. The pictures usually consist of multiple sample arrays (luminance and chrominance). In addition, a picture may also be associated with additional auxiliary samples arrays, which may, for example, specify transparency information or depth maps. Each picture or sample array is usually decomposed into blocks. The blocks (or the corresponding blocks of sample arrays) are predicted by either inter-picture prediction or intra-picture prediction. The blocks can have different sizes and can be either quadratic or rectangular. The partitioning of a picture into blocks can be either fixed by the syntax, or it can be (at least partly) signaled inside the bitstream. Often syntax elements are transmitted that signal the subdivision for blocks of predefined sizes. Such syntax elements may specify whether and how a block is subdivided into smaller blocks and being associated coding parameters, e.g. for the purpose of prediction. For all samples of a block (or the corresponding blocks of sample arrays) the decoding of the associated coding parameters is specified in a certain way. In the example, all samples in a block are predicted using the same set of prediction parameters, such as reference indices (identifying a reference picture in the set of already coded pictures), motion parameters (specifying a measure for the movement of a blocks between a reference picture and the current picture), parameters for specifying the interpolation filter, intra prediction modes, etc. The motion parameters can be represented by displacement vectors with a horizontal and vertical component or by higher order motion parameters such as affine motion parameters consisting of six components. It is also possible that more than one set of particular prediction parameters (such as reference indices and motion parameters) are associated with a single block. In that case, for each set of these particular prediction parameters, a single intermediate prediction signal for the block (or the corresponding blocks of sample arrays) is generated, and the final prediction signal is built by a combination including superimposing the intermediate prediction signals. The corresponding weighting parameters and potentially also a constant offset (which is added to the weighted sum) can either be fixed for a picture, or a reference picture, or a set of reference pictures, or they can be included in the set of prediction parameters for the corresponding block. The difference between the original blocks (or the corresponding blocks of sample arrays) and their prediction signals, also referred to as the residual signal, is usually transformed and quantized. Often, a two-dimensional transform is applied to the residual signal (or the corresponding sample arrays for the residual block). For transform coding, the blocks (or the corresponding blocks of sample arrays), for which a particular set of prediction parameters has been used, can be further split before applying the transform. The transform blocks can be equal to or smaller than the blocks that are used for prediction. It is also possible that a transform block includes more than one of the blocks that are used for prediction. Different transform blocks can have different sizes and the transform blocks can represent quadratic or rectangular blocks. After transform, the resulting transform coefficients are quantized and so-called transform coefficient levels are obtained. The transform coefficient levels as well as the prediction parameters and, if present, the subdivision information is entropy coded.

Also state-of-the-art coding techniques such as ITU-T Rec. H.264 |ISO/IEC JTC 1 14496-10 or the current working model for HEVC are also applicable to depth maps, the coding tools have been particularly design for the coding of natural video. Depth maps have different characteristics as pictures of a natural video sequence. For example, depth maps contain less spatial detail. They are mainly characterized by sharp edges (which represent object border) and large areas of nearly constant or slowly varying sample values (which represent object areas). The overall coding efficiency of multi-view video coding with depth maps can be improved if the depth maps are coded more efficiently by applying coding tools that are particularly designed for exploiting the properties of depth maps.

In order to serve as a basis for a possible coding environment, in which the subsequently explained embodiments of the present invention may be advantageously used, a possible multi-view coding concept is described further below with regard to FIGS. 1 to 3.

FIG. 1 shows an encoder for encoding a multi-view signal in accordance with an embodiment. The multi-view signal of FIG. 1 is illustratively indicated at 10 as comprising two views 12$_1$ and 12$_2$, although the embodiment of FIG. 1 would also be feasible with a higher number of views. Further, in accordance with the embodiment of FIG. 1, each view 12$_1$ and 12$_2$ comprises a video 14 and depth/disparity map data 16, although many of the advantageous principles of the embodiments described further below could also be advantageous if used in connection with multi-view signals with views not comprising any depth/disparity map data.

The video 14 of the respective views $12_1$ and $12_2$ represent a spatio-temporal sampling of a projection of a common scene along different projection/viewing directions. Advantageously, the temporal sampling rate of the videos 14 of the views $12_1$ and $12_2$ are equal to each other although this constraint does not have to be necessarily fulfilled. As shown in FIG. 1, advantageously each video 14 comprises a sequence of frames with each frame being associated with a respective time stamp t, t−1, t−2, . . . . In FIG. 1 the video frames are indicated by $v_{view\ number,\ time\ stamp\ number}$. Each frame $v_{i,t}$ represents a spatial sampling of the scene i along the respective view direction at the respective time stamp t, and thus comprises one or more sample arrays such as, for example, one sample array for luma samples and two sample arrays with chroma samples, or merely luminance samples or sample arrays for other color components, such as color components of an RGB color space or the like. The spatial resolution of the one or more sample arrays may differ both within one video 14 and within videos 14 of different views $12_1$ and $12_2$.

Similarly, the depth/disparity map data 16 represents a spatio-temporal sampling of the depth of the scene objects of the common scene, measured along the respective viewing direction of views $12_1$ and $12_2$. The temporal sampling rate of the depth/disparity map data 16 may be equal to the temporal sampling rate of the associated video of the same view as depicted in FIG. 1, or may be different therefrom. In the case of FIG. 1, each video frame v has associated therewith a respective depth/disparity map d of the depth/disparity map data 16 of the respective view $12_1$ and $12_2$. In other words, in the example of FIG. 1, each video frame $v_{i,t}$ of view i and time stamp t has a depth/disparity map $d_{i,t}$ associated therewith. With regard to the spatial resolution of the depth/disparity maps d, the same applies as denoted above with respect to the video frames. That is, the spatial resolution may be different between the depth/disparity maps of different views.

In order to compress the multi-view signal 10 effectively, the encoder of FIG. 1 parallelly encodes the views $12_1$ and $12_2$ into a data stream 18. However, coding parameters used for encoding the first view $12_1$ are re-used in order to adopt same as, or predict, second coding parameters to be used in encoding the second view $12_2$. By this measure, the encoder of FIG. 1 exploits the fact, according to which parallel encoding of views $12_1$ and 12 results in the encoder determining the coding parameters for these views similarly, so that redundancies between these coding parameters may be exploited effectively in order to increase the compression rate or rate/distortion ratio (with distortion measured, for example, as a mean distortion of both views and the rate measured as a coding rate of the whole data stream 18).

In particular, the encoder of FIG. 1 is generally indicated by reference sign 20 and comprises an input for receiving the multi-view signal 10 and an output for outputting the data stream 18. As can be seen in FIG. 2, the encoder 20 of FIG. 1 comprises two coding branches per view $12_1$ and $12_2$, namely one for the video data and the other for the depth/disparity map data. Accordingly, the encoder 20 comprises a coding branch $22_{v,1}$ for the video data of view 1, a coding branch $22_{d,1}$ for the depth disparity map data of view 1, a coding branch $22_{v,2}$ for the video data of the second view and a coding branch $22_{d,2}$ for the depth/disparity map data of the second view. Each of these coding branches 22 is constructed similarly. In order to describe the construction and functionality of encoder 20, the following description starts with the construction and functionality of coding branch $22_{v,1}$. This functionality is common to all branches 22. Afterwards, the individual characteristics of the branches 22 are discussed.

The coding branch $22_{v,1}$ is for encoding the video $14_1$ of the first view $12_1$ of the multi-view signal 12, and accordingly branch $22_{v,1}$ has an input for receiving the video $14_1$. Beyond this, branch $22_{v,1}$ comprises, connected in series to each other in the order mentioned, a subtractor 24, a quantization/transform module 26, a requantization/inverse-transform module 28, an adder 30, a further processing module 32, a decoded picture buffer 34, two prediction modules 36 and 38 which, in turn, are connected in parallel to each other, and a combiner or selector 40 which is connected between the outputs of the prediction modules 36 and 38 on the one hand the inverting input of subtractor 24 on the other hand. The output of combiner 40 is also connected to a further input of adder 30. The non-inverting input of subtractor 24 receives the video $14_1$.

The elements 24 to 40 of coding branch $22_{v,1}$ cooperate in order to encode video $14_1$. The encoding encodes the video $14_1$ in units of certain portions. For example, in encoding the video $14_1$, the frames $v_{1,k}$ are segmented into segments such as blocks or other sample groups. The segmentation may be constant over time or may vary in time. Further, the segmentation may be known to encoder and decoder by default or may be signaled within the data stream 18. The segmentation may be a regular segmentation of the frames into blocks such as a non-overlapping arrangement of blocks in rows and columns, or may be a quad-tree based segmentation into blocks of varying size. A currently encoded segment of video $14_1$ entering at the non-inverting input of subtractor 24 is called a current block of video $14_1$ in the following description of FIGS. 1 to 3.

Prediction modules 36 and 38 are for predicting the current block and to this end, prediction modules 36 and 38 have their inputs connected to the decoded picture buffer 34. In effect, both prediction modules 36 and 38 use previously reconstructed portions of video $14_1$ residing in the decoded picture buffer 34 in order to predict the current block entering the non-inverting input of subtractor 24. In this regard, prediction module 36 acts as an intra predictor spatially predicting the current portion of video $14_1$ from spatially neighboring, already reconstructed portions of the same frame of the video $14_1$, whereas the prediction module 38 acts as an inter predictor temporally predicting the current portion from previously reconstructed frames of the video $14_1$. Both modules 36 and 38 perform their predictions in accordance with, or described by, certain prediction parameters. To be more precise, the latter parameters are determined be the encoder 20 in some optimization framework for optimizing some optimization aim such as optimizing a rate/distortion ratio under some, or without any, constraints such as maximum bitrate.

For example, the intra prediction module 36 may determine spatial prediction parameters for the current portion such as an intra prediction direction along which content of neighboring, already reconstructed portions of the same frame of video $14_1$ is expanded/copied into the current portion to predict the latter.

The inter prediction module 38 may use motion compensation so as to predict the current portion from previously reconstructed frames and the inter prediction parameters involved therewith may comprise a motion vector, a reference frame index, a motion prediction subdivision information regarding the current portion, a hypothesis number or any combination thereof.

The combiner 40 may combine one or more of predictions provided by modules 36 and 38 or select merely one thereof. The combiner or selector 40 forwards the resulting prediction of the current portion to the inserting input of subtractor 24 and the further input of adder 30, respectively.

At the output of subtractor 24, the residual of the prediction of the current portion is output and quantization/transform module 36 is configured to transform this residual signal with quantizing the transform coefficients. The transform may be any spectrally decomposing transform such as a DCT. Due to the quantization, the processing result of the quantization/transform module 26 is irreversible. That is, coding loss results. The output of module 26 is the residual signal $42_1$ to be transmitted within the data stream. Not all blocks may be subject to residual coding. Rather, some coding modes may suppress residual coding.

The residual signal $42_1$ is dequantized and inverse transformed in module 28 so as to reconstruct the residual signal as far as possible, i.e. so as to correspond to the residual signal as output by subtractor 24 despite the quantization noise. Adder 30 combines this reconstructed residual signal with the prediction of the current portion by summation. Other combinations would also be feasible. For example, the subtractor 24 could operate as a divider for measuring the residuum in ratios, and the adder could be implemented as a multiplier to reconstruct the current portion, in accordance with an alternative. The output of adder 30, thus, represents a preliminary reconstruction of the current portion. Further processing, however, in module 32 may optionally be used to enhance the reconstruction. Such further processing may, for example, involve deblocking, adaptive filtering and the like. All reconstructions available so far are buffered in the decoded picture buffer 34. Thus, the decoded picture buffer 34 buffers previously reconstructed frames of video $14_1$ and previously reconstructed portions of the current frame which the current portion belongs to.

In order to enable the decoder to reconstruct the multi-view signal from data stream 18, quantization/transform module 26 forwards the residual signal $42_1$ to a multiplexer 44 of encoder 20. Concurrently, prediction module 36 forwards intra prediction parameters $46_1$ to multiplexer 44, inter prediction module 38 forwards inter prediction parameters $48_1$ to multiplexer 44 and further processing module 32 forwards further-processing parameters $50_1$ to multiplexer 44 which, in turn, multiplexes or inserts all this information into data stream 18.

As became clear from the above discussion in accordance with the embodiment of FIG. 1, the encoding of video $14_1$ by coding branch $22_{v,1}$ is self-contained in that the encoding is independent from the depth/disparity map data $16_1$ and the data of any of the other views $12_2$. From a more general point of view, coding branch $22_{v,1}$ may be regarded as encoding video $14_1$ into the data stream 18 by determining coding parameters and, according to the first coding parameters, predicting a current portion of the video $14_1$ from a previously encoded portion of the video $14_1$, encoded into the data stream 18 by the encoder 20 prior to the encoding of the current portion, and determining a prediction error of the prediction of the current portion in order to obtain correction data, namely the above-mentioned residual signal $42_1$. The coding parameters and the correction data are inserted into the data stream 18.

The just-mentioned coding parameters inserted into the data stream 18 by coding branch $22_{v,1}$ may involve one, a combination of, or all of the following:

First, the coding parameters for video $14_1$ may define/signal the segmentation of the frames of video $14_1$ as briefly discussed before.

Further, the coding parameters may comprise coding mode information indicating for each segment or current portion, which coding mode is to be used to predict the respective segment such as intra prediction, inter prediction, or a combination thereof.

The coding parameters may also comprise the just-mentioned prediction parameters such as intra prediction parameters for portions/segments predicted by intra prediction, and inter prediction parameters for inter predicted portions/segments.

The coding parameters may, however, additionally comprise further-processing parameters $50_1$ signaling to the decoding side how to further process the already reconstructed portions of video $14_1$ before using same for predicting the current or following portions of video $14_1$. These further processing parameters $50_1$ may comprise indices indexing respective filters, filter coefficients or the like.

The prediction parameters $46_1$, $48_1$ and the further processing parameters $50_1$ may even additionally comprise sub-segmentation data in order to define a further sub-segmentation relative to the aforementioned segmentation defining the granularity of the mode selection, or defining a completely independent segmentation such as for the appliance of different adaptive filters for different portions of the frames within the further-processing.

Coding parameters may also influence the determination of the residual signal and thus, be part of the residual signal $42_1$. For example, spectral transform coefficient levels output by quantization/transform module 26 may be regarded as correction data, whereas the quantization step size may be signaled within the data stream 18 as well, and the quantization step size parameter may be regarded as a coding parameter.

The coding parameters may further define prediction parameters defining a second-stage prediction of the prediction residual of the first prediction stage discussed above. Intra/inter prediction may be used in this regard.

In order to increase the coding efficiency, encoder 20 comprises a coding information exchange module 52 which receives all coding parameters and further information influencing, or being influenced by, the processing within modules 36, 38 and 32, for example, as illustratively indicated by vertically extending arrows pointing from the respective modules down to coding information exchange module 52. The coding information exchange module 52 is responsible for sharing the coding parameters and optionally further coding information among the coding branches 22 so that the branches may predict or adopt coding parameters from each other. In the embodiment of FIG. 1, an order is defined among the data entities, namely video and depth/disparity map data, of the views $12_1$ and $12_2$ of multi-view signal 10 to this end. In particular, the video $14_1$ of the first view $12_1$ precedes the depth/disparity map data $16_1$ of the first view followed by the video $14_2$ and then the depth/disparity map data $16_2$ of the second view $12_2$ and so forth. It should be noted here that this strict order among the data entities of multi-view signal 10 does not need to be strictly applied for the encoding of the entire multi-view signal 10, but for the sake of an easier discussion, it is assumed in the following that this order is constant. The order among the data entities, naturally, also defines an order among the branches 22 which are associated therewith.

As already denoted above, the further coding branches 22 such as coding branch $22_{d,1}$, $22_{v,2}$ and $22_{d,2}$ act similar to coding branch $22_{v,1}$ in order to encode the respective input $16_1$, $14_2$ and $16_2$, respectively. However, due to the just-mentioned order among the videos and depth/disparity map data of views $12_1$ and $12_2$, respectively, and the corresponding order defined among the coding branches 22, coding branch $22_{d,1}$ has, for example, additional freedom in predicting coding parameters to be used for encoding current portions of the depth/disparity map data $16_1$ of the first view $12_1$. This is because of the afore-mentioned order among video and depth/disparity map data of the different views: For example, each of these entities is allowed to be encoded using reconstructed portions of itself as well as entities thereof preceding in the afore-mentioned order among these data entities. Accordingly, in encoding the depth/disparity map data $16_1$, the coding branch $22_{d,1}$ is allowed to use information known from previously reconstructed portions of the corresponding video $14_1$. How branch $22_{d,1}$ exploits the reconstructed portions of the video $14_1$ in order to predict some property of the depth/disparity map data $16_1$, which enables a better compression rate of the compression of the depth/disparity map data $16_1$, is theoretically unlimited. Coding branch $22_{d,1}$ is, for example, able to predict/adopt coding parameters involved in encoding video $14_1$ as mentioned above, in order to obtain coding parameters for encoding the depth/disparity map data $16_1$. In case of adoption, the signaling of any coding parameters regarding the depth/disparity map data $16_1$ within the data stream 18 may be suppressed. In case of prediction, merely the prediction residual/correction data regarding these coding parameters may have to be signaled within the data stream 18. Examples for such prediction/adoption of coding parameters is described further below, too.

Remarkably, the coding branch $22_{d,1}$ may have additional coding modes available to code blocks of depth/disparity map $16_1$, in addition to the modes described above with respect to modules 36 and 38. Such additional coding modes are described further below and concern irregular block partitioning modes. In an alternative view, irregular partitioning as described below may be seen as a continuation of the subdivision of the depth/disparity map into blocks/partitions.

In any case, additional prediction capabilities are present for the subsequent data entities, namely video $14_2$ and the depth/disparity map data $16_2$ of the second view $12_2$. Regarding these coding branches, the inter prediction module thereof is able to not only perform temporal prediction, but also inter-view prediction. The corresponding inter prediction parameters comprise similar information as compared to temporal prediction, namely per inter-view predicted segment, a disparity vector, a view index, a reference frame index and/or an indication of a number of hypotheses, i.e. the indication of a number of inter predictions participating in forming the inter-view inter prediction by way of summation, for example. Such inter-view prediction is available not only for branch $22_{v,2}$ regarding the video $14_2$, but also for the inter prediction module 38 of branch $22_{d,2}$ regarding the depth/disparity map data $16_2$. Naturally, these inter-view prediction parameters also represent coding parameters which may serve as a basis for adoption/prediction for subsequent view data of a possible third view which is, however, not shown in FIG. 1.

Due to the above measures, the amount of data to be inserted into the data stream 18 by multiplexer 44 is further lowered. In particular, the amount of coding parameters of coding branches $22_{d,1}$, $22_{v,2}$ and $22_{d,2}$ may be greatly reduced by adopting coding parameters of preceding coding branches or merely inserting prediction residuals relative thereto into the data stream 28 via multiplexer 44. Due to the ability to choose between temporal and inter-view prediction, the amount of residual data $42_3$ and $42_4$ of coding branches $22_{v,2}$ and $22_{d,2}$ may be lowered, too. The reduction in the amount of residual data over-compensates the additional coding effort in differentiating temporal and inter-view prediction modes.

Figure 2:
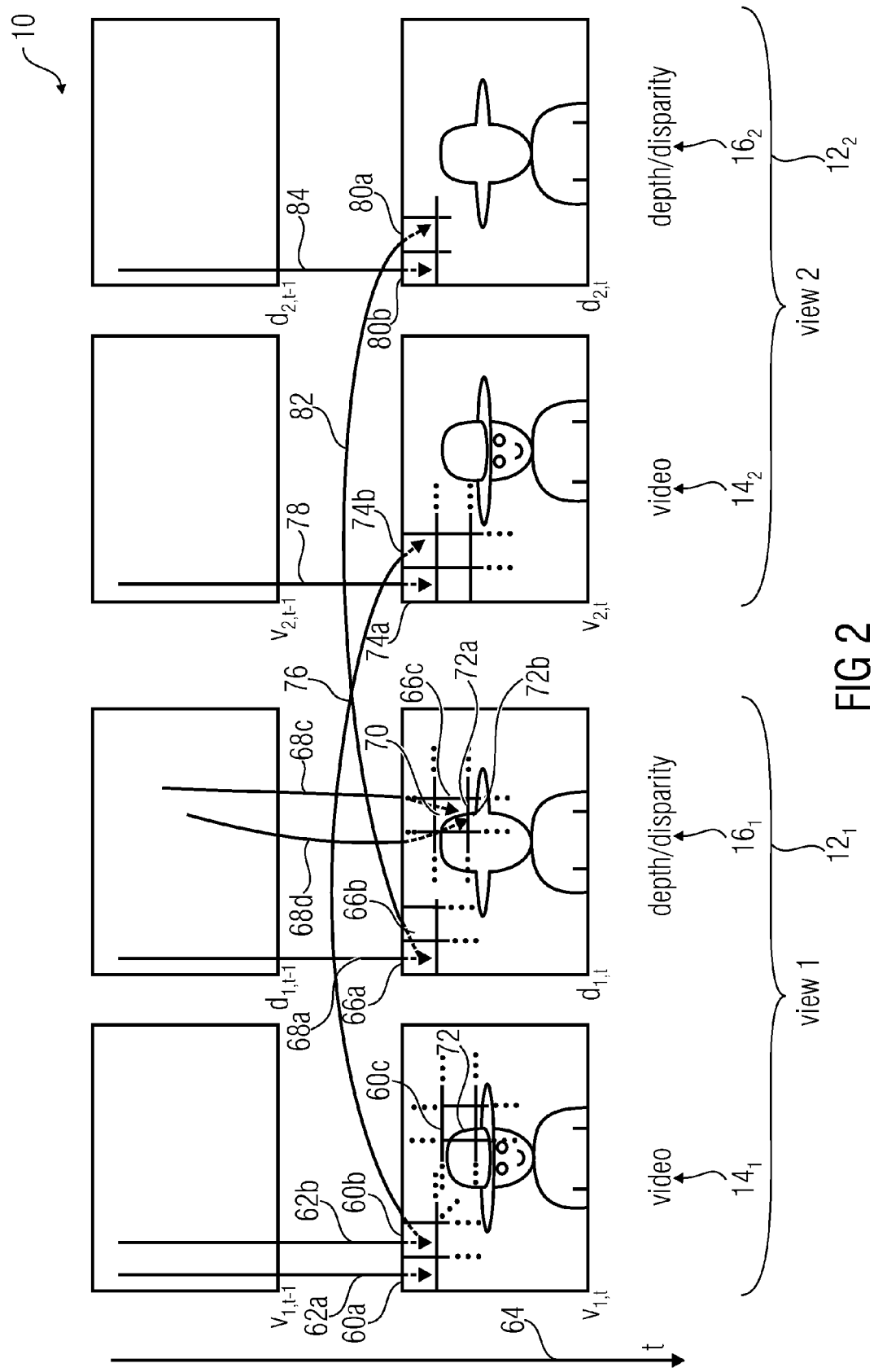
FIG. 2 shows a schematic diagram of a portion of a multi-view signal for illustration of information reuse across views and video depth/disparity boundaries.

In order to explain the principles of coding parameter adoption/prediction in more detail, reference is made to FIG. 2. FIG. 2 shows an exemplary portion of the multi-view signal 10. FIG. 2 illustrates video frame $v_{1,t}$ as being segmented into segments or portions 60a, 60b and 60c. For simplification reasons, only three portions of frame $v_{1,t}$ are shown, although the segmentation may seamlessly and gaplessly divide the frame into segments/portions. As mentioned before, the segmentation of video frame $v_{1,t}$ may be fixed or vary in time, and the segmentation may be signaled within the data stream or not. FIG. 2 illustrates that portions 60a and 60b are temporally predicted using motion vectors 62a and 62b from a reconstructed version of any reference frame of video $14_1$, which in the present case is exemplarily frame $v_{1,t-1}$. As known in the art, the coding order among the frames of video $14_1$ may not coincide with the presentation order among these frames, and accordingly the reference frame may succeed the current frame $v_{1,t}$ in presentation time order 64. Portion 60c is, for example, an intra predicted portion for which intra prediction parameters are inserted into data stream 18.

In encoding the depth/disparity map $d_{1,t}$ the coding branch $22_{d,1}$ may exploit the above-mentioned possibilities in one or more of the below manners exemplified in the following with respect to FIG. 2.

For example, in encoding the depth/disparity map $d_{1,t}$, coding branch $22_{d,1}$ may adopt the segmentation of video frame $v_{1,t}$ as used by coding branch $22_{v,1}$. Accordingly, if there are segmentation parameters within the coding parameters for video frame $v_{1,t}$, the retransmission thereof for depth/disparity map data $d_{1,t}$ may be avoided. Alternatively, coding branch $22_{d,1}$ may use the segmentation of video frame $v_{1,t}$ as a basis/prediction for the segmentation to be used for depth/disparity map $d_{1,t}$ with signaling the deviation of the segmentation relative to video frame $v_{1,t}$ via the data stream 18. FIG. 2 illustrates the case that the coding branch $22_{d,1}$ Uses the segmentation of video frame $v_1$ as a pre-segmentation of depth/disparity map $d_{1,t}$. That is, coding branch $22_{d,1}$ adopts the pre-segmentation from the segmentation of video $v_{1,t}$ or predicts the pre-segmentation therefrom.

Further, coding branch $22_{d,1}$ may adopt or predict the coding modes of the portions 66a, 66b and 66c of the depth/disparity map $d_{1,t}$ from the coding modes assigned to the respective portion 60a, 60b and 60c in video frame $v_{1,t}$. In case of a differing segmentation between video frame $v_{1,t}$ and depth/disparity map $d_{1,t}$, the adoption/prediction of coding modes from video frame $v_{1,t}$ may be controlled such that the adoption/prediction is obtained from co-located portions of the segmentation of the video frame $v_{1,t}$. An appropriate definition of co-location could be as follows. The co-located portion in video frame $v_{1,t}$ for a current portion in depth/disparity map $d_{1,t}$, may, for example, be the one comprising the co-located position at the upper left corner of the current frame in the depth/disparity map $d_{1,t}$. In case of prediction of the coding modes, coding branch $22_{d,1}$ may signal the coding mode deviations of the portions 66a to 66c of the depth/disparity map $d_{1,t}$ relative to the coding modes within video frame $v_{1,t}$ explicitly signaled within the data stream 18.

As far as the prediction parameters are concerned, the coding branch $22_{d,1}$ has the freedom to spatially adopt or predict prediction parameters used to encode neighboring portions within the same depth/disparity map $d_{1,t}$ or to adopt/predict same from prediction parameters used to encode co-located portions 60a to 6c of video frame $v_{1,t}$. For example, FIG. 2 illustrates that portion 66a of depth/disparity map $d_{1,t}$ is an inter predicted portion, and the corresponding motion vector 68a may be adopted or predicted from the motion vector 62a of the co-located portion 60a of video frame $v_{1,t}$. In case of prediction, merely the motion vector difference is to be inserted into the data stream 18 as part of inter prediction parameters $48_2$.

In terms of coding efficiency, it might be favorable for the coding branch $22_{d,1}$ to have the ability to subdivide segments of the pre-segmentation of the depth/disparity map $d_{1,t}$ using irregular block partitioning. Some irregular block partitioning modes which the embodiments described further below refer to, derive a partition information such as a wedgelet separation line 70, from the reconstructed picture $v_{1,t}$ of the same view. By this measure, a block of the pre-segmentation of the depth/disparity map $d_{1,t}$ is subdivided. For example, the block 66c of depth/disparity map $d_{1,t}$ is subdivided into two wedgelet-shaped partitions 72a and 72b. Coding branch $22_{d,1}$ may be configured to encode these sub-segments 72a and 72b separately. In the case of FIG. 2, both sub-segments 72a and 72b are exemplarily shown to be inter predicted using respective motion vectors 68c and 68d. According to sections 3 and 4, the coding branch $22_{d,1}$ may have the freedom to choose between several coding options for irregular block partitioning, and to signal the choice to the decoder as side information within the data stream 18.

In encoding the video $14_2$, the coding branch $22_{v,2}$ has, in addition to the coding mode options available for coding branch $22_{v,1}$ the option of inter-view prediction.

FIG. 2 illustrates, for example, that a portion 64b of the segmentation of the video frame $v_{2,t}$ is inter-view predicted from the temporally corresponding video frame $v_{1,t}$ of first view video $14_1$ using a disparity vector 76.

Despite this difference, coding branch $22_{v,2}$ may additionally exploit all of the information available form the encoding of video frame $v_{1,t}$ and depth/disparity map $d_{1,t}$ such as, in particular, the coding parameters used in these encodings. Accordingly, coding branch $22_{v,2}$ may adopt or predict the motion parameters including motion vector 78 for a temporally inter predicted portion 74a of video frame $v_{2,t}$ from any or, or a combination of, the motion vectors 62a and 68a of co-located portions 60a and 66a of the temporally aligned video frame $v_{1,t}$ and depth/disparity map $d_{1,t}$ respectively. If ever, a prediction residual may be signaled with respect to the inter prediction parameters for portion 74a. In this regard, it should be recalled that the motion vector 68a may have already been subject to prediction/adoption from motion vector 62a itself.

The other possibilities of adopting/predicting coding parameters for encoding video frame $v_{2,t}$ as described above with respect to the encoding of depth/disparity map $d_{1,t}$ are applicable to the encoding of the video frame $v_{2,t}$ by coding branch $22_{v,2}$ as well, with the available common data distributed by module 52 being, however, increased because the coding parameters of both the video frame $v_{1,t}$ and the corresponding depth/disparity map $d_{1,t}$ are available.

Then, coding branch $22_{d,2}$ encodes the depth/disparity map $d_{2,t}$ similarly to the encoding of the depth/disparity map $d_{1,t}$ by coding branch $22_{d,1}$. This is true, for example, with respect to all of the coding parameter adoption/prediction occasions from the video frame $v_{2,t}$ of the same view $12_2$. Additionally, however, coding branch $22_{d,2}$ has the opportunity to also adopt/predict coding parameters from coding parameters having been used for encoding the depth/disparity map $d_{1,t}$ of the preceding view $12_1$. Additionally, coding branch $22_{d,2}$ may use inter-view prediction as explained with respect to the coding branch $22_{v,2}$.

After having described the encoder 20 of FIG. 1, it should be noted that same may be implemented in software, hardware or firmware, i.e. programmable hardware. Although the block diagram of FIG. 1 suggests that encoder 20 structurally comprises parallel coding branches, namely one coding branch per video and depth/disparity data of the multi-view signal 10, this does not need to be the case. For example, software routines, circuit portions or programmable logic portions configured to perform the tasks of elements 24 to 40, respectively, may be sequentially used to fulfill the tasks for each of the coding branches. In parallel processing, the processes of the parallel coding branches may be performed on parallel processor cores or on parallel running circuitries.

Figure 3:
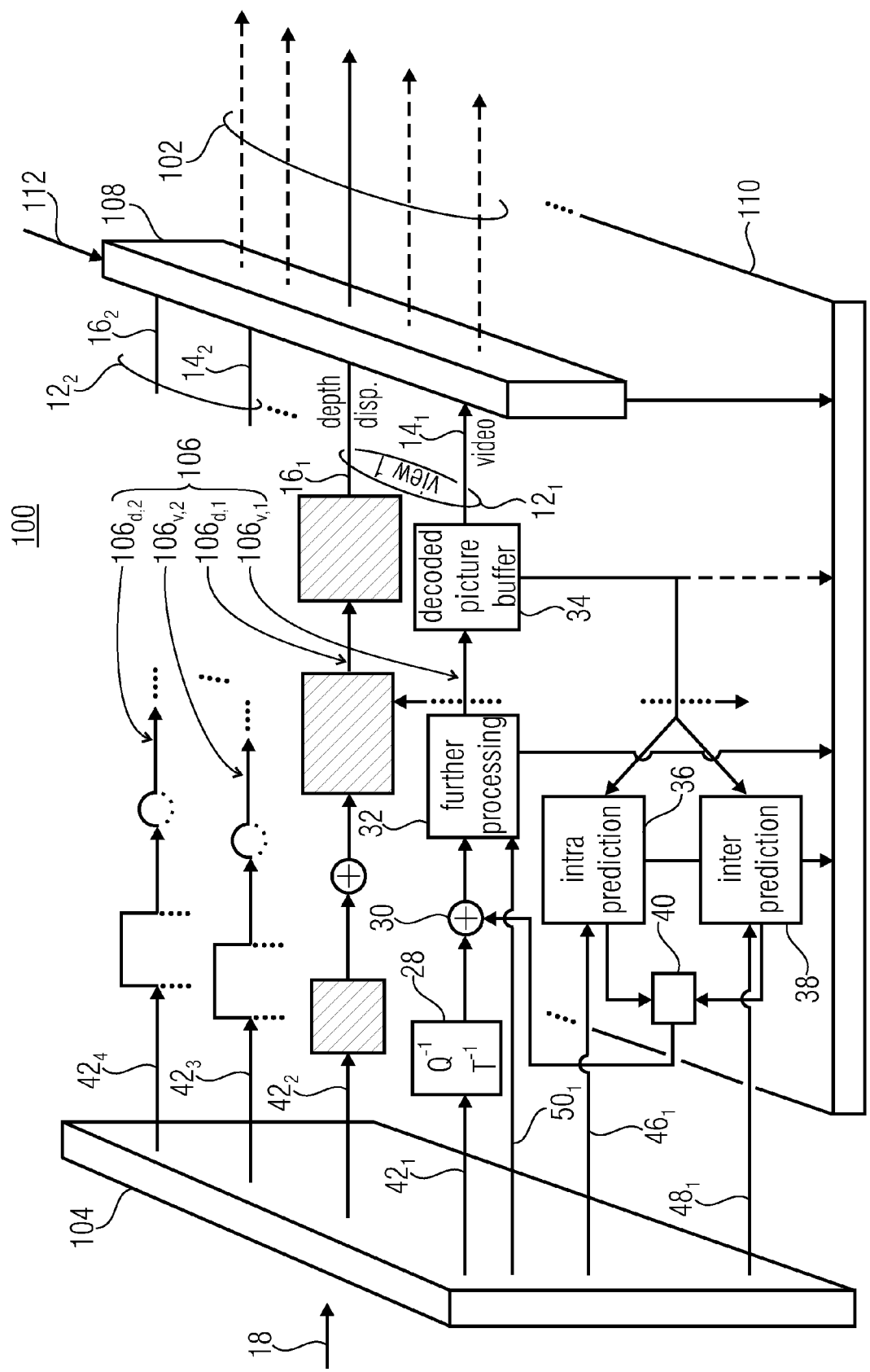
FIG. 3 shows a block diagram of a decoder fitting to FIG. 1.

FIG. 3 shows an example for a decoder capable of decoding data stream 18 so as to reconstruct one or several view videos corresponding to the scene represented by the multi-view signal from the data stream 18. To a large extent, the structure and functionality of the decoder of FIG. 3 is similar to the encoder of FIG. 20 so that reference signs of FIG. 1 have been re-used as far as possible to indicate that the functionality description provided above with respect to FIG. 1 also applies to FIG. 3.

The decoder of FIG. 3 is generally indicated with reference sign 100 and comprises an input for the data stream 18 and an output for outputting the reconstruction of the aforementioned one or several views 102. The decoder 100 comprises a demultiplexer 104 and a pair of decoding branches 106 for each of the data entities of the multi-view signal 10 (FIG. 1) represented by the data stream 18 as well as a view extractor 108 and a coding parameter exchanger 110. As it was the case with the encoder of FIG. 1, the decoding branches 106 comprise the same decoding elements in a same interconnection, which are, accordingly, representatively described with respect to the decoding branch $106_{v,1}$ responsible for the decoding of the video $14_1$ of the first view $12_1$. In particular, each coding branch 106 comprises an input connected to a respective output of the multiplexer 104 and an output connected to a respective input of view extractor 108 so as to output to view extractor 108 the respective data entity of the multi-view signal 10, i.e. the video $14_1$ in case of decoding branch $106_{v,1}$. In between, each coding branch 106 comprises a dequantization/inverse-transform module 28, an adder 30, a further processing module 32 and a decoded picture buffer 34 serially connected between the multiplexer 104 and view extractor 108. Adder 30, further-processing module 32 and decoded picture buffer 34 form a loop along with a parallel connection of prediction modules 36 and 38 followed by a combiner/selector 40 which are, in the order mentioned, connected between decoded picture buffer 34 and the further input of adder 30. As indicated by using the same reference numbers as in the case of FIG. 1, the structure and functionality of elements 28 to 40 of the decoding branches 106 are similar to the corresponding elements of the coding branches in FIG. 1 in that the elements of the decoding branches 106 emulate the processing of the coding process by use of the information conveyed within the data stream 18. Naturally, the decoding branches 106 merely reverse the coding procedure with respect to the coding parameters finally chosen by the encoder 20, whereas the encoder 20 of FIG. 1 has to find an optimum set of coding parameters in some optimization sense such as coding parameters optimizing a rate/distortion cost function with, optionally, being subject to certain constraints such as maximum bit rate or the like.

The demultiplexer 104 is for distributing the data stream 18 to the various decoding branches 106. For example, the demultiplexer 104 provides the dequantization/inverse-transform module 28 with the residual data $42_1$, the further processing module 32 with the further-processing parameters $50_1$, the intra prediction module 36 with the intra prediction parameters $46_1$ and the inter prediction module 38 with the inter prediction modules $48_1$. The coding parameter exchanger 110 acts like the corresponding module 52 in FIG. 1 in order to distribute the common coding parameters and other common data among the various decoding branches 106.

The view extractor 108 receives the multi-view signal as reconstructed by the parallel decoding branches 106 and extracts therefrom one or several views 102 corresponding to the view angles or view directions prescribed by externally provided intermediate view extraction control data 112.

Due to the similar construction of the decoder 100 relative to the corresponding portion of the encoder 20, its functionality up to the interface to the view extractor 108 is easily explained analogously to the above description.

In fact, decoding branches $106_{v,1}$ and $106_{d,1}$ act together to reconstruct the first view $12_1$ of the multi-view signal 10 from the data stream 18 by, according to first coding parameters contained in the data stream 18 (such as scaling parameters within $42_1$, the parameters $46_1$, $48_1$, $50_1$, and the corresponding non-adopted ones, and prediction residuals, of the coding parameters of the second branch $16_{d,1}$, namely $42_2$, parameters $46_2$, $48_2$, $50_2$), predicting a current portion of the first view $12_1$ from a previously reconstructed portion of the multi-view signal 10, reconstructed from the data stream 18 prior to the reconstruction of the current portion of the first view $12_1$ and correcting a prediction error of the prediction of the current portion of the first view $12_1$ using first correction data, i.e. within $42_1$ and $42_2$, also contained in the data stream 18. While decoding branch $106_{v,1}$ is responsible for decoding the video $14_1$, a coding branch $106_{d,1}$ assumes responsibility for reconstructing the depth/disparity map data $16_1$. See, for example, FIG. 2: The decoding branch $106_{v,1}$ reconstructs the video $14_1$ of the first view $12_1$ from the data stream 18 by, according to corresponding coding parameters read from the data stream 18, i.e. scaling parameters within $42_1$, the parameters $46_1$, $48_1$, $50_1$, predicting a current portion of the video $14_1$ such as $60a$, $60b$ or $60c$ from a previously reconstructed portion of the multi-view signal 10 and correcting a prediction error of this prediction using corresponding correction data obtained from the data stream 18, i.e. from transform coefficient levels within $42_1$. For example, the decoding branch $106_{v,1}$ processes the video $14_1$ in units of the segments/portions using the coding order among the video frames and, for coding the segments within the frame, a coding order among the segments of these frames as the corresponding coding branch of the encoder did. Accordingly, all previously reconstructed portions of video $14_1$ are available for prediction for a current portion. The coding parameters for a current portion may include one or more of intra prediction parameters $50_1$, inter prediction parameters $48_1$, filter parameters for the further-processing module 32 and so forth. The correction data for correcting the prediction error may be represented by the spectral transform coefficient levels within residual data $42_1$. Not all of these of coding parameters need to transmitted in full. Some of them may have been spatially predicted from coding parameters of neighboring segments of video $14_1$. Motion vectors for video $14_1$, for example, may be transmitted within the bitstream as motion vector differences between motion vectors of neighboring portions/segments of video $14_1$ As far as the second decoding branch $106_{d,1}$ is concerned, same has access not only to the residual data $42_2$ and the corresponding prediction and filter parameters as signaled within the data stream 18 and distributed to the respective decoding branch $106_{d,1}$ by demultiplexer 104, i.e. the coding parameters not predicted by across inter-view boundaries, but also indirectly to the coding parameters and correction data provided via demultiplexer 104 to decoding branch $106_{v,1}$ or any information derivable therefrom, as distributed via coding information exchange module 110. Thus, the decoding branch $106_{d,1}$ determines its coding parameters for reconstructing the depth/disparity map data $16_1$ from a portion of the coding parameters forwarded via demultiplexer 104 to the pair of decoding branches $106_{v,1}$ and $106_{d,1}$ for the first view $12_1$, which partially overlaps the portion of these coding parameters especially dedicated and forwarded to the decoding branch $106_{v,1}$. For example, decoding branch $106_{d,1}$ determines motion vector $68a$ from motion vector $62a$ explicitly transmitted within $48_1$, for example, as a motion vector difference to another neighboring portion of frame $v_{1,t}$, on the on hand, and a motion vector difference explicitly transmitted within $48_2$, on the on hand. Additionally, or alternatively, the decoding branch $106_{d,1}$ may use reconstructed portions of the video $14_1$ as described above with respect to the prediction of the wedgelet separation line to derive an irregular block partitioning as briefly noted above with respect to decoding depth/disparity map data $16_1$, and as will outlined in more detail below.

To be even more precise, the decoding branch $106_{d,1}$ reconstructs the depth/disparity map data $14_1$ of the first view $12_1$ from the data stream by use of coding parameters which are at least partially predicted from the coding parameters used by the decoding branch $106_{v,1}$ (or adopted therefrom) and/or predicted from the reconstructed portions of video $14_1$ in the decoded picture buffer 34 of the decoding branch $106_{v,1}$. Prediction residuals of the coding parameters may be obtained via demultiplexer 104 from the data stream 18. Other coding parameters for decoding branch $106_{d,1}$ may be transmitted within data stream 108 in full or with respect to another basis, namely referring to a coding parameter having been used for coding any of the previously reconstructed portions of depth/disparity map data $16_1$ itself. Based on these coding parameters, the decoding branch $106_{d,1}$ predicts a current portion of the depth/disparity map data $14_1$ from a previously reconstructed portion of the depth/disparity map data $16_1$, reconstructed from the data stream 18 by the decoding branch $106_{d,1}$ prior to the reconstruction of the current portion of the depth/disparity map data $16_1$, and correcting a prediction error of the prediction of the current portion of the depth/disparity map data $16_1$ using the respective correction data $42_2$.

The functionality of the pair of decoding branches $106_{v,2}$ and $106_{d,2}$ for the second view $12_2$ is, as already described above with respect to encoding, similar as for the first view $12_1$. Both branches cooperate to reconstruct the second view $12_2$ of the multi-view signal 10 from the data stream 18 by use of own coding parameters. Merely that part of these coding parameters needs to be transmitted and distributed via demultiplexer 104 to any of these two decoding branches $106_{v,2}$ and $106_{d,2}$, which is not adopted/predicted across the view boundary between views $14_1$ and $14_2$, and, optionally, a residual of the inter-view predicted part. Current portions of the second view $12_2$ are predicted from previously reconstructed portions of the multi-view signal 10, reconstructed from the data stream 18 by any of the decoding branches 106 prior to the reconstruction of the respective current portions of the second view $12_2$, and correcting the prediction error accordingly using the correction data, i.e. $42_3$ and $42_4$, forwarded by the demultiplexer 104 to this pair of decoding branches $106_{v,2}$ and $106_{d,2}$.

Decoding branch $106_{d,2}$ may determine its coding parameters at last partially by adoption/prediction from coding parameters used by any of decoding branches $106_{v,1}$, $106_{d,1}$ and $106_{v,2}$, from the reconstructed video $14_2$ and/or from the reconstructed depth/disparity map data $16_1$ of the first view $12_1$. For example, the data stream 18 may signal for a current portion 80b of the depth/disparity map data $16_2$ as to whether, and as to which part of, the coding parameters for this current portion 80b is to be adopted or predicted from a co-located portion of any of the video $14_1$, depth/disparity map data $16_1$ and video $14_2$ or a proper subset thereof. The part of interest of these coding parameters may involve, for example, a motion vector such as 84, or a disparity vector such as disparity vector 82. Further, other coding parameters, such as regarding the irregularly partitioned blocks, may be derived by decoding branch $106_{d,2}$.

In any case, the reconstructed portions of the multi-view data 10 arrive at the view extractor 108 where the views contained therein are the basis for a view extraction of new views, i.e. the videos associated with these new views, for example. This view extraction may comprise or involve a re-projection of the videos $14_1$ and $14_2$ by using the depth/disparity map data associated therewith. Frankly speaking, in re-projecting a video into another intermediate view, portions of the video corresponding to scene portions positioned nearer to the viewer are shifted along the disparity direction, i.e. the direction of the viewing direction difference vector, more than portions of the video corresponding to scene portions located farther away from the viewer position.

It should be mentioned that the decoder does not necessarily comprise the view extractor 108. Rather, view extractor 108 may not be present. In this case, the decoder 100 is merely for reconstructing any of the views $12_1$ and $12_2$, such as one, several or all of them. In case no depth/disparity data is present for the individual views $12_1$ and $12_2$, a view extractor 108 may, nevertheless, perform an intermediate view extraction by exploiting the disparity vectors relating corresponding portions of neighboring views to each other. Using these disparity vectors as supporting disparity vectors of a disparity vector field associated with videos of neighboring views, the view extractor 108 may build an intermediate view video from such videos of neighboring views $12_1$ and $12_2$ by applying this disparity vector field. Imagine, for example, that video frame $v_{2,t}$ had 50% of its portions/segments inter-view predicted. That is, for 50% of the portions/segments, disparity vectors would exist. For the remaining portions, disparity vectors could be determined by the view extractor 108 by way of interpolation/extrapolation in the spatial sense. Temporal interpolation using disparity vectors for portions/segments of previously reconstructed frames of video $14_2$ may also be used. Video frame $v_{2,t}$ and/or reference video frame $v_{1,t}$ may then be distorted according to these disparity vectors in order to yield an intermediate view. To this end, the disparity vectors are scaled in accordance with the intermediate view position of the intermediate view between view positions of the first view $12_1$ and a second view $12_2$. Details regarding this procedure are outlined in more detail below.

However, the embodiments outlined below may be advantageously used in the framework of FIGS. 1 to 3 if considering merely the coding of one view comprising a video and a corresponding depth/disparity map data such as the first view $12_1$ of the above-outlined embodiments. In that case, the transmitted signal information, namely the single view 121, could be called a view synthesis compliant signal, i.e. a signal which enables view synthesis. The accompanying of video $14_1$ with a depth/disparity map data $16_1$, enables view extractor 108 to perform some sort of view synthesis by re-projecting view $12_1$ into a neighboring new view by exploiting the depth/disparity map data $16_1$. Again, coding efficiency gain is obtained by using the irregular block partitioning. Thus, the irregular block partitioning embodiments described further below may be used within a single-view coding concept independent from the inter-view coding information exchange aspect described above. To be more precise, the above embodiments of FIG. 1 to 3 could be varied to the extent that branches 22, $100_{v/d,2}$ and associated view $12_2$ are missing.

Thus, FIGS. 1 to 3 showed an example for a multi-view coding concept into which the subsequently explained irregular block partitioning could advantageously be used. However, it is again emphasized that the coding modes described below may also be used in connection with other sorts of sample array coding, irrespective of the sample array being a depth/disparity map or not. Some of the coding modes described below do not even necessitate the coexistence of a depth/disparity map along with a corresponding texture map.

In particular, the embodiments outlined below involve some coding modes, by which the signal of a block is represented by a model that separates the samples of the signal into two sets of samples and represents each set of samples by a constant sample value. Some of the below-explained coding modes can either be used for directly representing the signal of a block or can be used for generating a prediction signal for the block, which is then further refined by coding additional residual information (e.g., transform coefficient levels). If one of the subsequently explained coding modes is applied to depth signals, in addition to other favorable aspects, an advantage may result from the fact that the depth signals are mainly characterized by slowing varying regions and sharp edges between slowly varying regions. While the slowly varying regions can be efficiently represented by transform coding approaches (i.e., based on a DCT), the representation of sharp edges between two nearly constant regions necessitate a large number of transform coefficients to be coded. Such blocks containing edges can be better represented by using a model that splits the block into two regions, each with a constant sample value, as it is described with respect to some of the below-outlined embodiments.

In the following, different embodiments of the invention are described in more detail. In sections 1 and 2, the basic concepts for partitioning a block into two regions of constant sample values are described. Section 3 describes different embodiments for specifying how a block can be partitioned into different regions and what parameters need to be transmitted for representing the partitioning as well as the sample values for the regions. The embodiments include concepts for signaling the partitioning information independent of any other block, for signaling the partitioning information based on transmitted data for spatially neighboring blocks, and for signaling the partitioning information based on the already transmitted texture picture (conventional video picture) that is associated with the depth map to be coded. Thus, section 4 describes embodiments of the invention with respect to the coding of mode information, partitioning information, and the constant sample values involved with some embodiments for handling an irregularly positioned block.

Although the following description is mainly targeted for the coding of depth maps (in particular in the context of multi-view video coding) and the following description is based on given depth blocks, several embodiments of the invention can also be applied for conventional video coding. Hence, if the term "depth block" is replaced with the general term "signal block", the description can be applied to other signal types. Furthermore, the following description sometimes concentrates on quadratic blocks, but the invention can also be applied to rectangular blocks or other connected or simply connected sets of samples.

1. Wedgelets

In block-based hybrid video coding, such as shown in FIGS. 1 to 3, for example, a frame is subdivided in rectangular blocks. Often these blocks are quadratic and the processing for each block follows the same functional structure. Note that although most of the examples in this section use quadratic blocks, Wedgelet block partitions and all related methods are not limited to quadratic blocks, but are rather possible for any rectangular block size.

1.1 Wedgelet Block Partition

Figure 4:
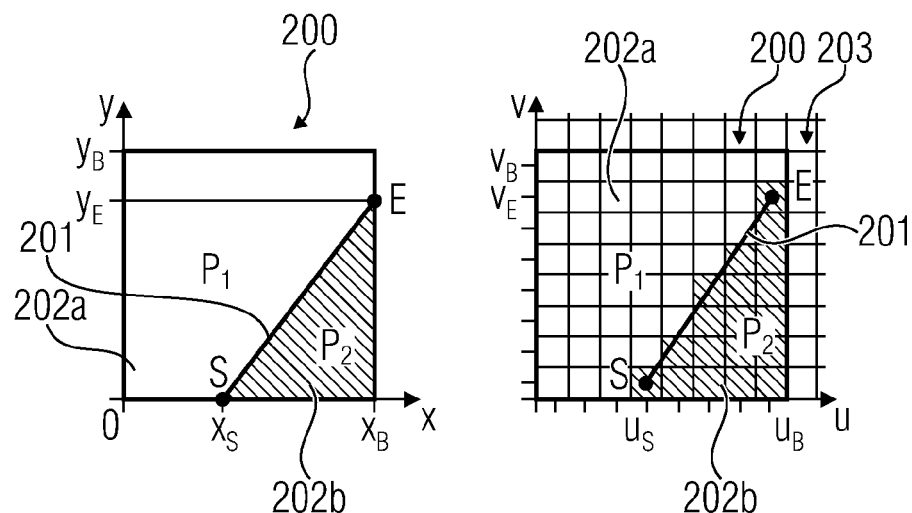
FIG. 4 shows a wedgelet partition of a quadratic block in continuous (left) and discrete signal space (right)

The basic principle of Wedgelet block partitions is to partition the area of a block 200 into two regions 202a, 202b that are separated by a line 201, as illustrated in FIG. 4, where the two regions are labeled with $P_1$ and $P_2$. The separation line is determined by a start point S and an end point E, both located on the block border. Sometimes, in the following, region $P_1$ is called wedgelet partition 202a, while region $P_2$ is called wedgelet partition 202b.

For the continuous signal space (see FIG. 4, left) the start point position is $S(x_S, y_S)$, and the end point position is $E(x_E, y_E)$, both limited to the block size $0 \le x \le x_S$ and $0 \le y \le y_S$ (where one of the coordinates has to be equal to the minimum (0) or maximum value ($x_S$ or $y_S$)). According to these definitions the equation of the separation line is as follows:

$$y = m \cdot x + n = \left(\frac{y_E - y_S}{x_E - x_S}\right) \cdot x + \left(y_S - \frac{y_E - y_S}{x_E - x_S} \cdot x_S\right) \quad (1)$$

Note that this equation is only valid for $x_S \ne x_E$. The two regions $P_1$ and $P_2$ are then defined as the area left and right of the line, respectively.

In digital image processing usually a discrete signal space (see FIG. 4, right) is used, where the block consists of an integer number of samples 203 illustrated by the grid squares. Here, the start and end points S and E correspond to border samples of the block 200 with positions $S(u_S, v_S)$, and $E(u_E, v_E)$, both limited to the block size $0 \le x \le u_E$ and $0 \le y \le v_E$. In the discrete case the separation line equation could be formulated according to (1). However, the definition of the regions $P_1$ and $P_2$ is different here, as only complete samples can be assigned as part of either of the two regions, illustrated in FIG. 4, right. This assignment problem may be solved algorithmically as described in section 1.4.1.

Figure 5:
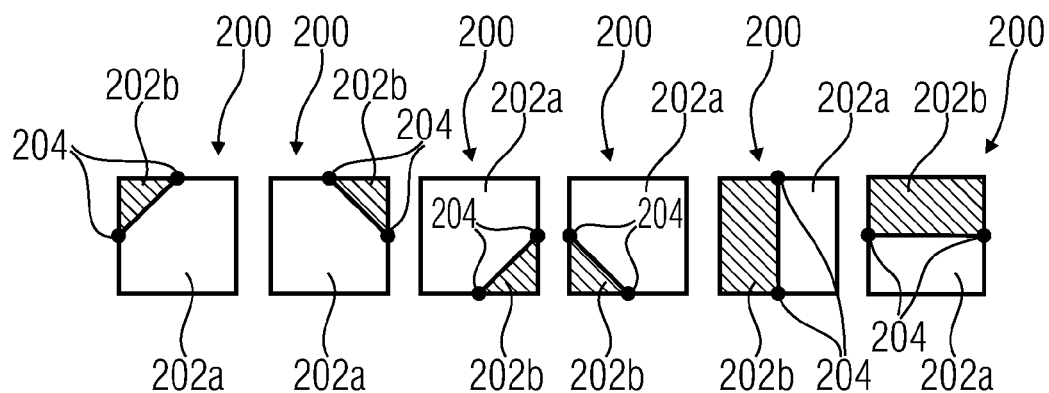
FIG. 5 shows a schematic illustration of the six different orientations of Wedgelet block partitions.

Wedgelet block partitions 202a, 202b necessitate the start and end points 204 to be located on different edges of block 200. Consequently, six different orientations of Wedgelet block partitions 202a, 202b can be distinguished for rectangular or quadratic blocks 200, as illustrated in FIG. 5.

1.2 Wedgelet Partition Patterns

Figure 6:
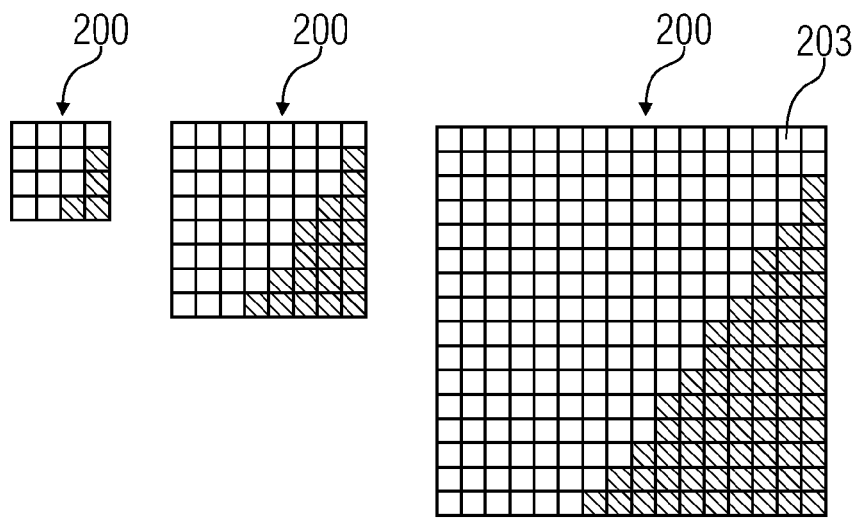
FIG. 6 shows an Example of Wedgelet partition patterns for block size 4×4 (left), 8×8 (middle), and 16×16 (right)

For employing Wedgelet block partitions in the coding process, partition information may be stored in the form of partition patterns. Such a pattern consists of an array of size $u_E \times v_E$ and each element contains the binary information whether the according sample belongs to region $P_1$ or $P_2$. FIG. 6 shows example Wedgelet partition patterns for different block sizes. Here, the binary region information, i.e. the bi-segmentation, is represented by black or white samples 203.

1.3 Wedgelet Modeling and Approximation

For modeling the depth signal of a block with a Wedgelet, the necessitated information conceptually consists of two elements. One is the partition information (see section 1.1), e.g. in the form of a partition pattern, which assigns each sample 203 to one of the two regions (see section 1.2). The other information element necessitated is the values that are assigned to the samples of a region. The value of each of the two Wedgelet regions may be defined to be a constant. This is the case with some of the below-outlined embodiments. Thus, this value will be referred as constant partition value (CPV). In that case, the second information element is composed of two representative sample values for the specified regions.

Figure 7:
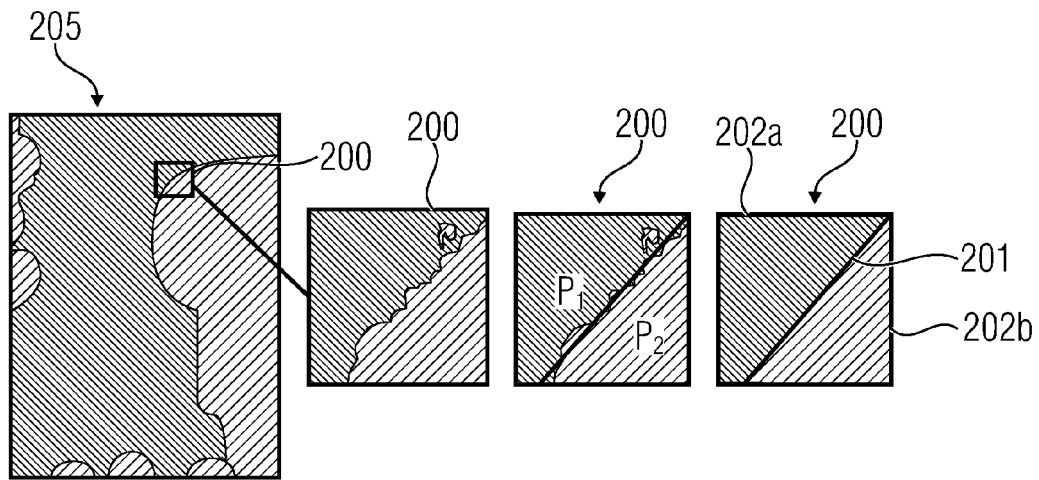
FIG. 7 shows an approximation of depth signal with Wedgelet model by combining partition information and CPVs (mean value of depth signal in partition regions)

For approximating the signal of a depth block by a Wedgelet, the CPVs of a given partition may be calculated as the mean value of the original depth signal of the corresponding region, as illustrated in FIG. 7. At the left hand side of FIG. 7 a grey-scaled portion out of a representative depth map is shown. A block 200 which is currently the subject of wedgelet-based partitioning is exemplarily shown. In particular, its illustrative position within the original depth signal 205 is shown, as well as an enlarged grey-scaled version. First, the partition information, i.e. a possible bi-segmentation, in terms of regions $P_1$ and $P_2$ is overlaid with the block 200. Then, the CPV of one region is calculated as the mean value of all samples covered by the respective region. As the partition information in the example in FIG. 5 matches the depth signal 205 quite well, the resulting Wedglet model, i.e. the prediction of block 200 based on the wedgelet partitioning mode outlined, with a lower CPV for region $P_1$ (darker grey) and a higher CPV for region $P_2$ (brighter grey) represents a good approximation of the depth block.

1.4 Wedgelet Processing 1.4.1 Wedgelet Pattern Lists

For the purpose of efficient processing and signaling of Wedgelet block partitions, partition patterns may be organized in lookup lists. Such a Wedgelet pattern list contains the patterns for all possible combinations of start and end point positions for the region separation line or it contains a suitable subset of all possible combinations. Thus, one lookup list may be generated for each prediction block size. Identical lists may be made available at the encoder and the decoder, so as to enable the signaling between encoder and decoder (see section 3 for details) relying on the position or index of a specific pattern within the list of a certain block size. This can be implemented by either including a predefined set of patterns or by executing the identical generation algorithm as part of the encoder and decoder initialization.

Figure 8:
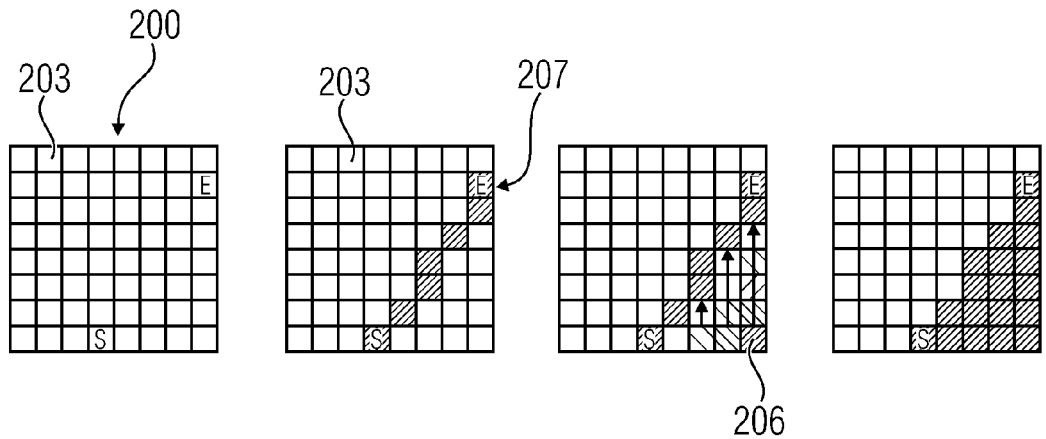
FIG. 8 shows a generation of a Wedgelet partition pattern.

The core function for creating the Wedgelet partition pattern lookup lists is the generation of one list element, as illustrated in FIG. 8. This can be realized as described in the following (or by a similar algorithm). Given an empty pattern (an $u_E \times v_E$ array of binary elements) and the start point S and end point E coordinates (FIG. 8, left) the first step is to draw the separation line. For this purpose the Bresenham line algorithm can be applied. In general, the algorithm determines which samples 203 should be plotted in order to form a close approximation to a straight line between two given points. In the case of Wedgelet partition patterns all elements 203 that approximate the line between start point S and end point E are marked (black boxes in FIG. 8, middle left). The last step is to fill one of the resulting two regions separated by the marked samples. Here, the above mentioned assignment problem needs to be discussed. As the elements of a pattern are binary, the separation line marked by the Bresenham algorithm becomes part of one region. Intuitively this seems to be unbalanced, as line samples are theoretically part of both domains. However, it is possible to assign the separation line samples to one region without loss of generality. This is assured by the fact that both the line marking as well as the region filling algorithms are orientation aware, i.e. relative to the root corner of the according orientation. Based on the fact, that the corner region is completely delimited by the separation line, filling this region is relatively simple. The filling algorithm starts with a root corner element 206 and consecutively marks all pattern elements column- and line-wise until it reaches an element that is already marked and thus part of the line 207 (see FIG. 8, middle right). As a result, the Wedgelet partition pattern for the given start and end point position is represented by the binary values (FIG. 8, right).

The generation process for the Wedgelet partition pattern lookup lists of a certain block size consecutively creates list elements for possible line start and end positions. This is realized by iterating over the six orientations shown in FIG. 5. For each orientation, the start positions are located on one and the end positions on another edge of the block and the list generation process executes the Wedgelet pattern generation method introduced above for each possible combination of start and end positions. For efficient processing and signaling, the Wedgelet pattern lists should only contain unique patterns. Therefore, before a new pattern is added to the list, it is checked for being identical or inverse identical to any of the patterns already in the list. In such a case, the pattern is redundant and therefore discarded. In addition to that, plane patterns, i.e. all samples are assigned to one region, are also excluded from the list as they are not representing a valid Wedgelet block partition.

As an extension to the described Wedgelet pattern lists, the resolution of line start and end positions used for generating the patterns can be adaptively increased or decreased, e.g. depending on the block size. The purpose of this extension is to find a better trade-off between coding efficiency and complexity. Increasing the resolution leads to a list with more patterns, while decreasing the resolution results in a shorter list, compared to normal resolution. Consequently, the resolution is typically increased for small block sizes and decreased for large block sizes. It is important to note that independent of the resolution for start and end positions, the Wedgelet partition patterns stored in the list is necessitated to have normal resolution, i.e. the original block size. Decreasing the resolution can be simply realized by generating the patterns as described above, but only for a subset of start and end positions. For example half the resolution means to limit the pattern generation to every second start and end position. In contrast to that, increasing the resolution is more difficult. For covering all start and end positions a temporary pattern with the increased resolution is generated first, using the algorithm described above. In a second step the resulting pattern is down-sampled to regular resolution. Note that for binary data, down-sampling does not support interpolated values, which results in a larger number of identical patterns for the case of an increased resolution.

As the final result of the Wedgelet pattern generation described above, an ordered list of Wedgelet patterns is derived at both encoder and decoder side. In an actual implementation, these patterns can also be predefined by the employed coding algorithm/coding standard. Furthermore, it is not necessary to generate the patterns by the actual algorithm described above, modifications of this algorithm can also be used. It is only important that both encoder and decoder generated (and later use) the same list of Wedgelet patterns for the encoding and decoding process.

1.4.2 Minimum Distortion Wedgelet Search

Based on the lookup lists described above, the best approximation of the signal of a block by a Wedgelet partition can be found by a search algorithm. For Wedgelet-based coding algorithms the best approximation may be understood as the Wedgelet model that causes the minimum distortion. In other word, the search tries to find the best matching Wedgelet partition pattern for the given block. The search utilizes the derived pattern list, which contains all possible Wedgelet partition patterns for a given block size (see section 1.4.1 for details). These lists help to limit the processing time of the search, as the patterns don't need to be generated again, each time a minimum distortion Wedgelet search is carried out. Each search step may consist of the following steps:

Calculation of the CPV values from the given partition pattern and the original block signal.

Calculation of the distortion $D_{W,cur}$ between original block signal and Wedgelet model.

Evaluation of $D_{W,cur} < D_{W,min}$: if true, update minimum distortion Wedgelet information, by setting $D_{W,min} = D_{W,cur}$ and storing the list index of the current partition pattern.

Instead of the distortion, a Lagrangian cost measure can be used for finding the used Wedgelet pattern. The Lagrangian const measure is a weighted sum $D+\lambda \cdot R$ that weights the distortion D obtained by a particular wedgelet pattern with the rate R that is necessitated for transmitting the associated parameters given a Lagrangian multiplier $\lambda$.

Different strategies are possible for the search algorithm, ranging from an exhaustive search to fast search strategies. Exhaustive search means that all elements of the Wedgelet pattern list are successively tested for minimum distortion. This strategy ensures that the global minimum is found, but for the price of being slow (which is especially important for the encoder). Fast search means advanced strategies that reduce the number of necessitated search steps. A fast search strategy could for instance be a successive refinement. In a first phase the minimum distortion Wedgelet for a subset of partition patterns resulting from a limited number of line start and end positions, e.g. only every fourth border sample, is searched. In a second phase the start and end positions would be refined, e.g. by allowing every second border sample, but limiting the range of tested start and end positions to a range around the best result of the first phase. By refining the step size in every cycle, finally the minimum distortion Wedgelet is found. In contrast to full search, such a fast search strategy only allows finding a local minimum, but the number of Wedgelet patterns to be tested is significantly lower and consequently the search is faster. Note, that the step size of the first phase does not need to be a fixed value, but can be set adaptively, e.g. as a function of the block size.

The just-discussed index indexing the course of the wedgelet line or wedgelet pattern could be called wedge_full_tab_idx.

2 Contours

Note that although most of the examples in this section use quadratic blocks, Contour block partitions and all related embodiments are not limited to quadratic blocks, but are rather possible for any rectangular block size.

2.1 Contour Block Partition

The basic principle of Contour block partitions is to partition the area of a block 200 into two regions 202a, 202b. Unlike for Wedgelet block partitions, the separation line 201 between the regions cannot be described by a geometrical formulation. As illustrated by the two regions labeled with $P_1$ and $P_2$ in FIG. 9, the regions of a Contour can be of arbitrary shape and they are not even required to be connected.

Figure 9:
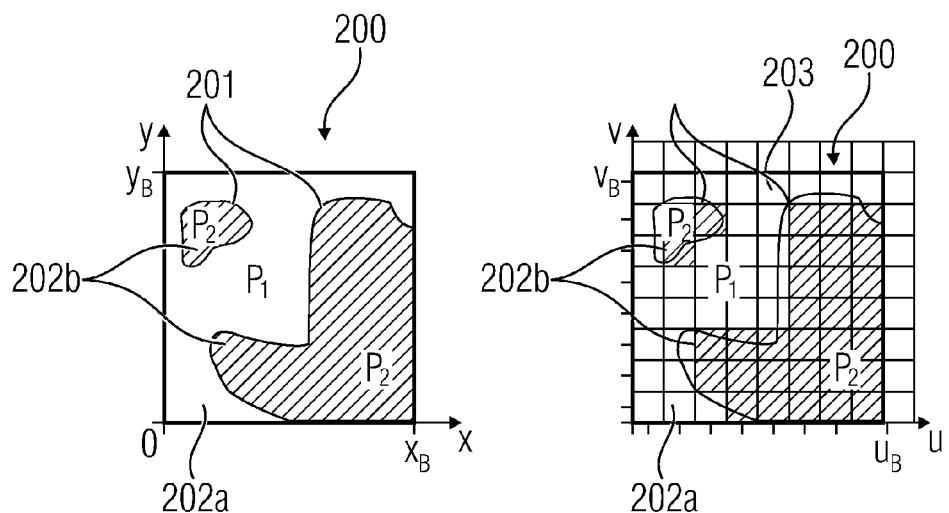
FIG. 9 shows a contour partition of a quadratic block in continuous (left) and discrete signal space (right)

FIG. 9 also illustrates the difference between continuous and discrete signal space for Contour block partitions. Again, only complete samples can be assigned as part of either of the two regions for the discrete signal space (FIG. 9, right). When the Contour partition information is derived from a discrete reference signal (see section 3.2.2 for details) and not from a geometrical formulation, no assignment problem like for Wedgelet block partitions has to be taken into account here.

2.2 Contour Partition Patterns

Figure 10:
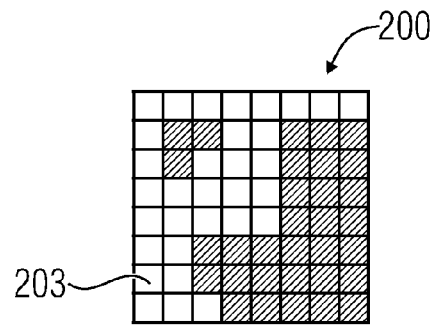
FIG. 10 shows an example of Contour partition pattern for block size 8×8.

In conformance with Wedgelet partition patterns (see section 1.2), the Contour block partition information may be stored in the form of partition patterns. Such a pattern consists of an array of size $u_S \times v_S$ and each element contains the binary information whether the according sample belongs to region $P_1$ or $P_2$. FIG. 10 shows an example Contour partition pattern, representing the binary region information by black or white sample color.

2.3 Contour Modeling and Approximation

The principle of approximating the depth signal of a block with by a Contour is identical to the Wedgelet concept described in section 1.3. Again, the necessitated information may consist of the two elements partition information and the partition filling instruction which, in turn, may comprise one constant partition value (CPV) for each of the two regions, which may be calculated as the mean value of the original depth signal of the corresponding region.

Figure 11:
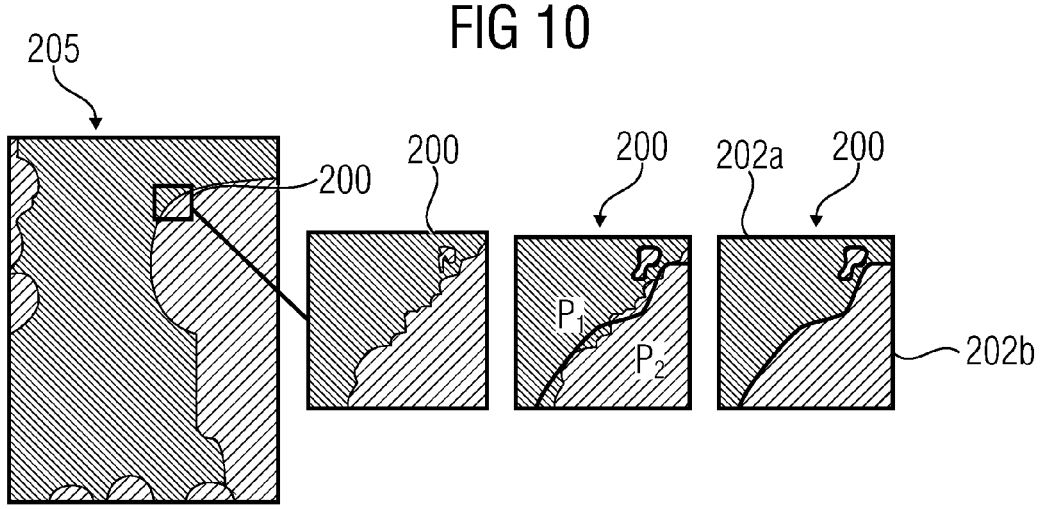
FIG. 11 shows an approximation of depth signal with Contour model by combining partition information and CPVs (mean value of depth signal in partition regions)

The Contour approximation is illustrated in FIG. 11, where the original depth signal of a prediction block 200 is highlighted in order to show its surroundings and is shown enlarged. Again, the partition information in terms of regions $P_1$ and $P_2$ is overlaid with the block first and then the CPV is calculated as the mean value of all samples covered by the region. As the partition information in the example in FIG. 11 matches the depth signal quite well, the resulting Contour model with a lower CPV for region $P_1$ (darker grey) and a higher CPV for region $P_2$ (brighter grey) represents a good approximation of the depth block.

3. Block Partition Coding

For using the methods and algorithms described in the previous sections within a coding framework for multi-view video plus depth (MVD) such as the coding environment of FIGS. 1 to 3, new coding routines or modes should be defined and the necessitated tools should be implemented in the encoder and the decoder.

For a hybrid video coder, such as the encoder of FIG. 1, or coding branch pair $22_{v/d,1}$, these tools can be categorized as part of estimation, prediction, or signaling. Estimation summarizes tools that are only part of the encoding process as they depend on original input information (e.g. uncompressed pictures). In contrast to that, prediction summarizes tools that are part of the encoding and decoding process, as they only rely on transmitted and/or reconstructed information (e.g. decoded pictures). Signaling summarizes tools for coding the information transmitted from the encoder to the decoder in the bitstream. Consequently, they are necessitated to use an identical syntax and identical entropy coding states.

Note that for estimation tools the distortion can be either derived as known from classic video coding approaches, measuring the difference between distorted and original depth signal of the block, e.g. as the mean squared error (MSE) or the mean absolute difference (MAD), or as the distortion in synthesized views, measuring the difference in synthesized views caused by samples that are dislocated due to the distorted depth signal of the block.

The concepts for irregular block partition coding in accordance with below-outlined embodiments can be divided in those for processing partition information (see sections 3.1 and 3.2) and those for processing CPVs (see section 3.3).

3.1 Wedgelet-Based Intra Coding

This section presents two intra coding modes based on Wedgelet block partitions (see section 1). Both modes can be combined with the delta CPV method (see section 3.3.2).

3.1.1 Intra Modeling of Wedgelet Block Partition

The basic principle of this mode is to find the best matching Wedgelet partition at the encoder and explicitly transmit the partition information in the bitstream. At the decoder the signal of the block is reconstructed using the explicitly transmitted partition information. Consequently, the main tools for this mode are part of estimation and signaling.

The Wedgelet partition information for this mode is not predicted, but searched within the estimation process at the encoder. For this purpose the minimum distortion Wedgelet search as described in section 1.4.2 is carried out, using the original depth signal of the current block as a reference. The search results in the best matching Wedgelet partition with respect to the distortion method employed.

Reconstructing the block at the decoder, the Wedgelet partition information has to be signaled in the bitstream. This is realized by explicitly transmitting the position or an index of the according pattern in the list (see section 1.4.1). This list index is signaled with a fixed number of bins. Given a Wedgelet pattern list with N elements, the index of the used pattern is coded using fixed-length-codes, or variable length codes, or arithmetic coding (including context-adaptive binary arithmetic coding), or any other entropy coding method. Advanced methods for signaling the Wedgelet partition information may include sorting the list based on the probability of each partition pattern or using an alternative representation of the partition information, e.g. line start and end position or line start position and gradient.

3.1.2 Intra Prediction of Wedgelet Block Partition

The basic principle of this mode is to predict the Wedgelet partition from information available for previously coded blocks in the same picture, i.e. intra prediction. For a better approximation, the predicted partition is refined at the encoder such as, for example, by varying the line end position. The only transmission of the offset to the line end position in the bitstream may suffice and at the decoder the signal of the block may be reconstructed using the partition information that results from combining the predicted partition and the transmitted refinement information such as the offset. Consequently, the main tools for this mode are part of prediction, estimation, and signaling.

Figure 12:
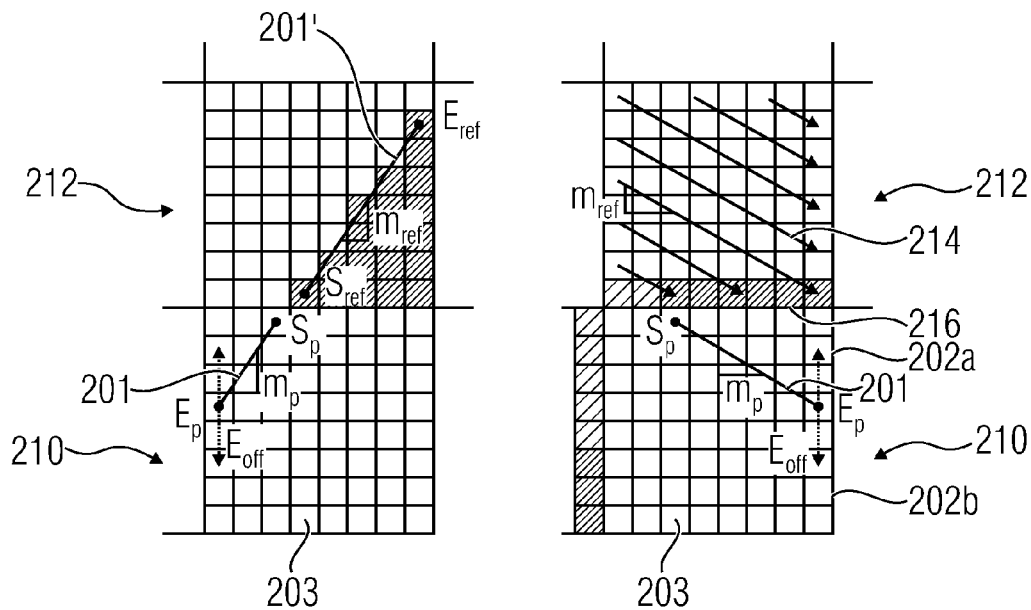
FIG. 12 shows an intra prediction of Wedgelet partition (blue) for the scenarios that the above reference block is either of type Wedgelet partition (left) or regular intra direction (right)

Prediction of the Wedgelet partition information for this mode internally works with a Wedgelet representation that consists of the start position and the gradient of the separation line. For further processing, namely adapting the line end position offset and reconstructing the signal of the block, the prediction result is converted in a representation consisting of the line start and end position. The prediction process of this mode derives the line start position and the gradient from the information of previously coded blocks, such as the neighbor blocks left and above of the current block. In FIG. 12, merely the current block 210 and the above neighboring block 212 are shown. Note that for some blocks one or both of the neighboring blocks are not available. In such a case the processing for this mode is either skipped or continued with setting the missing information to meaningful default values.

As illustrated in FIG. 12, two main concepts are distinguished for predicting the Wedgelet partition information in accordance with the presently suggested embodiment. The first concept covers the case when one of the two neighboring reference blocks is of type Wedgelet, shown in the example in FIG. 12, left, where block 212 is exemplarily subject to wedgelet partitioning. The second concept covers the case when the two neighboring reference blocks are not of type Wedgelet, but of type intra direction, which may be the default intra coding type, shown in the example in FIG. 12, right, where block 212 is exemplarily subject to intra coding.

If the reference block 212 is of type Wedgelet, the prediction process may work as follows: According to FIG. 12, left, the gradient $m_{ref}$ of the reference Wedgelet is derived from the start position $S_{ref}$ and the end position $E_{ref}$ in a first step. The principle of this concept is to continue the reference Wedgelet, i.e. the wedgelet separation line 201', in the current block 210, which is only possible if the continuation of the separation line 201' of the reference Wedgelet 212 actually intersects the current block 210. Therefore, the next step is to check whether it is possible to continue the reference Wedgelet. The example in FIG. 12, left, shows a scenario where it is possible, but if the start and end position of the reference Wedgelet would be located on left and right edge of the block, the continuation of the line would not intersect the block below. In case the check is positive, the start position $S_p$ and the end position $E_p$ are predicted in a final step. As the gradient $m_p$ is equal to $m_{ref}$ by definition, the positions are simply calculated as the intersection points of the continued line with block border samples.

If the reference block 212 is of type intra direction, the prediction process may work as follows: According to FIG. 12, right, the gradient $m_{ref}$ of the reference block 212 is derived from the intra prediction direction 214 in a first step. In case of the intra direction 214 only being provided in the form of an abstract index, a mapping or conversion function may be necessitated for achieving the gradient $m_{ref}$. Unlike the concept for predicting from a reference block 212 of type Wedgelet, no separation line information is provided by a reference block 212 of type intra direction. Consequently, the start position $S_p$ is derived from information that is also available at the decoder, namely the adjacent samples of the left and above neighboring block. They are shown hatched in FIG. 12, right. The density of hatching shall represent the value of the neighboring samples. As illustrated in FIG. 12, right, from these adjacent samples the one adjoining the pair of neighboring samples with the maximum slope is selected as the start position $S_p$. Here, slope is understood as the absolute difference of the values of two consecutive samples. For a Wedgelet partition the line start point $S_p$ separates the two regions 202a, 202b with a different value at one edge 216 of the block 210. Therefore, the maximum slope point among the adjacent samples of neighboring blocks is the best prediction of $S_p$. Regarding the gradient, $m_p$ is equal to $m_{ref}$ by definition again and together with $S_p$ the end position $E_p$ may be calculated as a final step.

The two presented concepts are complementary. While prediction from reference blocks of type Wedgelet has better matching partition information, but is not always possible, prediction from reference blocks of type intra direction is possible, but the partition information is fitting worse. Therefore, it is beneficial to combine the two concepts into one prediction mode. For realizing this without additional signaling, the following processing hierarchy may be defined: If the above reference block is of type Wedgelet, try predicting the partition. Otherwise, if the left reference block is of type Wedgelet, try predicting the partition. Otherwise, predict partition from above and left reference information. For the latter, different decision criterions for deciding between the above and left direction are possible, ranging from simply prioritizing above to advanced approaches for jointly evaluating the directions and the slopes of adjacent samples. Such advanced criterions might also be applied, if both the above and left reference blocks are of type Wedgelet.

The line end position offset for refining the Wedgelet partition may not be predicted, but searched within the estimation process at the encoder. For the search, candidate partitions are generated from the predicted Wedgelet partition and an offset value for the line end position $E_{off}$, as illustrated in FIG. 12. By iterating over a range of offset values and comparing the distortion of the different resulting Wedgelet partitions, the offset value of the best matching Wedgelet partition is determined with respect to the distortion method employed.

For reconstructing the block at the decoder, the line end position offset value is to be signaled in the bitstream. Same could be signaled by use of three syntax elements, a first signaling as to whether any offset $E_{off}$ is present, i.e. as to whether same is zero, a second one meaning the sign of the offset, i.e. clockwise or counter-clockwise deviation, in case of the offset being not zero, and the third denoting the absolute offset value minus one: dmm_delta_end_flag, dmm_delta_end_sign_flag, dmm_delta_end_abs_minus1. In pseudo code, these syntax elements could be included as

```
dmm_delta_end_flag
if ( dmm_delta_end_flag) {
    dmm_delta_end_abs_minus1
    dmm_delta_end_sign_flag}
``` dmm_delta_end_abs_minus1 and dmm_delta_end_sign_flag could be used to derive DmmDeltaEnd, i.e. $E_{off}$, as follows:

DmmDeltaEnd[x0][y0]=(1−2*dmm_delta_end_sign_flag[x0][y0])*(dmm_delta_end_abs_minus1[x0][y0]+1)

The most probable case is that the offset value is zero. For efficient signaling, a first bin is sent, which has the function of a flag, indicating whether the offset is zero or not. If the offset is not zero, k+1 additional bins follow for signaling offset values in the range $\pm 2^k$, where the first bin represents the sign and the remaining k bins the absolute value of the offset. For efficient coding k is typically a small number and might be set adaptively, e.g. depending on the block size. The line end position offset can also be transmitted by any other entropy coding technique, including fixed-length codes, variable-length codes, or arithmetic coding (including context-adaptive binary arithmetic coding).

3.2 Inter-Component Prediction for Block Partition Coding

This section presents two coding modes based on predicting the partition information from the texture. Both modes can be combined with the delta CPV method (see section 3.3.2). It is assumed that the texture information (i.e., the conventional video picture) is transmitted before the associated depth map.

The basic principle of these modes may be described as predicting the partition information from a texture reference block, either as a Wedgelet or as a Contour block partition. This type of prediction may referred to as inter-component prediction. Unlike temporal or inter-view prediction, no motion or disparity compensation is necessitated here, as the texture reference picture shows the scene at the same time and from the same perspective. As the partition information is not transmitted for these modes, the inter-component prediction uses the reconstructed texture picture as a reference. Depending on the color space used for texture coding, one or more components of the texture signal are taken into account for inter-component prediction. For video coding typically a YUV color space is used. Here, the luma component contains the most significant information for predicting the signal of depth block, i.e. the edges between objects. Thus, a simple inter-component prediction approach only exploits the information of the luma component while advanced approaches additionally take advantage of the chroma components, either for a joint prediction or for refining the luma prediction result.

3.2.1 Texture-Based Prediction of Wedgelet Block Partition

Figure 13:
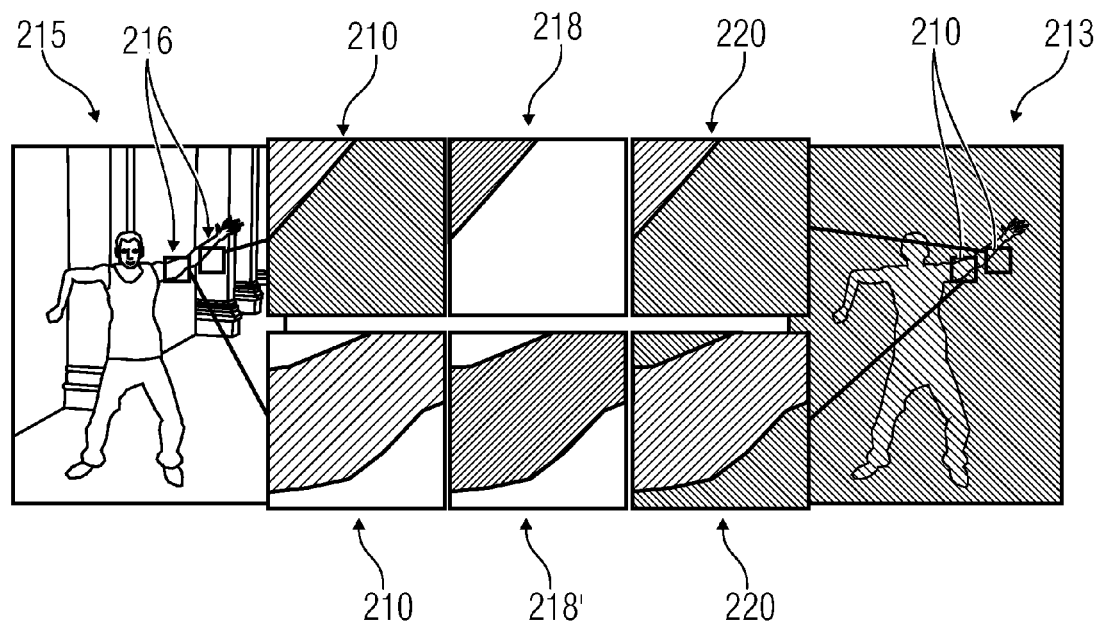
FIG. 13 shows a prediction of Wedgelet (blue) and Contour (green) partition information from texture luma reference.

The basic principle of this mode is to predict the Wedgelet partition of a depth block 210 in the depth map 213 from the texture reference block 216. This is realized by searching the best matching Wedgelet partition for the reconstructed texture picture, as illustrated in FIG. 13. For this purpose the minimum distortion Wedgelet search, as described in section 1.4.2, is carried out, using the reconstructed texture signal 215, more specifically the luma block 216 with same position and size as the depth block 210, as a reference. The resulting Wedgelet partition pattern 218 is used for prediction 220 of the depth block. In FIG. 13, this is highlighted by the top boxes and for the shown example the predicted Wedgelet partition (middle) approximates the depth block 210 very well. As the described Wedgelet prediction can be performed identically at the encoder and the decoder, no signaling of partition information is required for this mode.

3.2.2 Texture-Based Prediction of Contour Block Partition

The basic principle of this mode is to predict the Contour partition of a depth block from the texture reference block. This is realized by deriving the Contour partition 218' for the reconstructed texture picture 215, as illustrated in FIG. 10. For this purpose a Contour approximation, is carried out, using the reconstructed texture signal 215, more specifically the luma block 216 with same position and size as the depth block 210, as a reference. As such a Contour prediction can be performed identically at the encoder and the decoder, no signaling of partition information is required for this mode.

The Contour partition pattern may be generated by calculating the mean value of the reference block 216 and setting it as a threshold. Depending on whether the value of a sample in the reference block 216 is below or above the threshold, the according position is either marked as part of region $P_1$ or $P_2$ in the partition pattern 218'. The resulting Contour partition pattern 218' is used for prediction 220 of the depth block 210. In FIG. 13, this is highlighted by bottom boxes and for the shown example the predicted Contour partition (middle) 218' approximates the depth block 210 very well. However, the threshold approach potentially leads to frayed patterns with many isolated small parts, which does not approximate the depth signal well. For improving the consistency of the Contour patterns, the deviation process can be extended, e.g. by filtering or segmentation approaches.

The binary partition pattern defining the contour partition pattern, dmmWedgeletPattern[x, y], with (x,y) with x, y=0 ... nT−1 denoting the sample positions within the block to be partitioned, may be derived from the luma samples of the collocated texture video block videoLumaSamples[x, y], with x, y=0 ... nT−1, as follows.

A threshold tH is derived as:

$$tH = \text{sumDC}/(nT*nT), \text{with sumDC} += \text{videoLumaSamples}[x,y] \text{ for } x,y=0 \ldots nT-1$$

The pattern values are set as:
If videoLumaSamples[x, y] is larger than tH, the following applies:

$$\text{dmmWedgeletPattern}[x,y]=1$$

Otherwise, the following applies:

$$\text{dmmWedgeletPattern}[x,y]=0$$

3.3 CPV Coding

Concepts for CPV coding are presented in this section. They can be identically applied to all four modes for predicting or estimating block partition information (see sections 3.1 and 3.2), as both partition types, Wedgelet and Contour, have two partition regions with a constant value by definition. Consequently, CPV processing does not need to distinguish between partition types or coding modes, but rather assumes that a partition pattern is given for the current depth block.

3.3.1 Prediction CPVs

Figure 14:
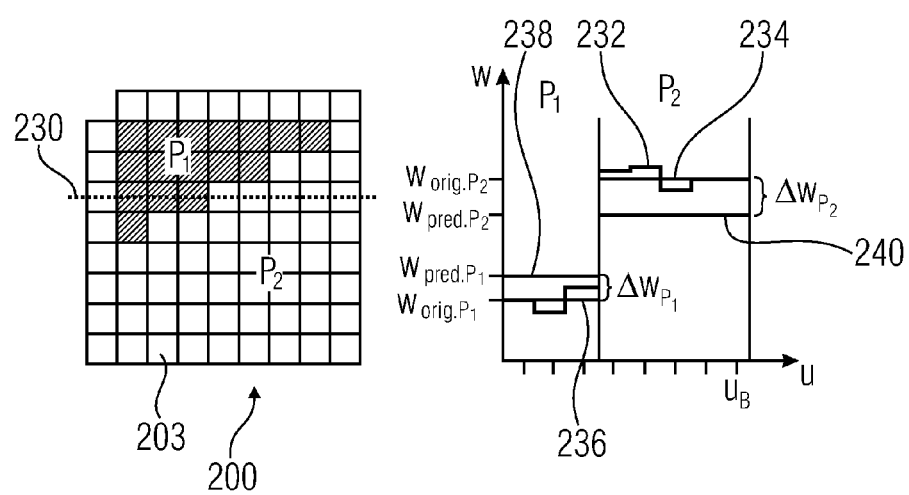
FIG. 14 shows CPVs of block partitions: CPV prediction from adjacent samples of neighboring blocks (left) and cross section of block (right), showing relation between different CPV types.

For a better understanding of CPV prediction, three types of CPV are distinguished, which are: original CPV, predicted CPV, and delta CPV. The relation between them is schematically illustrated in FIG. 14, right, for the cross section of the block (dotted line 230 in FIG. 14, left). Here, the line 232 represents the original signal of the block 200 along line 230. According to the description in sections 1.3 and 2.3 the original CPVs (lines 234 and 236 in FIG. 14, right) are calculated as the mean value of the signal covered by the corresponding region $P_1$ and $P_2$, respectively.

Original CPVs $W_{orig,P_1}$ and $W_{orig,P_2}$ lead to the best approximation of the original signal (left in FIG. 14, or line 232) for a given block partition, but as the original signal is not available at the decoder, it would be necessitated to transmit the values in the bit stream. This would be quite expensive in terms of bit rate and can be avoided by adopting the principle of prediction for CPVs. In contrast to original CPVs, predicted CPVs are derived from information that is also available at the decoder, namely the adjacent samples of the left and above neighboring block, as illustrated on the hatched samples 203 in FIG. 14, left. Here, the adjacent samples are marked grey and the predicted CPV for each region of the given partition pattern results from calculating the mean value of those samples that adjoin the corresponding region (lines 238 and 240 in FIG. 14, left). Note that the left or above neighboring block is not always available. In such a case, the respective adjacent samples may be set to a default value.

In FIG. 14, right, the predicted CPVs $W_{pred,P_1}$ and $W_{pred,P_2}$ are represented by lines 238 and 240 and the illustration highlights that the original and the predicted CPVs may differ significantly. In fact the difference $\Delta W_{P_1}$ and $\Delta W_{P_2}$ between original and predicted values depends on the similarity between the original signal 232 of the current block 200 and the border signal of reconstructed neighboring blocks shown on the hatched samples 203. This difference is defined as the delta CPV of the corresponding region. This means, that if the delta CPV $\Delta W_{P_1}$ and $\Delta W_{P_2}$ is estimated at the encoder and transmitted in the bit stream, it is possible to reconstruct the original CPV at the decoder by adding the delta CPV to the predicted CPV. Only transmitting the delta instead of the original values leads to a significant reduction of the bit rate necessitated.

The predicted constant partition values CPVs could be called dmmPredPartitionDC1 and dmmPredPartitionDC2 and derived from neighbouring samples p[x, y] as follows. In the following, dmmWedgeletPattern denotes the partitioning of the current block encompassing samples (x,y) with exemplarily, x,y=0 . . . nT−1. That is, sample positions neighboring the upper edge are located at (x,−1) with x=0 . . . nT−1, and sample positions neighboring the left edge are located at (−1,y) with y=0 . . . nT−1. The already reconstructed neighboring sample values are denoted p[x,y]. sumPredDC2, sumPredDC1, numSamplesPredDC2 and numSamplesPredDC1 are set to zero at the beginning:

For x=0 . . . nT−1 the above neighbouring samples are summed up as:

If dmmWedgeletPattern[x, 0] is equal to 1 (partition $P_1$, for instance), the following applies:

sumPredDC2+=p[x,−1]    and
    numSamplesPredDC2+=1

Otherwise (partition $P_2$, for instance), the following applies:

sumPredDC1+=p[x,−1]    and
    numSamplesPredDC1+=1

For y=0 . . . nT−1 the left neighbouring samples are summed up as:

If dmmWedgeletPattern[0, y] is equal to 1, the following applies:

sumPredDC2+=p[−1,y]    and
    numSamplesPredDC2+=1

Otherwise, the following applies:

sumPredDC1+=p[−1,y]    and
    numSamplesPredDC1+=1

The predicted constant partition values are derived as follows.

If numSamplesPredDC1 is equal to 0, the following applies:

dmmPredPartitionDC1=1<<(BitDepth$_Y$−1)

Otherwise, the following applies:

dmmPredPartitionDC1=sumPredDC1/numSamplesPredDC1

If numSamplesPredDC2 is equal to 0, the following applies:

dmmPredPartitionDC2=1<<(BitDepth$_Y$−1)

Otherwise, the following applies:

dmmPredPartitionDC2=sumPredDC2/numSamplesPredDC2

3.3.2 Quantization and Adaptation of Delta CPVs

Based on the principle of CPV prediction, a concept for efficient processing of delta CPVs is introduced in this section. Transmitting the delta CPVs in the bitstream serves the purpose of reducing the distortion of the reconstructed signal for block partition coding. However, the bit rate necessitated for signaling the delta CPV values delimits the benefit of this approach, as the difference between original and predicted signal is also covered by transform coding of the residuum. Therefore, quantization of the delta CPVs may be introduced as follows: the values are linearly quantized after estimation at the encoder and de-quantized before reconstruction at the decoder. Transmitting quantized delta CPVs has the advantage that the bit rate is reduced, while the signal reconstructed from de-quantized values only differs slightly from the best possible approximation. In consequence this leads to lower rate-distortion cost compared to the case without quantization. Regarding the step size of the linear quantization, the performance can be further improved by applying a principle well known from transform coding, namely defining the quantization step size as a function of the QP and not as a fixed value. Setting the quantization step size for the delta CPVs as $q_{\Delta CPV}=2^{QP/10}$ with $$1 \leq q_{\Delta CPV} \leq \frac{\max(\Delta \cdot CPV)}{2}$$

turned out to be efficient and robust.

A possible signaling of the delta CPVs in the bitstream for the two regions of a partitioned block could be construed as follows:

dmm_dc_1_abs[ x0 + i ][ y0 + i ]
    dmm_dc_1_sign_flag[ x0 + i ][ y0 + i ]
    dmm_dc_2_abs[ x0 + i ][ y0 + i ]
    dmm_dc_2_sign_flag[ x0 + i ][ y0 + i ]

The transmission on the bitstream for a certain block could be made dependent on a syntax element DmmDeltaFlag, explicitly transmitted or derived from some coding mode syntax element.

dmm_dc_1_abs, dmm_dc_1_sign_flag, dmm_dc_2_abs, dmm_dc_2_sign_flag could be used to derive DmmQuantOffsetDC1 and DmmQuantOffsetDC2 values as follows:

DmmQuantOffsetDC1[x0][y0]=(1−
        2*dmm_dc_1_sign_flag[x0][y0])
        *dmm_dc_1_abs[x0][y0]

DmmQuantOffsetDC2[x0][y0]=(1−
        2*dmm_dc_2_sign_flag[x0][y0])
        *dmm_dc_2_abs[x0][y0]

The de-quantized offsets dmmOffsetDC1 and dmmOffsetDC2 may be derived from DmmQuantOffsetDC1 and DmmQuantOffsetDC2 as follows.

dmmOffsetDC1=DmmQuantOffsetDC1*Clip3(1,
        (1<<BitDepth$_Y$)−1,2$^{(QP'_Y/10)-2}$)

dmmOffsetDC2=DmmQuantOffsetDC2*Clip3(1,
        (1<<BitDepth$_Y$)−1,2$^{(QP'_Y/10)-2}$)

BitDepth$_Y$ may be the bitdepth at which DmmQuantOffsetDC1 and DmmQuantOffsetDC2 are internally, within Encoder and Decoder, represented, and QP' may be the just-mentioned quantization parameter QP involved in coding transform coefficient levels of the prediction residual of the current slice, for example.

The constant partition values CPVs are then obtainable by adding the dequantized offsets to the predicted CPVs:

For the first partition: dmmPredPartitionDC1+dmmOffsetDC1

For the second partition: dmmPredPartitionDC2+dmmOffsetDC2

As already mentioned at the beginning of section 3, the distortion for estimation tools can be measured in two different ways. Regarding delta CPVs, these distortion methods strongly affect the estimation process. In case the distortion is measured as the difference between distorted and original depth signal of the block, the estimation process searches the closest approximation of the original CPVs by simply calculating and quantizing the delta CPVs as described above. In case the distortion is measured for synthesized views, the estimation process can be extended for better adapting the delta CPVs to the quality of synthesized views. This is based on the fact that those delta CPVs that lead to the best approximation of the original CPVs not necessarily lead to the best synthesized view quality. For finding the delta CPVs that lead to the best synthesized view quality, the estimation process is extended by a minimum distortion search (cp. Section 1.4.2), which iterates over all possible delta CPV combinations for the two partitions. For the sake of efficient processing and signaling the range of tested values can be limited. The search results in the combination of delta CPVs that causes the minimum distortion in synthesized views and for transmission these values are finally quantized.

Note that the delta CPV method potentially enables skipping the transformation/quantization and transmission of the (remaining) residuum. Due to a close approximation of the original or optimum depth signal, respectively, the impact of omitting the residuum is limited, especially if evaluated with respect to the quality of rendered views.

4. Coding of Modes 4.1 Mode Signaling

In the encoding process, one mode is selected for every block through rate-distortion optimization and the mode information is signaled in the bitstream such as, for example, prior to the partition and CPV information. According to section 3 the following four block partition modes may be defined (in addition to non-irregular partitioning modes, for example):

Wedgelet_ModelIntra: Intra modeling of Wedgelet block partition (see section 3.1.1)

Wedgelet_PredIntra: Intra prediction of Wedgelet block partition (see section 3.1.2)

Wedgelet_PredTexture: Texture-based prediction of Wedgelet block partition (see section 3.2.1)

Contour_PredTexture: Texture-based prediction of Contour block partition (see section 3.2.2)

Each of the four modes can be applied with or without the method for delta CPV processing (see section 3.3.2), resulting in eight different mode_IDs for signaling the decoder, which type of processing has to be applied for prediction and reconstruction of the block.

If the block partition modes introduced above are implemented as an additional set of block coding modes into an existing coding framework such as the one of FIGS. 1 to 3, an additional flag prior to the mode information may be transmitted in the bit stream, signaling whether a block partition mode is used or not. In case this flag is not set, the normal block coding mode signaling follows. Otherwise, a mode_ID is signaled, which specifies the actual block partition mode and if delta CPVs are also transmitted or not. In the bitstream the mode_ID is represented through three bins.

4.2 Mode Pre-Selection

The idea behind mode pre-selection is to reduce the processing and signaling effort for block partition coding (see section 3), by implementing concepts that exclude modes which are very unlikely to be selected for the current block.

The first mode pre-selection concepts disables modes whose probability is very low for small block sizes. This means that in most cases the distortion is high compared to the rate necessitated for signaling the mode information. Among the four modes defined in section 4.1 this applies to Wedgelet_PredIntra and Contour_PredTexture. Based on a statistical analysis, these two modes are disabled for block sizes 4×4 and smaller.

The second mode pre-selection concept applies to the two modes based on inter-component prediction, namely Wedgelet_PredTexture and Contour_PredTexture. The idea behind this concept is to adaptively exclude these modes, if it is very unlikely that a meaningful block partition pattern can be derived from the texture reference block. Such blocks are characterized by being relatively plane without significant edges and contours. For identifying these blocks, the variance of the texture reference block is analyzed. The criterion for disabling the two mentioned modes is that the variance is below a certain threshold. This mode pre-selection method is implemented as follows: The variance is measured as the mean absolute error (MAE) between the luma samples and the mean value of the reference block (see 216 in FIG. 13). Instead of a fixed value, the threshold is set as a function of the quantization parameter (QP). Based on the results of a statistical analysis of MAE values, the threshold is set as $$t_{MAE}(QP) = \frac{QP}{2},$$

which has the effect, that these two modes are excluded for more blocks, if the QP is higher and vice versa.

Figure 15:
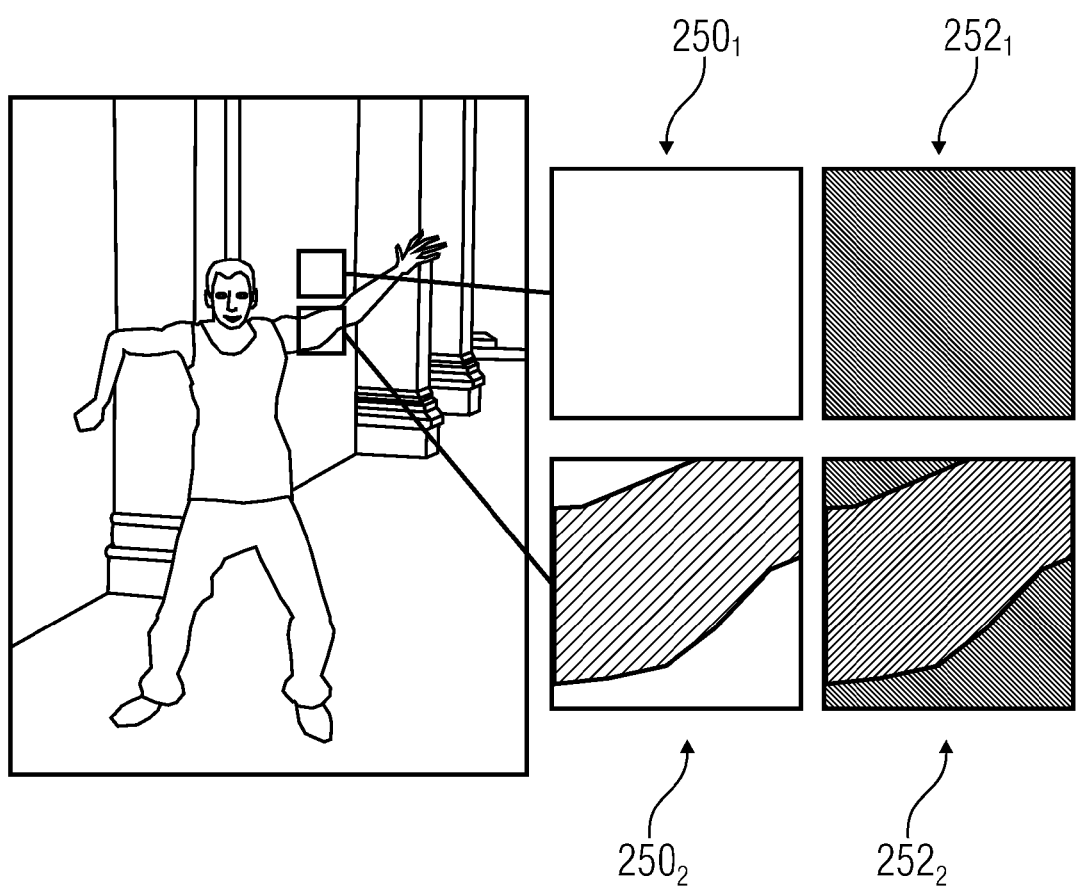
FIG. 15 shows a mode preselection based on texture luma variance.

FIG. 15 shows a visualization of this mode pre-selection method, with details for two texture luma blocks 250$_1$ and 250$_2$ and the absolute differences versus the mean value on the right at 252$_1$ and 252$_2$, respectively. Block 250$_1$ has a very plane spatial sample value appearance with nearly no structure, which is reflected by a very low variance. As no meaningful partition information could be predicted from this block 250$_1$, the modes Wedgelet_PredTexture and Contour_PredTexture are not considered. In contrast to that block 250$_2$ has a high variance, resulting from significant edges and contours. Thus, the two modes are considered, as it is likely that the partition information derived from block 250$_2$ is a good predictor for the partition of the according depth block.

TABLE 1

Modes according to preselection decisions.

| | limitation: block size | | | |
| --- | --- | --- | --- | --- |
| | off | on | off | on |
| | limitation: texture ref. variance | | | |
| | off | off | on | on |
| Wedgelet_ModelIntra | x | x | x | x |
| Wedgelet_ModelIntra + delta CPVs | x | x | x | x |
| Wedgelet_PredIntra | x | | x | |
| Wedgelet_PredIntra + delta CPVs | x | | x | |
| Wedgelet_PredTexture | x | x | | |
| Wedgelet_PredTexture + delta CPVs | x | x | | |
| Contour_PredTexture | x | | | |
| Contour_PredTexture + delta CPVs | x | | | |
| number of mode_IDs | 8 | 4 | 4 | 2 |
| number of bins | 3 | 2 | 2 | 1 |

Table 1 summarizes the effects of the two mode preselection concepts on the available modes. By excluding certain modes, the number of mode_IDs that have to be signaled in the bitstream decreases. The table shows that the two methods can be combined in an efficient way, as each method reduces the number of bins necessitated for signaling the mode_ID by one and the combination of both modes reduces the number of bins by two.

5. Generalizations

After having described several possible irregular partitioning modes, their conceptual subdivision into bi-segmentation determination (see 3.1 and 3.2) on the one hand and coding parameter coding for the resulting two partitions (see 3.3) on the other hand, as well as their possible employment in a coding framework and the description of a possible coding environment to which such modes could be additionally be provided, the resulting embodiments for respective decoders and encoders shall be described, partially in more generic terms. In particular, the following sections highlight specific advantageous details outlined above and explain how these details may be used within decoders and encoders in a sense more generic than described above. In particular, as will be outlined below, some of the advantageous aspects used in the above modes, may be exploited individually.

5.1 Wedgelet Separation Line Continuation Across Block Borders

As became clear from the above discussion, the use of wedgelet partitioning forms a possible compromise between signaling overhead for signaling the partitioning on the one hand, and the amount of variety achievable by the irregular partitioning on the other hand. Nevertheless, a remarkable amount of side information data would be necessitated in order to explicitly transmit the partitioning information, i.e. the position of the wedgelet separation line such as, for example, by using indexing of the position of the wedgelet separation line such as, for example, in accordance with the concept outlined above with respect to section 3.1.1.

Accordingly, wedgelet separation line continuation across block borders forms one possible way of solving the just outlined problem. The above description in section 3.1.2 explained a specific example for taking advantage of this problem's solution. More generically, however, in exploiting the idea of wedgelet separation line continuation over block borders, a decoder may, in accordance with an embodiment of the present invention, be constructed as outlined below with respect to FIG. 16. Nevertheless, all the details described in section 3.1.2 and the other sections among 3 to 4 are to be understood as possible realization details, which may be combined with the description presented below individually.

Figure 16:
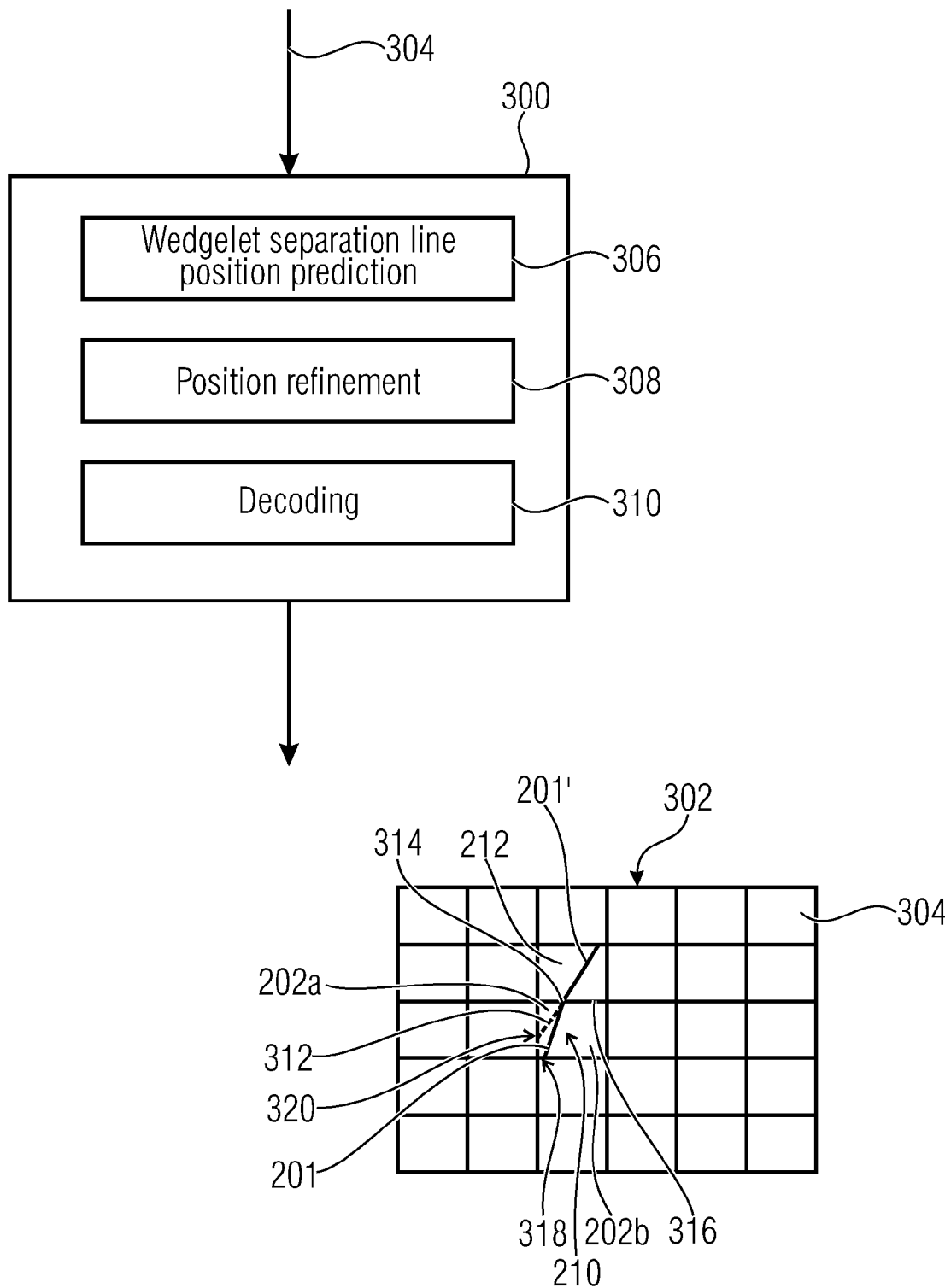
FIG. 16 shows a block diagram of a decoder according to an embodiment.

The decoder of FIG. 16 is generally indicated with reference sign 300 and is configured to reconstruct a sample array 302 from a data stream 304. The decoder is configured to perform the reconstruction by block-based decoding. For example, the sample array 302 may be part of a sequence of sample arrays and the decoder 300 may be implemented as a block-based hybrid decoder supporting different coding modes for each block 304. The sample array may be any spatially sampled information such as, for example, texture or depth maps. For example, the decoder 300 of FIG. 16 may be implemented so as to reconstruct one view including texture/video and depth/disparity maps representing the sample array 302. Insofar, the decoder 300 may be implemented as the pair of decoding branches $106_{d,1}$ plus $106_{v,1}$ or may be implemented according to decoding branch $106_{d,1}$ individually. That is, decoder 300 may be configured to reconstruct the sample array 302 using coding modes such as intra prediction, temporal (motion compensated) prediction and/or inter-view (disparity compensated) prediction, with and without residual coding of the prediction residual. The coding modes may, for example, also comprise an explicit wedgelet coding mode according to which for a respective block, the position of its wedgelet separation line is transmitted explicitly within data stream 304, such as the mode outlined in section 3.1.1.

In any case, this decoder 300 is configured such that same performs for a current block 210, such as a block for which a predetermined coding mode option is signaled within data stream 304, the steps outlined now. The functionalities involved in these steps may be integrated within intra-prediction module 36 or intra-prediction module and exchange module 52.

The steps performed by decoder 300 for a block of a respective mode are a wedgelet separation line position prediction 306 followed by a position refinement 308 and a decoding 310. In particular, the decoder of FIG. 16 is configured to predict in step 306 a position 312 of a wedgelet separation line within block 210 of the sample array 302 depending on a wedgelet separation line 201' of a neighboring block 212 of block 210 such that the wedgelet separation line at the predicted position 312 forms an extension or continuation of the wedgelet separation line 201' of the neighboring block 212 into the current block 210. Again, decoder 300 may have derived the position of the wedgelet separation line 201' of the neighboring block 212 by respective explicit signaling for block 212 from data stream 304 or by some other coding option, such as by edge detection within a texture sample array, which sample array 302 belongs to or the like. Other possibilities have been described above and will be further described below.

As described above, the wedgelet separation line of block 210, the position 312 of which is predicted in 306, may be a straight line as it was the case with the above description in section 3.1.2. However, alternatively, the lines may be defined more generally, e.g. using a sequence of sample positions hops, i.e. a sequence of symbols each defining the next pixels in line, belonging the separation line. The lines may have a predetermined analytically determined curvature which may also be predicted from line 201' or may be derived from some other previously processed portion of data stream 304.

In particular, the prediction 306 may be configured such that, afterwards, the wedgelet separation line of block 210 is preliminarily determined with respect to the general extension direction as well as the position lateral to the general extension direction of the wedgelet separation line. In case of a curved line, curve fitting using, for example, a polynomial function, may be used to extrapolate the separation line of block 212 and locate block's 210 separation line, respectively. In case of a straight line, slope and position in a direction lateral to the wedgelet separation line is determined.

With regard to the prediction 306, it should also be mentioned that the neighborhood and the extension do not necessarily have to be defined in spatial terms. Rather, blocks 210 and 212 could also be temporally neighboring. For example, block 212 could be the co-located block of a sample array of a sample array sequence temporally neighboring the sample array 302. In that case, the extension of the wedgelet separation line 201 into block 210 would be a "temporal continuation".

An explicit possibility how the prediction 306 could be performed has been outlined above in section 3.1.2, which description is referred to here. The position refinement 308 is for refining the predicted position 312. That is, decoder 300 is configured to, in the position refinement 308, refine the predicted position 312 of the wedgelet separation line 301 of block 210 using refinement information signaled within the data stream 304. Thereby, the wedgelet separation line 201 as refined divides block 210 into first and second wedgelet partitions 202a and 202b.

As described above, the decoder 300 may be configured such that the wedgelet separation line 201 at the predicted position 312 forms a spatial co-linear extension of the wedgelet separation line 201' of the neighboring block 212, and the refinement may be restricted such that a start position 314 of the wedgelet separation line of the predetermined block 210, adjoining the neighboring block 212, is maintained relative to the predicted position 312, irrespective of the refinement information. That is, in case of a straight wedgelet separation line, merely its slope may be refined, while the starting point of the wedgelet separation line 201 at the edge 316 of block 210 separating blocks 210 and 212, remains unchanged. For example, the offset of the opposite end 318 of wedgelet separation line 201, i.e. the end position of wedgelet separation line 201, along the circumference of block 210 from the end position 320 in accordance with a predicted wedgelet separation line position 312 may be signaled within the data stream 304 as described above with respect to section 3.1.2.

In section 3.1.2, the offset was denoted as $E_{off}$. As described in this section, the decoder 300 may be configured to extract the refinement information from the data stream using entropy decoding where different possible offsets from the direct extension sample position 320 along the circumference of block 210, measured in units of a sample position pitch along the circumference direction, have a probability estimate associated therewith which monotonically increases from greater offsets to smaller offsets, so that smaller offsets have a higher probability associated therewith than greater offsets. For example, the VLC codeword length may monotonically decrease.

As described also above, three syntax elements may be used to transmit $E_{off}$, a first signaling as to whether any offset $E_{off}$ is present, i.e. as to whether same is zero, a second one meaning the sign of the offset, i.e. clockwise or counter-clockwise deviation, in case of the offset being not zero, and the third denoting the absolute offset value minus one: dmm_delta_end_flag, dmm_delta_end_sign_flag, dmm_delta_end_abs_minus1. In pseudo code, these syntax elements could be included as

```
dmm_delta_end_flag
if ( dmm_delta_end_flag ) {
    dmm_delta_end_abs_minus1
    dmm_delta_end_sign_flag}
``` dmm_delta_end_abs_minus1 and dmm_delta_end_sign_flag could be used to derive DmmDeltaEnd, i.e. $E_{off}$, as follows:

DmmDeltaEnd[x0][y0]=(1−2*dmm_delta_end_sign_flag[x0][y0])*(dmm_delta_end_abs_minus1[x0][y0]+1)

Then, decoder 300 is configured to, in the decoding 310, decode the predetermined block 210 in units of the first and second wedgelet partitions 202a and 202b. In the description brought forward above in sections 3 and 4, especially section 4, the decoding 310 involved a prediction of the current block 210 by assigning a first constant partition value $W_{pred,P_1}$ to samples of the sample array position within the first wedgelet partition 202a and a second constant partition value $W_{pred,P_2}$ to samples of the sample array position within the second wedgelet partition 202b. The advantage of this implementation of the decoding procedure 310 is that the amount of side information may be kept low. In particular, this possible implementation is especially advantageous in case of the kind of information conveyed by the sample array having the above-outlined property of being composed of relatively flat value plateaus with steep edges therebetween, such as in case of depth maps. However, it would even be possible that the decoder assigned other coding parameters individually to the wedgelet partitions 202a and 202b. For example, motion and/or disparity compensated prediction may be applied individually to partitions 202a and 202b in decoding 310 thereby obtaining respective motion and/or disparity parameters individually for partitions 202a and 202b such as individual vectors. Alternatively, partitions 202a and 202b may be individually be intra-coded in decoding 306 such as by individually applying a respective intra coding direction onto same.

According to FIG. 16, the following information may be present in data stream for block 210: 1) the coding option identifier having the respective predetermined state triggering the steps 306-310, 2) the refinement information such as the end position offset, 3) optionally, coding parameters—such as CPV or CPV residual—for one or both partitions 202a, 202b—optional, because same may be allowed to be predicted—spatially or temporally from neighboring samples/blocks, 4) optionally, coding parameter residual such as DeltaCPV.

Moreover, the decoder 300 of FIG. 16 may be configured such that the coding mode realized by procedures 306 to 310 is merely a default coding mode option among two coding mode options triggered by a respective common predetermined value of a respective coding option identifier within data stream 304. For example, the decoder 300 of FIG. 16 could be configured to retrieve a coding option identifier from the data stream 304 with, if the coding option identifier has a predetermined value, checking whether any of a set of candidate blocks neighboring the predetermined block has a wedgelet separation line extending into block 210. For example, the candidate blocks may encompass the spatially neighboring blocks 304 of sample array 302 which precede the current block 210 in a coding order—or decoding order—applied by the decoder 300 in decoding blocks 304 of sample array 302. For example, the coding order may scan the blocks 304 row-wise from left to right, top to bottom, and in that case the candidate blocks may encompass the immediately neighboring block to the left of the current block 210 and the immediately neighboring block to the top of the current block 210 such as block 212. If the check reveals that there is such a wedgelet block among the set of candidate blocks, decoder 300 may perform the prediction 306, the refinement 308 and the decoding 310 in an unmodified manner. If not, however, decoder 300 may perform the prediction 306 differently. As described above in section 3.1.2 and as will be outlined in more detail with respect to the next section, decoder 300 may then be configured to predict the position of the wedgelet separation line 201 within the current block 210 by setting an extension direction of the wedgelet separation line 201 within the current block 210 depending on reconstructed neighboring samples neighboring the current block 210 or depending on an intra prediction direction of one or more intra-predicted blocks of the candidate blocks. As far as the possible implementations for the prediction of the constant partition values in the decoding 310 are concerned, reference is made to the above and below explanations.

Further, it should be noted that a specific advantage results if the wedgelet separation line continuation across block borders is combined with a coding mode which enables more freedom in the bi-segmentation of the current block, such as a contour mode as outlined above and described further below. To be more precise, decoder 300 may be configured to support the mode realized by blocks 306 to 310 as well as a contour partitioning mode, thereby enabling adapting the coding overhead appropriately to the blocks' needs.

In any case, the block as decoded/reconstructed by procedures 306 to 310, may serve as a reference in a prediction loop of decoder 300. That is, the prediction result in case of using the bi-valued prediction, may serve as a reference, for example, for motion and/or disparity compensated prediction. Moreover, the reconstructed values obtained by the decoding 310, may serve as spatial neighboring samples in intra predicting any of the blocks 304 of sample array 302 following in decoding order.

Figure 17:
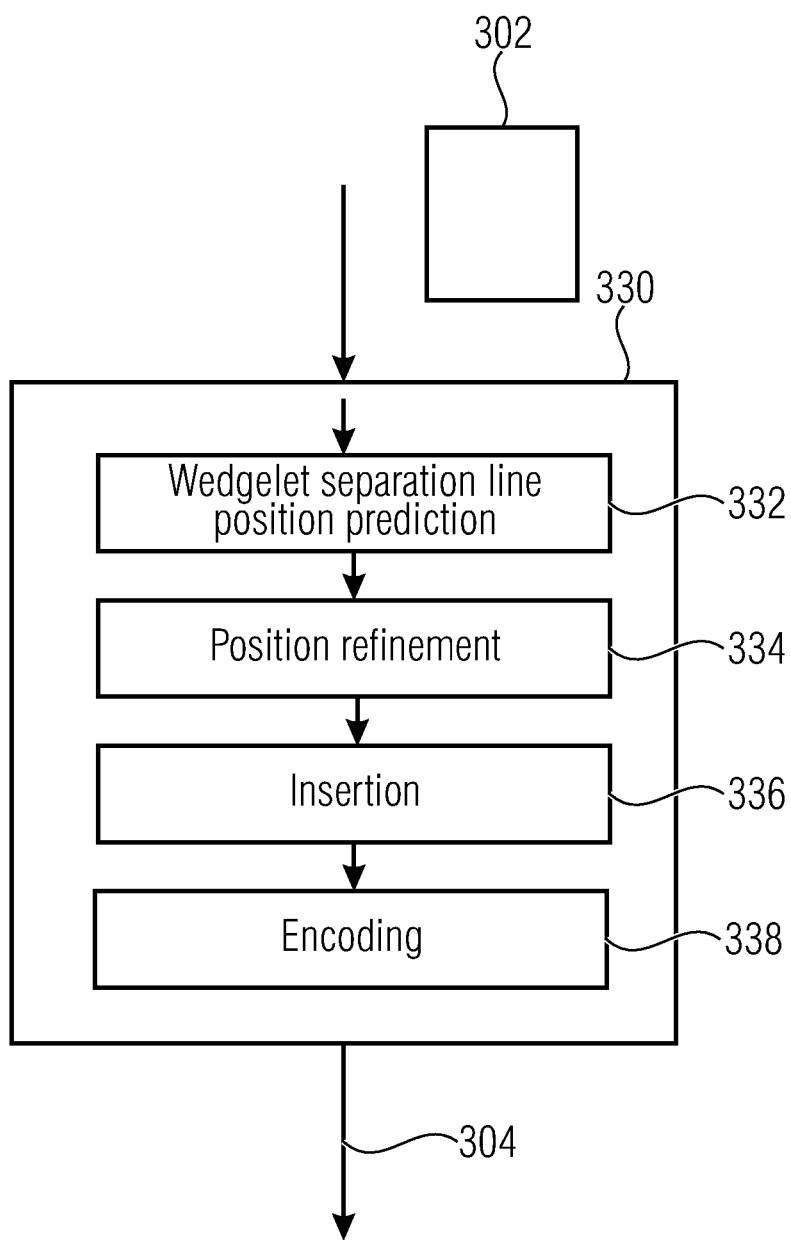
FIG. 17 shows a block diagram of an encoder fitting to FIG. 16.

FIG. 17 shows a possible encoder fitting to the decoder of FIG. 16. In particular, FIG. 17 shows an encoder 330 for encoding a sample array into a data stream configured to predict a position of a wedgelet separation line within a predetermined block of the sample array depending on a wedgelet separation line of a neighboring block of the predetermined block such that the wedgelet separation line at the predicted position forms an extension of the wedgelet separation line of the neighboring block into the predetermined block. This functionality is shown at 332. Further, the decoder 330 has the functionality 334 to refine the predicted position of the wedgelet separation line using refinement information, the wedgelet separation line of the predetermined block dividing the predetermined block into first and second wedgelet partitions. The encoder 330 also has an insertion functionality 336 according to which the refinement information is inserted into the data stream and an encoding functionality according to which encoder 330 encodes the predetermined block in units of the first and second wedgelet partitions.

5.2 Wedgelet Separation Line Extension Direction Prediction from an Intra Prediction Direction of a Neighboring Block As described above, even wedgelet-based block partitioning necessitates a remarkable amount of side information in order to inform the decoding side on the position of the wedgelet separation line.

An idea that the below-outlined embodiments are based on is that the intra prediction direction of a neighboring, intra-predicted block may be used in order to predict the extension direction of the wedgelet separation line of a current block, thereby reducing the side information rate necessitated in order to convey the partitioning information.

In the above description, section 3.1.2 showed a possible implementation of the below-outlined embodiments which, in turn, are described in more generic terms so as to not be restricted to the conglomeration of irregular partitioning modes outlined above in sections 3 and 4. Rather, the just mentioned idea may be advantageously used independent from the other details described in section 3.1.2, as described in more detail below. Nevertheless, all the details described in section 3.1.2 and the other sections are to be understood as possible realization details, which may be combined with the description presented below individually.

Figure 18:
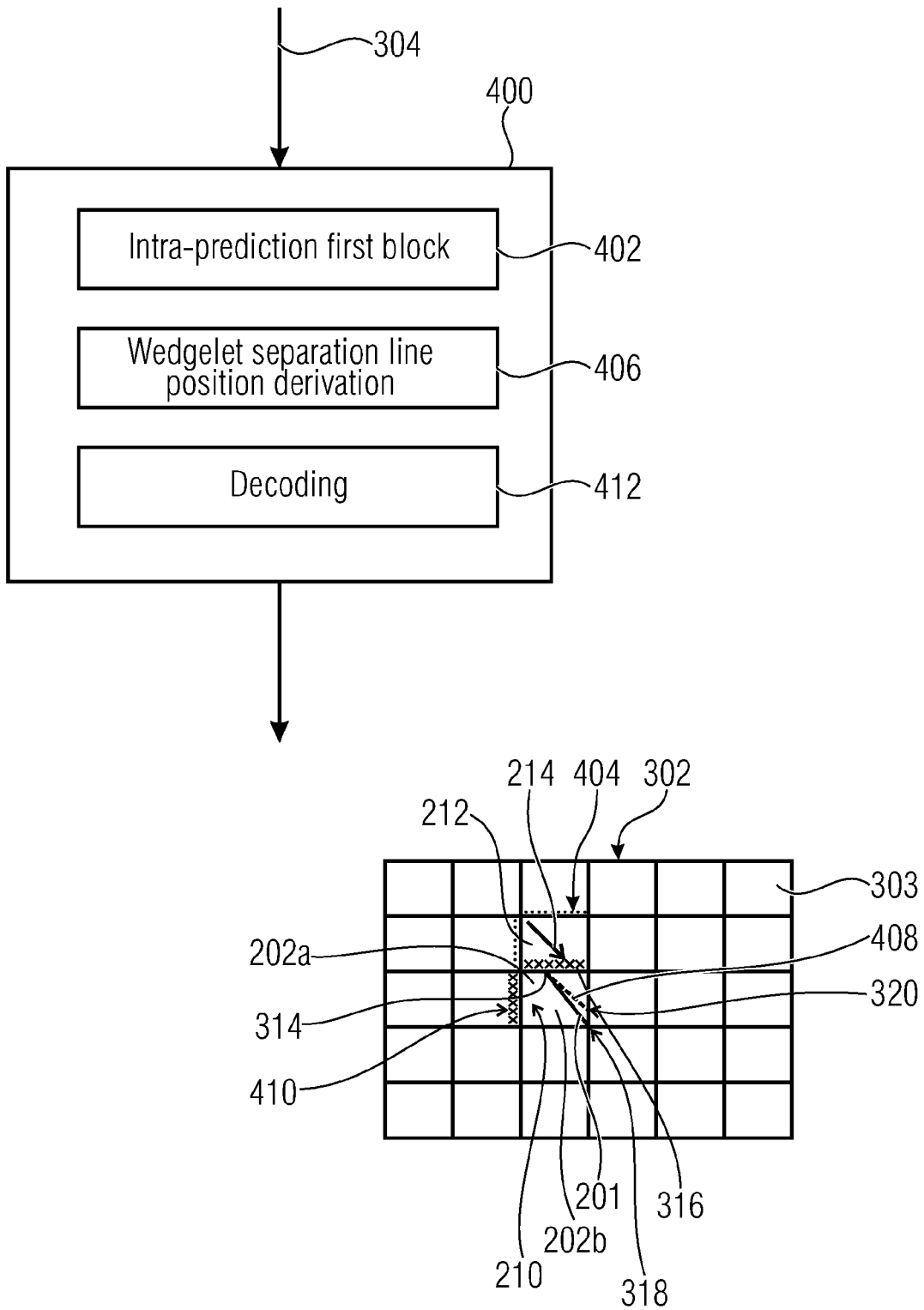
FIG. 18 shows a block diagram of a decoder according to an embodiment.

Accordingly, FIG. 18 shows an embodiment for a decoder 400, which exploits the just-outlined idea and may be implemented as described above with respect to section 3.1.2 and/or FIGS. 1 to 3 as far as possible additional functionalities are concerned. That is, the decoder 400 of FIG. 18 is configured to reconstruct a sample array 302 from a data stream 304. Generally, decoder 400 of FIG. 18 may be implemented as set out above in section 5 with respect to decoder 300 of FIG. 16, except for the coding mode defined by the functionalities 306 to 310, which is optional for the decoder of FIG. 18. That is, the decoder 400 of FIG. 18 may operate to reconstruct the sample array 302 of FIG. 18 by block-based decoding, such as block-based hybrid decoding. Among the coding modes available for blocks 303 of sample array 302, there is an intra prediction mode further outlined with respect to functionality module 402 of decoder 400. Just as it is the case with decoder 300 of FIG. 18, the subdivision of sample array 302 into blocks 303 may be fixed by default, or may be signaled within data stream 304 by respective subdivision information. In particular, decoder 400 of FIG. 18 may be constructed as outlined above with respect to FIGS. 1 to 3, namely like the decoder of FIG. 3 or any of the view decoders such as the pair of coding branches $106_{v/d,\ 1}$, or merely as a depth decoder such as $106_{d,\ 1}$.

In particular, the decoder 400 of FIG. 18 has a functionality 402 according to which a first block 212 of the sample array 302 is predicted using intra prediction. For example, the intra prediction mode is signaled within data stream 304 for block 212. Decoder 400 may be configured to perform the intra prediction 402 by filling the first block 212 by copying reconstructed values of samples 404 of the sample array 302, neighboring the first block 212 along an intra prediction direction 214 into the first block 212. The intra prediction direction 214 may also be signaled within data stream 304 for block 212, such as by indexing one of several possible directions. Alternatively, the intra prediction direction 214 of block 212 itself may be subject to prediction. See, for example, the description of FIGS. 1 to 3 where intra predictor 36 of decoding branch $106_{d,\ 1}$ could be configured to perform step 402. To be more precise, the neighboring samples 404 may belong to blocks 303 of the sample array 302 which have already been passed in decoding order by decoder 400 so that their reconstruction is already available, including the reconstructed values of the neighboring samples 404 neighboring block 212. As described above, various coding modes may be have been used by decoder 400 to reconstruct these preceding blocks, preceding in decoding order.

Further, the decoder 400 of FIG. 18 is configured to predict a position 312 of a wedgelet separation line 201 within a second block 210 neighboring the first block 212 by setting an extension direction of the wedgelet separation line 201 within the second block 210 depending on the intra prediction direction 214 of the neighboring block 212, the wedgelet separation line 201 dividing the second block 210 into first and second wedgelet partitions 202a and 202b. For example, the decoder 400 of FIG. 18 may be configured to set the extension direction of the wedgelet separation line 201 to be equal to the intra prediction direction 214 as far as possible with respect to a quantization of a representation of the extension direction of the wedgelet separation line 201. In case of a straight separation line, the extension direction simply corresponds to the line's slope. In case of curved separation lines, the intra prediction direction may, for example, adopted as the local slope of the current block's separation line at the border to the neighboring block. For example, the decoder 400 of FIG. 18 chooses the extension direction among a set of possible extension directions which forms the best approximation of the intra prediction direction 214.

Thus, in the prediction 404, the decoder 400 predicts the position 312 of the wedgelet separation line 201 of the current block 210 at least as far as the extension direction thereof is concerned. The derivation of the position of the wedgelet separation line 201 of the second block 210 may be finalized with leaving the extension direction 408 unmodified. For example, although it was described in section 3.1.2 that a prediction of a starting point 314 of the wedgelet separation line 201 may be performed by decoder 400 in deriving the wedgelet separation line position in step 406, decoder 400 may alternatively be configured to derive this starting point 314 by explicit signaling within data stream 304. Moreover, decoder 400 of FIG. 18 could be configured to spatially place the wedgelet separation line 201 in the derivation 406 in a direction lateral to the extension direction 316 such as under maintenance of the extension direction 316, parallel to the extension direction 316, by temporally predicting the distance in the lateral direction from a co-located wedgelet block in a previously decoded sample array, or by spatially predicting the position in the lateral direction from another sample array belonging to a different view compared to sample array 302.

It is, however, of advantage that the decoder 400, in deriving the position of the wedgelet separation line 201 within the second block 210 of the sample array 302, places a starting point 314 of the wedgelet separation line 201 at a position of a maximum change between consecutive ones of a sequence of reconstructed values of samples of a line of samples extending adjacent to the second block 210 along a portion of a circumference of the second block 210. The line of samples is indicated by reference sign 410 in FIG. 18 with the samples being symbolized by small crosses. The line 410 of samples may be restricted to samples of spatially neighboring blocks being available. In any case, it should be emphasized that the line 410 of samples within which the maximum change is determined, may extend around one of the corners of rectangular block 210 as shown in FIG. 18. Thus, according to this procedure decoder 400 may be configured to place the wedgelet separation line in the derivation 406 so as to start between the neighboring samples and the sample line 410, where the maximum difference in the reconstructed values exists, in parallel to the extension direction 408.

Accordingly, side information rate is saved since a good prediction has been found to derive the position of the wedgelet separation line 201 by other means than explicit signalization within the data stream 304.

Then, the decoding 412 by decoder 400 takes place according to which decoder 400 decodes the second block in units of the first and second wedgelet partitions 202a and 202b just as it was described with respect to FIG. 16.

Naturally, the decoder 400 of FIG. 18 may be modified to also comprise the refinement functionality 308 of FIG. 16. Accordingly, an offset of the end position 318 of the wedgelet separation line 201 of the current block 210 relative to an end position 320 of the position of the wedgelet separation line—which may or may not, as denoted above, be restricted to be straight—as derived in step 406 may be signaled within the data stream 304.

As described also above, three syntax elements may be used to transmit such an end position offset, $E_{off}$, a first signaling as to whether any offset $E_{off}$ is present, i.e. as to whether same is zero, a second one meaning the sign of the offset, i.e. clockwise or counter-clockwise deviation, in case of the offset being not zero, and the third denoting the absolute offset value minus one: dmm_delta_end_flag, dmm_delta_end_sign_flag, dmm_delta_end_abs_minus1. In pseudo code, these syntax elements could be included as

```
dmm_delta_end_flag
if ( dmm_delta_end_flag) {
    dmm_delta_end_abs_minus1
    dmm_delta_end_sign_flag}
``` dmm_delta_end_abs_minus1 and dmm_delta_end_sign_flag could be used to derive DmmDeltaEnd, i.e. $E_{off}$, as follows:

DmmDeltaEnd[x0][y0]=(1−2*dmm_delta_end_sign_flag[x0][y0])*(dmm_delta_end_abs_minus1[x0][y0]+1)

However, alternative procedure are feasible as well. For example, instead of signaling the end position offset, a direction or angle offset relative to the extension direction set depending on the intra prediction direction 214 could be signaled within data stream 304 for block 202.

According to FIG. 18, the following information may be present in data stream for block 210: 1) the coding option identifier having the respective predetermined state triggering the steps 406-412, 2) optionally, refinement information such as an end position offset, 3) optionally, coding parameters—such as CPV or CPV residual—for one or both partitions 202a, 202b—optional, because same may be allowed to be predicted—spatially or temporally from neighboring samples/blocks, 4) optionally, coding parameter residual such as DeltaCPV.

Regarding the possible modifications of the decoding step 412 relative to the description of section 3.3, reference is made to the above description of step 310 of FIG. 16.

It goes without saying that the decoder 400 of FIG. 18 may be configured to treat steps 406 and 412 as a coding mode option that is activated by a coding option identifier within data stream 304, wherein the wedgelet separation line position derivation 406 forms a subordinate measure for deriving the wedgelet separation line position in case none of a set of candidate blocks in the neighborhood of the current block 210 already has a wedgelet separation line in it, an extension of which continues into the current block 210.

Figure 19:
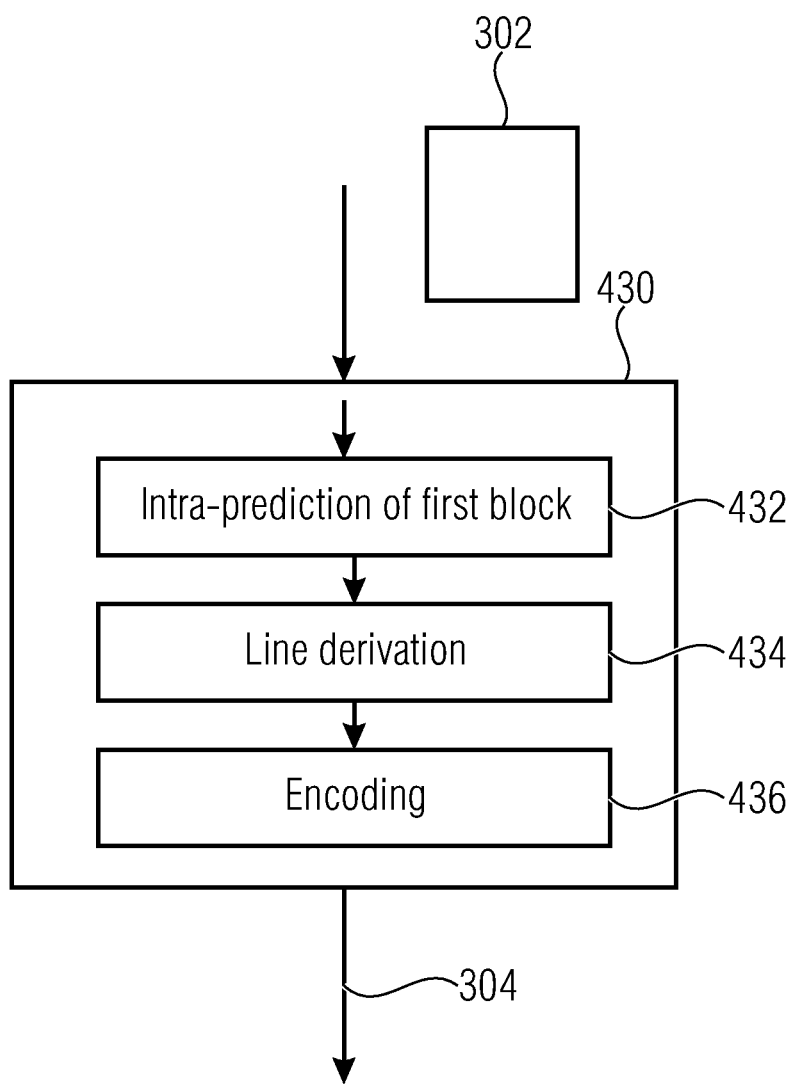
FIG. 19 shows a block diagram of an encoder fitting to FIG. 18.

FIG. 19 shows an embodiment for an encoder fitting the decoder of FIG. 18. The encoder of FIG. 19 is generally indicated at reference sign 430 and is configured to encode the sample array into a data stream 304. Internally, the encoder 430 is configured to predict a first block of the sample array using the intra prediction in block 432, and the line derivation in accordance with the description of block 406 in FIG. 18 in block 434. Then, encoder 430 encodes the second block which was the subject of the line derivation in 434, in units of the first and second partitions in encoding block 436.

Naturally, the encoder 430 is, beyond the functionalities shown in FIG. 19, configured to operate so as to mirror the functionality of the decoder of FIG. 18. That is, the encoder 430 may operate block-based using, for example, block-based hybrid encoding. Although not explicitly said, same also applies with regard to the encoder of FIG. 17 when compared to the decoder of FIG. 16.

5.3 Wedgelet Separation Line Derivation by Placing the Starting Point Thereof According to Reconstructed Values of Neighboring Samples A further way to reduce the side information necessitated in order to convey the information on the position of the wedgelet separation line of wedgelet blocks forms the basis of the embodiment outlined further below. In particular, the idea is that previously reconstructed samples, i.e. reconstructed values of blocks preceding the current block in accordance with the coding/decoding order allow for at least a prediction of a correct placement of a starting point of the wedgelet separation line, namely by placing the starting point of the wedgelet separation line at a position of a maximum change between consecutive ones of a sequence of reconstructed values of samples of a line of samples extending adjacent to the current block along a circumference thereof. Thus, similar to the possibilities outlined above with respect to sections 5.1 and 5.2, the side information rate necessitated in order to allow for the decoder to correctly position the wedgelet separation line may be reduced. The idea underlying the embodiment outlined below was also exploited in the above description in section 3.1.2, where accordingly a possible implementation of the embodiments outlined below is described.

Figure 20:
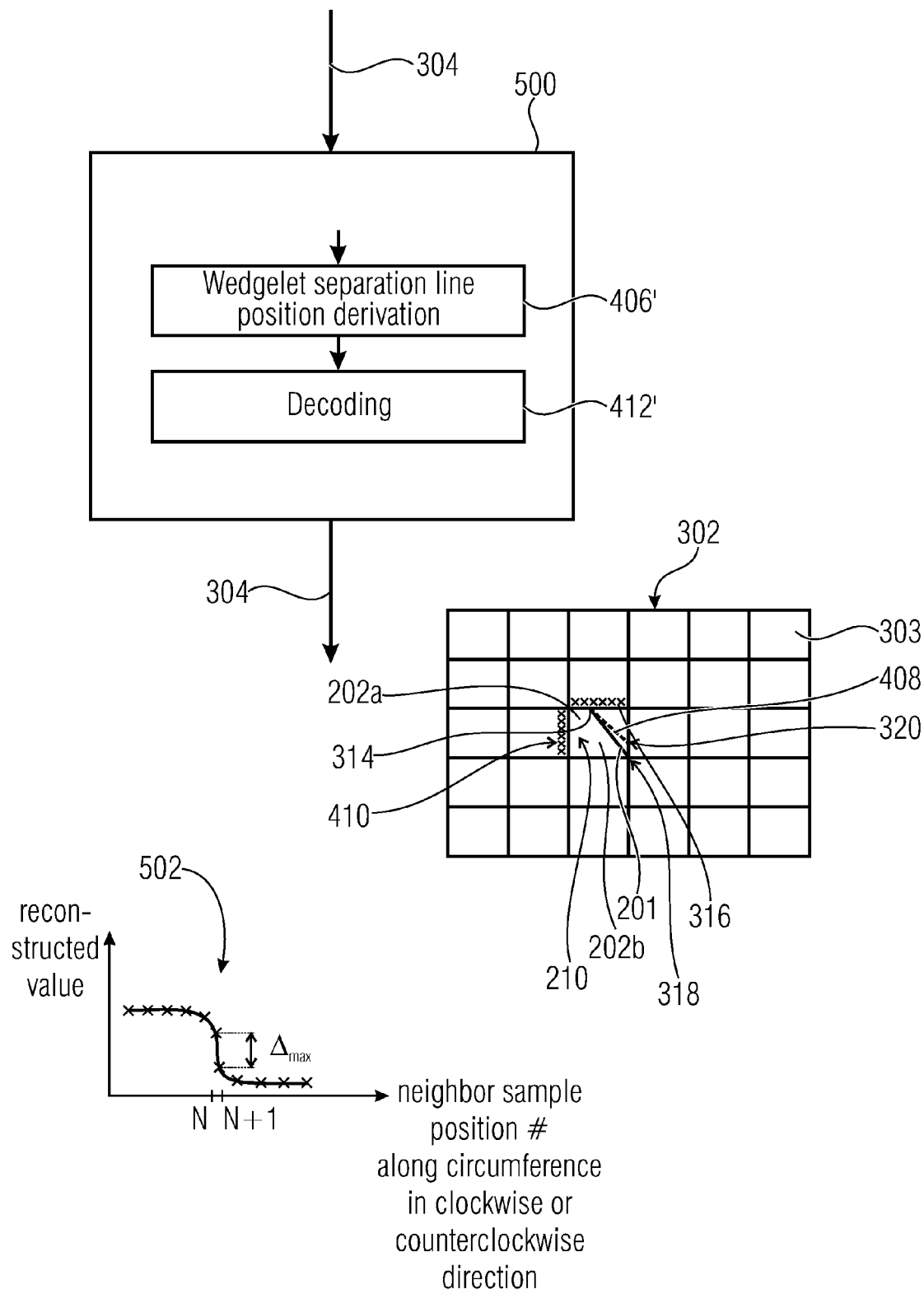
FIG. 20 shows a block diagram of a decoder according to an embodiment.

Accordingly, FIG. 20 shows an embodiment for a decoder 500, which exploits the just-outlined idea and may be implemented as described above with respect to section 3.1.2 and/or FIGS. 1 to 3 as far as possible additional functionalities are concerned. That is, the decoder 500 of FIG. 20 is configured to reconstruct a sample array 302 from a data stream 304. Generally, decoder 500 of FIG. 20 may be implemented as set out above in section 5.1 or 5.2 with respect to decoder 300 of FIG. 16, for example, except for the coding mode defined by the functionalities 306 to 310, which is optional for the decoder of FIG. 18, and with respect to decoder 400 of FIG. 18, for example, except for the coding mode defined by the functionalities 402, 406 and 412, which is optional for the decoder of FIG. 20. That is, the decoder 500 of FIG. 20 may operate to reconstruct the sample array 302 of FIG. 20 by block-based decoding, such as block-based hybrid decoding. Just as it is the case with decoder 300 of FIG. 18, the subdivision of sample array 302 into blocks 303 may be fixed by default, or may be signaled within data stream 304 by respective subdivision information. In particular, decoder 500 of FIG. 20 may be constructed as outlined above with respect to FIGS. 1 to 3, namely like the decoder of FIG. 3 or any of the view decoders such as the pair of coding branches $106_{v/d,\ 1}$, or merely as a depth decoder such as $106_{d,\ 1}$.

Frankly speaking, the decoder of FIG. 20 which is shown at reference sign 500, largely corresponds to the decoder of FIG. 18. However, the functionality outlined with regard to FIG. 18 in blocks 402 and 406 merely represents optional steps with regard to FIG. 20. Rather, the decoder 500 of FIG. 20 is configured to derive in step 406' a position of a wedgelet separation line 201 within a predetermined block 210 of the sample array 302 by placing a starting point 314 of the wedgelet separation line 201 at a position of a maximum change between consecutive ones of a sequence of reconstructed values of samples of a line 410 of samples extending adjacent to the predetermined block 210 along a portion of a circumference of a predetermined block 210, the wedgelet separation line 201 dividing the predetermined block 210 into first and second wedgelet partitions 202a and 202b. In step 412', the decoder 500 then performs the decoding of the resulting partitions 202a and 202b in the way outlined above with respect to FIG. 18.

To be more precise, in the derivation 406', decoder 500 orders the reconstructed values of the samples of the already decoded neighboring blocks of block 210 according to their order of their occurrence when traversing these samples in a counter clockwise or clockwise direction. A resulting sequence of reconstructed values is illustrated in FIG. 20 at 502. As can be seen, the greatest difference between consecutive reconstructed values occurs between the nth and (n+1)th neighboring samples and accordingly, the decoder of FIG. 20 would place the wedgelet separation line at the edge 316, to which this pair of neighboring samples adjoins, between samples of block 210 which, in turn, directly adjoin this pair of neighboring samples. As outlined above, decoder 500 may use a row-wise block scanning direction and accordingly the neighboring samples of sample line 410 may extend along the left-hand edge and top edge of block 210. The same could be achieved by using a mix of a row-wise scan of tree root blocks which are, in accordance with the decoding/coding order, scanned row-wise, wherein for each tree root block currently visited a quad-tree subdivision is performed, the leaf root blocks of which are scanned in a depth-first traversal order. When using such an order, the likelihood of having a maximum number of already reconstructed neighboring samples is increased as compared to using a breadth-first traversal order.

In the derivation 406', the decoder 500 of FIG. 20 may use the derivation of the wedgelet separation line extension direction 408 as described with regard to FIG. 18 and in section 3.1.2 as an optional manner. Alternatively, the wedgelet separation line extension direction along which decoder 500 positions the wedgelet separation line 201 of the current block 210 may be predicted differently, such as, for example, temporally from a co-located wedgelet block of a previously decoded sample array of a sample array sequence including sample array 302. Alternatively, an explicit signaling of the end point 318 of the wedgelet separation line may be used. The explicit signaling could represent the offset of the end point 318 from a sample position lying at an opposite position relative to start position 314 across a midpoint of block 210. Other solutions are, of course, also feasible.

In this regard, it should be noted that the start point 314 could be defined by decoder 500 in step 406', to correspond to the nth sample position, the (n+1)th sample position or a subpixel position therebetween.

Many of the combination possibilities mentioned above in sections 5.1 and 5.2 are also transferable to the embodiment of the present section. For example, the coding mode of decoder 500 realized by blocks 406' and 412' may represent a subsidiary fallback functionality triggered with a common predetermined value of a common coding option identifier with the wedgelet separation line continuation concept of section 5.1 representing the default coding mode which is performed instead whenever one of the set of candidate neighbor blocks has a wedgelet separation line continuing into the current block 210. The other generalizations and modifications are also feasible. For example, decoder 500 could also support a contour partitioning mode and so forth.

According to FIG. 20, the following information may be present in data stream for block 210: 1) the coding option identifier having the respective predetermined state triggering the steps 406'-412', 2) optionally, refinement information such as an end position offset, 3) optionally, coding parameters—such as CPV or CPV residual—for one or both partitions 202a, 202b—optional, because same may be allowed to be predicted—spatially or temporally from neighboring samples/blocks, 4) optionally, coding parameter residual such as DeltaCPV.

Figure 21:
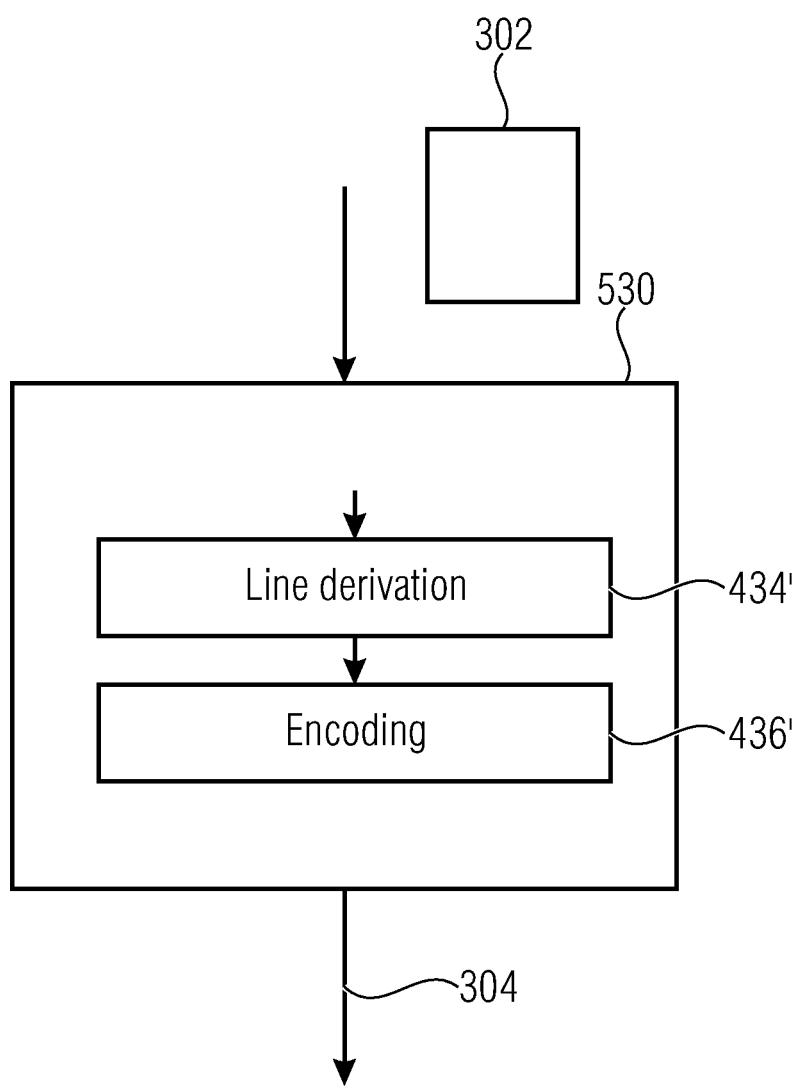
FIG. 21 shows a block diagram of an encoder fitting to FIG. 20.

FIG. 21 shows an encoder fitting to the decoder of FIG. 20. Same is indicated by reference sign 530 and is configured to perform a line derivation 434' in accordance with step 406 and an encoding 436' as outlined with respect to FIG. 19 with respect to block 436.

5.4 Tile-(Pixel-)Based Bi-Segmentation of Depth/Disparity Map by Thresholding a Co-Located Portion of the Picture As became clear from the above discussion, wedgelet-based partitioning represents a kind of tradeoff between side information rate on the one hand and achievable variety in partitioning possibilities on the other hand. Compared thereto, contour partitioning seems to be more complex in terms of side information rate.

The idea underlying the embodiments described further below is that the ability to alleviate the constraints of the partitioning to the extent that the partitions have to be wedgelet partitions, enables applying relatively uncomplex statistical analysis onto overlaid spatially sampled texture information in order to derive a good predictor for the bi-segmentation in a depth/disparity map. Thus, in accordance with this idea, it is exactly the increase of the freedom which alleviates the signaling overhead provided that co-located texture information in form of a picture is present, and that meaningful texture variation is visible therein. A possible implementation of this idea, which exploits this idea, was described above in section 3.2.2, but is described in more detail below in more generic terms. Again, all the details described in section 3.2.2 and the other sections are to be understood as possible realization details, which may be combined with the description presented below individually.

Figure 22:
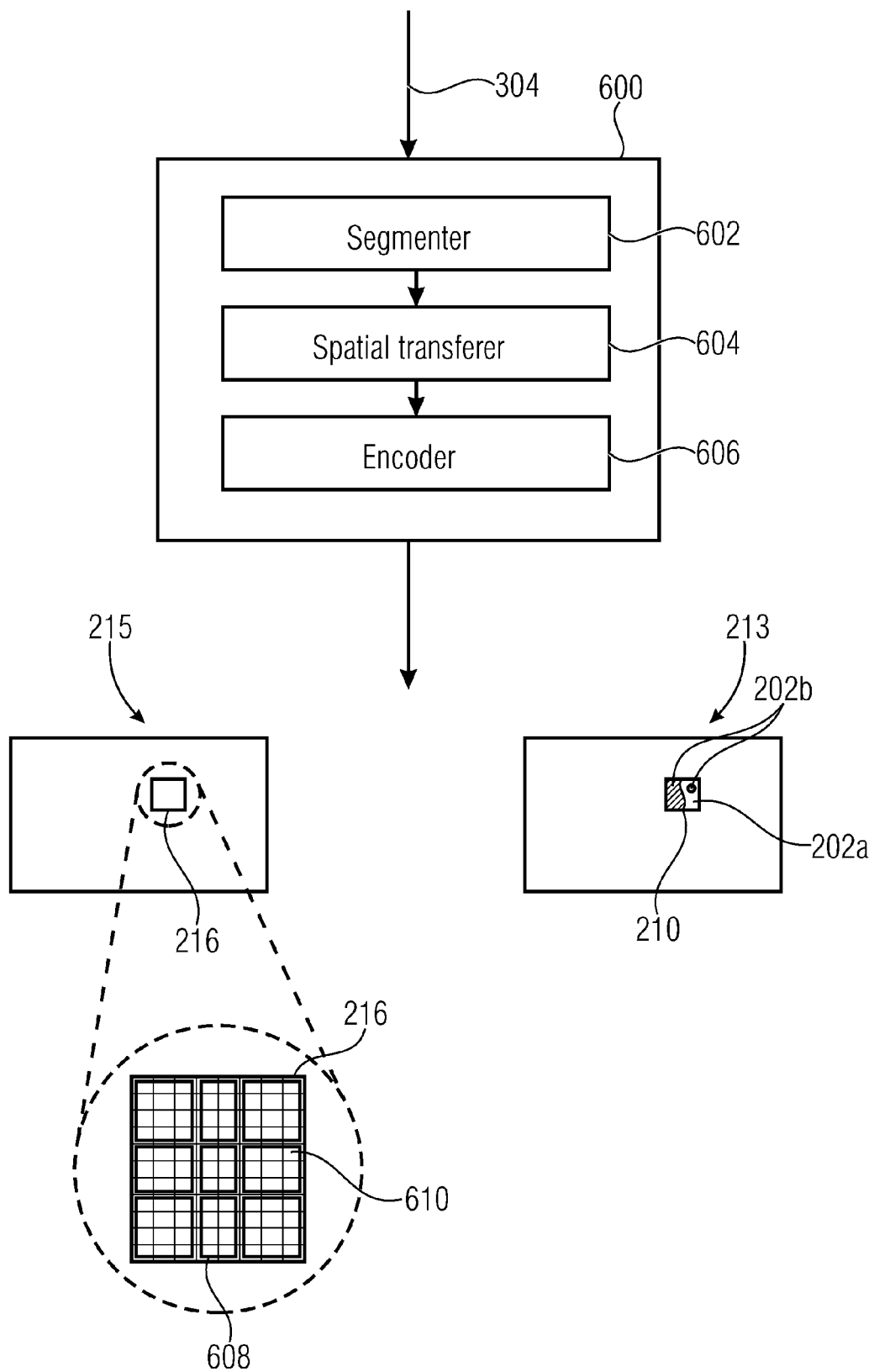
FIG. 22 shows a block diagram of a decoder according to an embodiment.

In particular, FIG. 22 shows a decoder 600 in accordance with such an embodiment of the present invention. The decoder 600 is for reconstructing a predetermined block of a depth/disparity map 213 associated with a picture 215 from a data stream 304. The decoder comprises a segmenter 602, a spatial transferer 604 and a decoder 606. The decoder 600 may be configured as described above with respect to any of the decoding branches $106_{d,1/2}$. That is, the decoder 600 may operate on a block-basis. Further, same may be implemented as a hybrid video decoder. The subdivision of the depth/disparity map 213 into blocks may be derived completely from the subdivision of picture 215 into blocks, or may deviate therefrom, wherein the subdivision of the depth/disparity map may be signaled within the data stream 304 or may be otherwise known to the decoder 600.

Segmenter 602 is configured to segment a reference block 216 of picture 215, co-located to the predetermined block 210 of the depth/disparity map 213, by thresholding the picture 215 within the reference block 216 to obtain a bi-segmentation of the reference block into first and second partitions.

The spatial transferer 604 then transfers the bi-segmentation of the reference block 216 of the picture onto the predetermined block 210 of the depth/disparity map 213 so as to obtain first and second partitions 202a and 202b of the predetermined block 210.

The decoder 606 is configured to decode a predetermined block 210 in units of the first and second partitions 202a and 202b. The functionality of decoder 606 corresponds to the functionality described above with respect to boxes 310, 412 and 412'.

Thinking of FIG. 1 to 3, the segmenter and transferer functionality could be included within the exchange module 52 and 110, respectively, while the functionality of decoder 606 could be implemented in the intra-prediction module, for example.

As described above with respect to section 3.2.2 in which the description may represent possible implementation details for the elements of FIG. 22, individually, the segmenter 602 may be configured to, in thresholding, individually check values of the picture 215 within the reference block 216 at tiles 608 of a two-dimensional subdivision of the reference block 216, as to whether the respective value is greater than or lower than a respective predetermined value, so that each of the first and second partitions 202a and 202b of the reference block 216 of the picture 215 is a set of tiles 608 which together completely cover the reference block 216 of the picture 215 and are complementary to each other. That is, the thresholding may be performed at sample resolution in which case the tiles 608 correspond to the individual samples 610 of picture 215. It should be mentioned that decoder 600 may also be responsible for reconstructing the picture 215 in that the values which are the subject of the individual check in thresholding are the reconstructed values of the reconstructed picture 215. In particular, as described with respect to FIGS. 1 to 3, decoder 600 may be configured to reconstruct picture 215 prior to depth/disparity map 213 associated therewith.

As already mentioned above, the segmenter 602 may be configured to, in segmenting, apply morphological hole filling and/or low-pass filtering onto a result of the thresholding in order to obtain the bi-segmentation of the reference block 216 into the first and second partitions. This avoids the occurrence of two many isolated segments of the partitions of the bi-segmentation obtained from the reference block 216 which would then be spatially transferred by spatial transferer 604 where, however, such abrupt depth changes are significantly less probable to visibly occur. Naturally, the encoder would perform the same.

Further, decoder 600 and segmenter 602 could be configured to, in thresholding, determine a measure for a central tendency of the reconstructed sample values of the reference block 216 of the picture 215 and perform the thresholding by comparing each reconstructed sample value of the reference block 216 of the picture 215 with a respective threshold which depends on the measure determined. As described above, the threshold may be globally defined among the samples 610 within reference block 216. As the central tendency, some mean value may be used, such as the arithmetic mean or a median value.

As described above in section 4.2, decoder 600 could be configured to support the availability of the coding mode represented by blocks 602 to 606 merely in case of an a-priori determined dispersion of value of samples within the reference block 216 of the picture 215 exceeding a predetermined threshold. If not, the bi-segmentation found by the thresholding would very likely not form a good predictor for the appearance of the block 210 of the depth/disparity map and, accordingly, this coding mode may not allowed for this block. By suppressing the mode possibility, a disadvantageous and unnecessary increase of the number of symbol values of the respective coding option identifier for which an entropy probability estimate would have to be taken into account, is avoided.

According to FIG. 22, the following information may be present in data stream for block 210: 1) the coding option identifier having the respective predetermined state triggering the steps 602-604, 2) optionally, information steering the bi-segmentation such as the threshold, subsequent filtering/hole filling directivities or the like, 3) optionally, coding parameters—such as CPV or CPV residual—for one or both partitions 202a, 202b—optional, because same may be allowed to be predicted—spatially or temporally from neighboring samples/blocks, 4) optionally, coding parameter residual such as DeltaCPV.

All further variations mentioned above with respect to the embodiments of FIGS. 16, 18 and 20 are also applicable to the embodiment of FIG. 22. This is especially true for the use of the prediction result as a part of a reference in a prediction loop of the decoder 600 and the possibility of combining the coding mode of FIG. 22 with any of the other coding modes described in any of sections 5.1 to 5.3 or with respect to the variations described above in sections 3 to 4.

Figure 23:
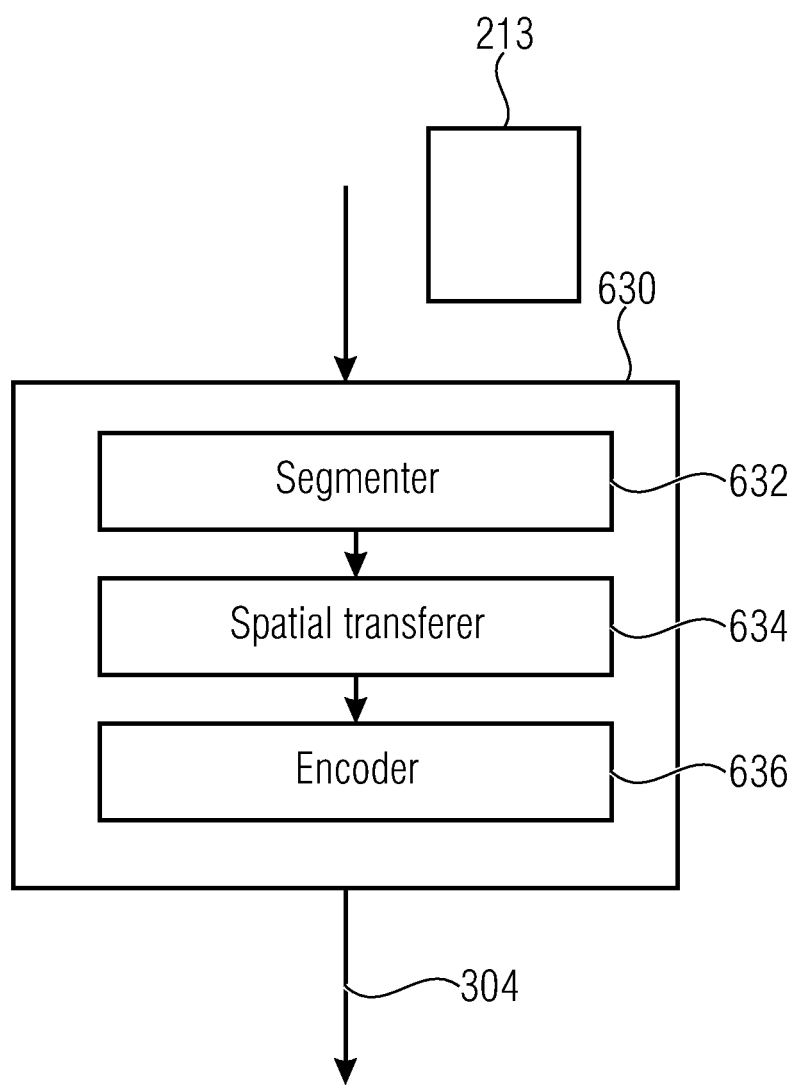
FIG. 23 shows a block diagram of an encoder fitting to FIG. 22.

FIG. 23 shows a possible implementation of an encoder fitting to the decoder of FIG. 22. The encoder of FIG. 23 is generally indicated with reference sign 630 and is configured to encode a predetermined block of a depth/disparity map associated with a picture into a data stream 304. The encoder comprises a segmenter 632 and a spatial transferer 634 which operate like components 602 and 604 of FIG. 22 in that they operate on an internally reconstructed version of previously encoded portions of data stream 304. The encoder 636 encodes the predetermined block in units of the resulting partitions.

5.5 Dependency of the Availability of the Bi-Segmentation Transfer from Picture to Depth/Disparity Map on the Sample Value Dispersion within the Reference Block of the Picture The idea underlying the embodiment outlined below was already mentioned above in section 4.2, namely the idea according to which the derivation of a bi-segmentation based on a co-located reference block within a picture with subsequent transferal of the bi-segmentation onto the current block of the depth/disparity map is merely reasonable if the likelihood of achieving a good approximation of the content of the current block of the depth/disparity map is sufficiently high so as to justify the reservation of a respective predetermined value of a corresponding coding option identifier in order to trigger this bi-segmentation transferal mode. In other words, side information rate may be saved by avoiding the necessity to take the respective predetermined value of the coding option identifier for the current block of the depth/disparity map into account when entropy-coding this coding option identifier in case the respective bi-segmentation transferal is very likely not to be selected anyway.

Thus, in accordance with a modified embodiment of the decoder 600 of FIG. 22, decoder is generally constructed similar to the decoder of FIG. 20, so that reference is made to the above description as far as possible implementations of the decoder 600 in general are concerned. However, the segmenter 602 is not restricted to be configured to segment the reference block 216 into a contour partition, nor into a wedgelet partition. Rather segmenter 602 is merely configured to segment the reference block 216 of the picture 215 depending on a texture feature of the picture 215 within the reference block 216 so as to obtain a bi-segmentation of the reference block into first and second partitions. For example, segmenter 602 may, in accordance with such a modified embodiment, use edge detection in order to detect a possible extension direction of a wedgelet separation line in order to transfer the thus located line from block 216 spatially onto depth/disparity block 210 by spatial transferer 604. Other possible bi-segmentations by segmenter 602 would also be feasible.

Beyond that, however, the decoder 600 would, in accordance with this embodiment, be configured such that the segmentation by segmenter 602, the spatial transfer by spatial transferer 604 and the decoding would form one of a first set of coding options of the decoder 600, which is not part of a second set of coding options of the decoder 600, wherein the decoder would further be configured to determine a dispersion of values of samples within the reference block 216 of the picture 215, to retrieve a coding option identifier from the data stream 304 and to use the coding option identifier as an index into the first set of coding options in case of the dispersion exceeding a predetermined threshold, with performing the segmentation, spatial transfer and decoding in boxes 602 to 606 onto the predetermined block 210 if the index points to the one coding option, and as an index into the second set of coding options in case of the dispersion succeeding the predetermined threshold. Thus, signaling overhead for signaling the coding option identifier may be saved. As the dispersion, the mean absolute difference, the standard deviation, or the variance may be used.

With regard to further modifications of the embodiment of the just-mentioned modification of FIG. 22, reference is made to section 5.4 and the description with respect to section 4.2.

A corresponding encoder may be derived from the encoder of FIG. 23.

5.6. Effective Prediction by Bi-Partitioning Using Prediction of One or Both Constant Partition Values from Neighboring Samples As already outlined above with respect to the various embodiments described so far, the way of predicting a current block by assigning constant partition values to the partitions of a bi-partitioning of a block is quite effective, especially in case of a coding sample arrays such as depth/disparity maps where the content of these sample arrays is mostly composed of plateaus or simple connected regions of similar value separated from each other by steep edges. Nevertheless, even the transmission of such constant partition values needs a considerable amount of side information which should be avoided.

The idea underlying the embodiments described further below is that this side information rate may be reduced if mean values of values of neighboring samples associated or adjoining the respective partitions are used as predictors for the constant partition values. The inventors found out that such a coding mode for blocks of the sample array may even leave a signaling of a refinement of the respective constant partition value away.

Figure 24:
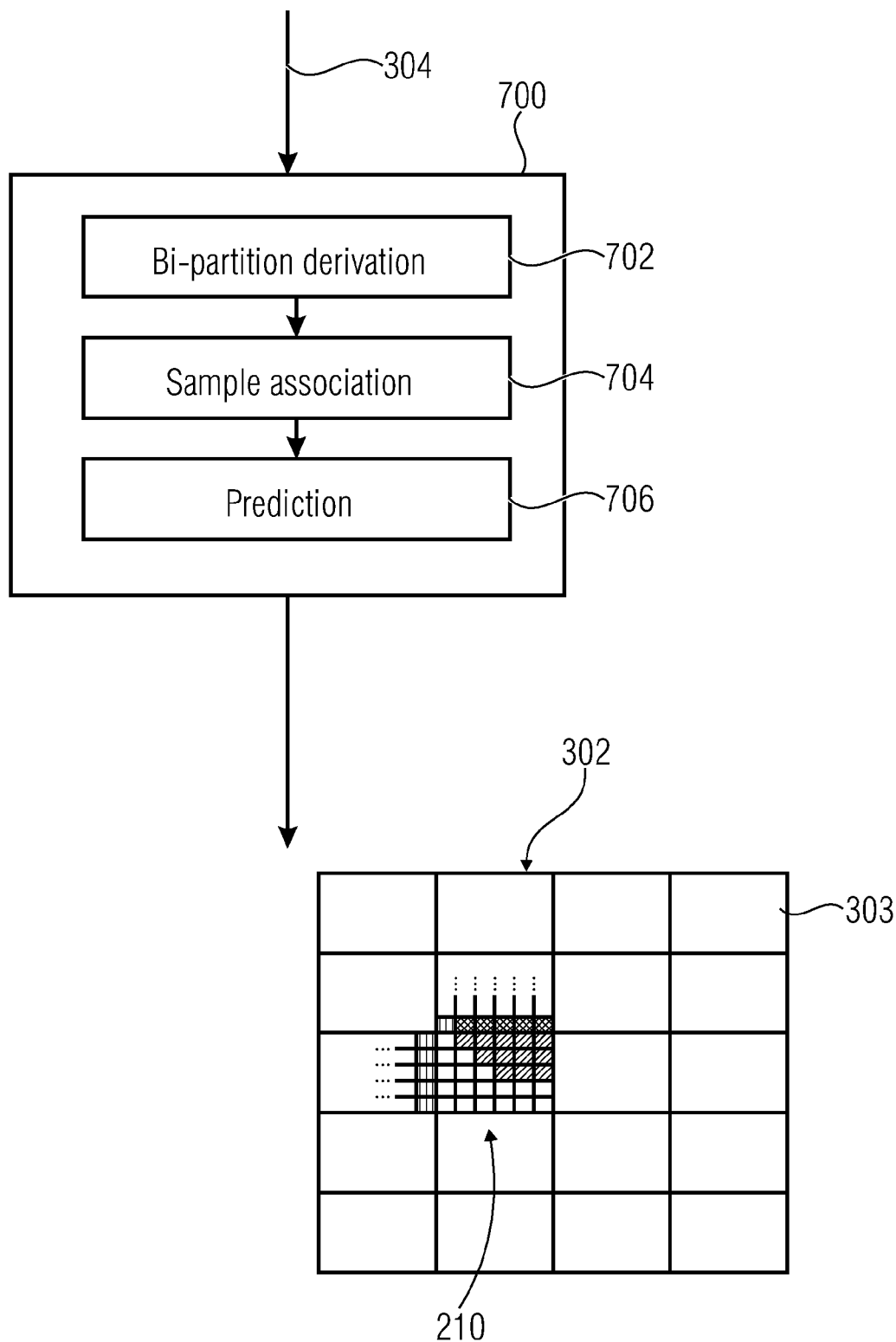
FIG. 24 shows a block diagram of a decoder according to an embodiment.

FIG. 24 shows a decoder 700 which is for reconstructing a sample array 302 from a data stream 304. The decoder 700 may be configured to reconstruct the sample array 302 using a block-based decoding and may be configured to use hybrid decoding. Generally, all the possible implementations described above in sections 5.1 to 5.5 also apply to the decoder 700 of FIG. 24. Naturally, all the possible implementations for partitioning a current block 210 into two partitions merely represent optional alternatives for the decoder of FIG. 700 which may, in this regard, also be implemented differently.

In particular, the decoder 700 is configured to perform different tasks or functions to derive the prediction of a current block 210. In particular, decoder 700 is configured to perform a derivation 702 of a bi-partition of a predetermined block 210 of the sample array 302 into a first partition illustrated by hatched samples, and a second partition illustrated by non-hatched samples. Further, decoder 700 is configured to perform an association 704 of each of neighboring samples of the sample array 302, adjoining to the predetermined block 210, with a respective one of the first and second partitions so that each neighboring sample adjoins the partition with which same is associated. In FIG. 24 the neighboring samples, which are the subject of the association 704, are illustrated by two different kinds of hatching, namely dotted hatching and cross hatching. The dot-hatched ones show samples adjoining samples of block 210, which belong to one partition of block 210, whereas the cross-hatched ones adjoin samples of block 210 which belong to the other partition. As described above with respect to sections 5.1 to 5.4, decoder 700 may use a appropriate coding/decoding order among blocks 303 of sample array 302 in order to achieve a high probability for availability of neighboring samples of blocks 303 of the sample array 302 which have already been reconstructed by decoder 700.

Of course, it may occur that the available neighboring samples, i.e. the neighboring samples of block 210 positioned within already reconstructed blocks 303 of the sample array 302, merely join to one of the partitions of block 210. In that case, the data stream 304 may explicitly transmit a constant partition value for the respective other partition to which none of the neighboring samples adjoin. Alternatively, some other fallback procedure may be performed by decoder 700 in that case. For example, decoder 700 may, in that case, set this missing constant partition value to a predetermined value or a value determined from a long-term mean among previously reconstructed values of sample array 302 and/or some other previously reconstructed sample array.

Finally, in a prediction 706, decoder 700 predicts the predetermined block 210 by assigning a mean value of values of the neighboring samples associated with the first partition to samples of the sample array positioned within the first partition and/or a mean value of values of the neighboring samples associated with a second partition to samples of the sample array positioned within the second partition.

The decoder 700 may be configured to refine the prediction of the predetermined block 210 using refinement information within the data stream, namely by applying a first refinement value within the refinement information onto the mean value of values of the neighboring samples associated with the first partition, and/or applying a second refinement value within the refinement information onto the mean value of values of the neighboring samples associated with the second partition. In this regard, the decoder 700 may further be configured to, in applying the first and/or second refinement value, linearly combine—such as add—the first and/or second refinement value with the mean value of values of the neighboring samples associated with the first partition, and/or the mean value of values of the neighboring samples associated with the second partition, respectively. The decoder 700 may be configured to, in applying the first and/or second refinement value, retrieve the first and/or second refinement value from the data stream and scale the first and/or second refinement value as retrieved using a quantization step size depending on a reference quantization step size at which a predetermined spatially sampled component—texture and/or depth/map—associated with the sample array is transmitted within the data stream. The sample array may, for example, be a depth map, but the reference quantization step size may be used by decoder 700 to reconstruct a texture sample array from the bitstream, with which the depth map is associated. Further reference is made to the respective portions in sections 3.3.2 for further details.

The decoder is configured to, in deriving the bi-partition of a predetermined block of the sample array into first and second partitions, predict a position of a wedgelet separation line within the predetermined block of the sample array depending on a wedgelet separation line of a neighboring block of the predetermined block such that the wedgelet separation line at the predicted position forms an extension of the wedgelet separation line of the neighboring block into the predetermined block. The decoder is further configured to refine the predicted position of the wedgelet separation line using refinement information within the data stream, the wedgelet separation line of the predetermined bock dividing the predetermined block into the first and second partitions.

As described, the decoder 700 may do the bi-segmentation using any of the ideas set out in sections 5.1 to 5.5. Decoder 700 may be configured to predict a reference block of the sample array 302, neighboring the predetermined block 210, using intra-prediction by filling the reference block by copying reconstructed values of samples of the sample array, neighboring the first block, along an intra-prediction direction into the reference block. In deriving the bi-partition of a predetermined block of the sample array into first and second partitions, decoder 700 may predict a position of a wedgelet separation line within the predetermined block 210 by setting an extension direction of the wedgelet separation line within the predetermined block depending on the intra-prediction direction, the wedgelet separation line dividing the predetermined block into the first and second partitions.

Alternatively, the decoder 700 may, if the sample array 302 is a depth/disparity map associated with a picture, be configured to segment a reference block of the picture, co-located to the predetermined block 210, by thresholding the picture within the reference block to obtain a bi-segmentation of the reference block into first and predetermined partitions, and to spatially transfer the bi-segmentation of the reference block of the picture onto the predetermined block of the depth/disparity map so as to obtain the first and second partitions.

The decoder may further be further configured to use the predetermined block as a reference in a prediction loop of the decoder.

Figure 25:
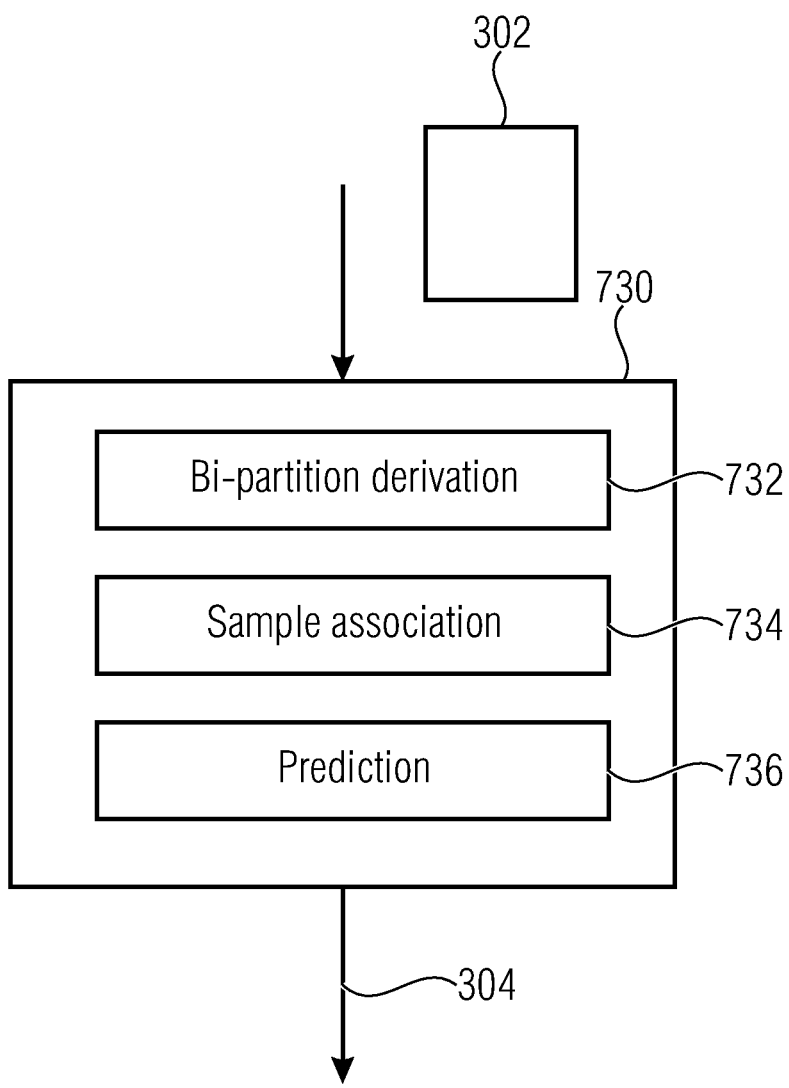
FIG. 25 shows a block diagram of an encoder fitting to FIG. 24.

FIG. 25 shows a possible embodiment for an encoder 730 fitting to the decoder 700 of FIG. 24. The encoder 730 for encoding a sample array into a data stream is configured to derive 732 a bi-partition of a predetermined block of the sample array into first and second partitions, and to associate 734 each of neighboring samples of the sample array, adjoining to the predetermined block, with a respective one of the first and second partitions so that each neighboring sample adjoins the partition with which same is associated. The encoder is further configured to predict 736 the predetermined block by assigning a mean value of values of the neighboring samples associated with the first partition to samples of the sample array positioned within the first partition and a mean value of values of the neighboring samples associated with the second partition to samples of the sample array positioned within the second partition.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A decoder for reconstructing a sample array from a data stream configured to:
   predict a first block of the sample array using intra-prediction by filling the first block by copying reconstructed values of samples of the sample array, neighboring the first block, along an intra-prediction direction into the first block;
   derive a position of a wedgelet separation line within a second block neighboring the first block by setting an extension direction of the wedgelet separation line within the second block depending on the intra-prediction direction used to predict the first block, the wedgelet separation line dividing the second block into first and second wedgelet partitions; and
   decode the second block in units of the first and second wedgelet partitions.

2. The decoder according to claim 1 further configured to, in deriving the position of the wedgelet separation line within the second block of the sample array, place a starting point of the wedgelet separation line at a position of a maximum change between consecutive ones of a sequence of reconstructed values of samples of a line of samples extending adjacent to the second block along a portion of a circumference of the second block.

3. The decoder according to claim 1, configured to
   retrieve a coding option identifier from the data stream,
   if the coding option identifier comprises a predetermined value, check as to whether any of a set of candidate blocks neighboring the second block comprises a wedgelet separation line continuing into the second block, and
   if so, derive a position of a wedgelet separation line within the second block of the sample array depending on the wedgelet separation line of the respective block such that the wedgelet separation line at the derived position within the second block forms an extension of the wedgelet separation line of the neighboring block into the second block, and if not, perform the derivation of the position of the wedgelet separation line and the prediction of the second block.

4. The decoder according to claim 1, wherein the decoder is configured to, in decoding the second block, predict the second block by assigning a first constant partition value to samples of the sample array positioned within the first wedgelet partition and a second constant partition value to samples of the sample array positioned within the second wedgelet partition, the assignment depending on the data stream.

5. The decoder according to claim 4, configured to refine the prediction of the second block by applying a first refinement value within the refinement information onto a mean value of values of neighboring samples associated with the first partition, and/or applying a second refinement value within the refinement information onto a mean value of values of neighboring samples associated with the second partition.

6. The decoder according to claim 5, configured to, in applying the first and/or second refinement value, linearly combine the first and/or second refinement value with the mean value of values of the neighboring samples associated with the first partition, and/or the mean value of values of the neighboring samples associated with the second partition, respectively.

7. The decoder according to claim 5, wherein the sample array is a depth map, and the decoder is configured to scale the first and/or second refinement value using a quantization step size depending on a reference quantization step size at which a predetermined spatially sampled component associated with the sample array is transmitted, and use the reference quantization step size in order to reconstruct a texture sample array from the data stream, with which the depth map is associated.

8. The decoder according to claim 1, wherein the sample array is a depth/disparity map associated with a picture, wherein the decoder is configured to retrieve a coding option identifier from the data stream, if the coding option identifier comprises a first predetermined value, perform the derivation of the position of the wedgelet separation line and the prediction of the second block, and if the coding option identifier comprises a second predetermined value, segment a reference block of the picture, co-located to the second block, by thresholding the picture within the reference block to acquire a bi-segmentation of the reference block into first and second partitions, spatially transfer the bi-segmentation of the reference block of the picture onto the second block of the depth/disparity map so as to acquire first and second partitions of the second block, and predict the second block by assigning a first constant partition value to samples of the depth/disparity map positioned within the first partition of the second block and a second constant partition value to samples of the depth/disparity map positioned within the second partition of the second block, the assignment depending on the data stream.

9. The decoder according to claim 1, further configured to use the second block as a reference in a prediction loop of the decoder.

10. An encoder for encoding a sample array into a data stream configured to:

predict a first block of the sample array using intra-prediction by filling the first block by copying values of already encoded samples of the sample array, neighboring the first block, along an intra-prediction direction into the first block;

derive a position of a wedgelet separation line within a second block neighboring the first block by setting an extension direction of the wedgelet separation line within the second block depending on the intra-prediction direction used to predict the first block, the wedgelet separation line dividing the second block into first and second wedgelet partitions; and encode the second block in units of the first and second wedgelet partitions.

11. A method for reconstructing a sample array from a data stream comprising:

predicting a first block of the sample array using intra-prediction by filling the first block by copying reconstructed values of samples of the sample array, neighboring the first block, along an intra-prediction direction into the first block;

deriving a position of a wedgelet separation line within a second block neighboring the first block by setting an extension direction of the wedgelet separation line within the second block depending on the intra-prediction direction used to predict the first block, the wedgelet separation line dividing the second block into first and second wedgelet partitions; and decoding the second block in units of the first and second wedgelet partitions.

12. A method for encoding a sample array into a data stream comprising:

predicting a first block of the sample array using intra-prediction by filling the first block by copying values of already encoded samples of the sample array, neighboring the first block, along an intra-prediction direction into the first block;

deriving a position of a wedgelet separation line within a second block neighboring the first block by setting an extension direction of the wedgelet separation line within the second block depending on the intra-prediction direction used to predict the first block, the wedgelet separation line dividing the second block into first and second wedgelet partitions; and encoding the second block in units of the first and second wedgelet partitions.

13. A non-transitory computer readable medium including a computer program comprising a program code for performing, when running on a computer, a method according to claim 12.

14. A non-transitory computer readable medium including a computer program comprising a program code for performing, when running on a computer, a method according to claim 11.

* * * * *